United States Patent
Jun

(10) Patent No.: US 12,523,418 B2
(45) Date of Patent: Jan. 13, 2026

(54) REFRIGERATOR AND CONTROL METHOD THEREOF

(71) Applicant: Samsung Electronics Co., Ltd., Suwon-si (KR)

(72) Inventor: Joonsik Jun, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 104 days.

(21) Appl. No.: 18/627,553

(22) Filed: Apr. 5, 2024

(65) Prior Publication Data

US 2024/0247866 A1 Jul. 25, 2024

Related U.S. Application Data

(63) Continuation of application No. PCT/KR2022/014470, filed on Sep. 27, 2022.

(30) Foreign Application Priority Data

Oct. 8, 2021 (KR) .................. 10-2021-0134445

(51) Int. Cl.
*F25D 29/00* (2006.01)
*H04W 4/35* (2018.01)
*H04W 4/38* (2018.01)

(52) U.S. Cl.
CPC ............ *F25D 29/005* (2013.01); *H04W 4/35* (2018.02); *H04W 4/38* (2018.02);
(Continued)

(58) Field of Classification Search
CPC .. F25D 29/00; F25D 29/005; F25D 2400/361; F25D 2500/06; F25D 2700/02;
(Continued)

(56) References Cited

U.S. PATENT DOCUMENTS 11,263,498 B2   3/2022   Kim et al.
2018/0335252 A1  11/2018  Oh
(Continued)

FOREIGN PATENT DOCUMENTS

CN      108759294 A    11/2018
CN      109028748 A    12/2018
(Continued)

OTHER PUBLICATIONS

PCT/ISA/210 dated Jan. 12, 2023 in International Patent Application No. PCT/KR2022/014470.
(Continued)

*Primary Examiner* — Jonathan Bradford
(74) *Attorney, Agent, or Firm* — STAAS & HALSEY LLP

(57) ABSTRACT

A control method for a refrigerator includes: obtaining an input image generated by photographing an inner space of the refrigerator; with respect to one or more objects recognized from the input image, obtaining object information including a type and a position of the one or more objects, respectively; by using an ultra-wide band (UWB) module included in the refrigerator, detecting a UWB signal output from a UWB device while the UWB device is arranged inside the refrigerator; based on the detected UWB signal, identifying a position of the UWB device; identifying an object which is located around the UWB device, from among the one or more objects recognized from the input image, based on the identified position of the UWB device; and outputting the object information with respect to the object identified as being located around the UWB device as an audio signal.

15 Claims, 31 Drawing Sheets

(52) U.S. Cl.
CPC .... *F25D 2400/361* (2013.01); *F25D 2700/02* (2013.01); *F25D 2700/06* (2013.01)

(58) Field of Classification Search
CPC ... F25D 2700/06; G09B 21/00; G09B 21/001; G09B 21/006; H04W 4/35; H04W 4/38
See application file for complete search history.

(56) References Cited

U.S. PATENT DOCUMENTS

| | | | |
|---|---|---|---|
| 2019/0384990 | A1* | 12/2019 | Kim .................. H04L 67/10 |
| 2020/0041200 | A1 | 2/2020 | No |
| 2021/0131718 | A1 | 5/2021 | Jeong et al. |
| 2021/0192329 | A1 | 6/2021 | Shin et al. |
| 2023/0283500 | A1 | 9/2023 | Kim et al. |

FOREIGN PATENT DOCUMENTS

| | | |
|---|---|---|
| CN | 111043830 A | 4/2020 |
| KR | 2002-0006780 | 1/2002 |
| KR | 10-2007-0091390 | 9/2007 |
| KR | 10-2009-0029423 | 3/2009 |
| KR | 10-2009-0105256 | 10/2009 |
| KR | 10-2017-0060713 | 6/2017 |
| KR | 10-1752586 | 6/2017 |
| KR | 10-2017-0139375 | 12/2017 |
| KR | 10-2018-0126859 | 11/2018 |
| KR | 10-2008821 | 10/2019 |
| KR | 10-2020-0003299 | 1/2020 |
| KR | 10-2020-0034903 | 4/2020 |
| KR | 10-2104088 | 4/2020 |
| KR | 10-2020-0067317 | 6/2020 |
| KR | 10-2234771 | 4/2021 |
| KR | 10-2021-0053097 | 5/2021 |
| WO | WO 2020/010405 A1 | 1/2020 |

OTHER PUBLICATIONS

PCT/ISA/220 and PCT/ISA 237 Jan. 12, 2023 in International Patent Application No. PCT/KR2022/014470.

Gierad Laput et al., "Sensing Fine-Grained Hand Activity with Smartwatches", Carnegie Mellon University, Human-Computer Interaction Institute; May 2, 2019; 13 pages.

* cited by examiner

FIG. 7
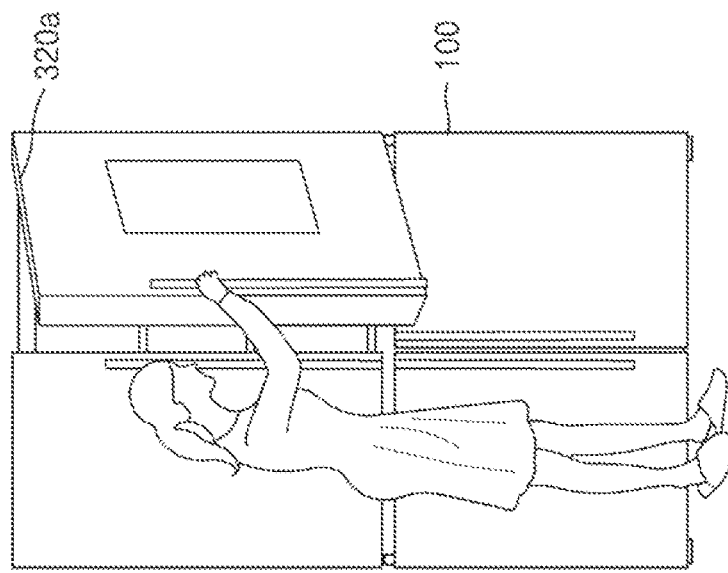
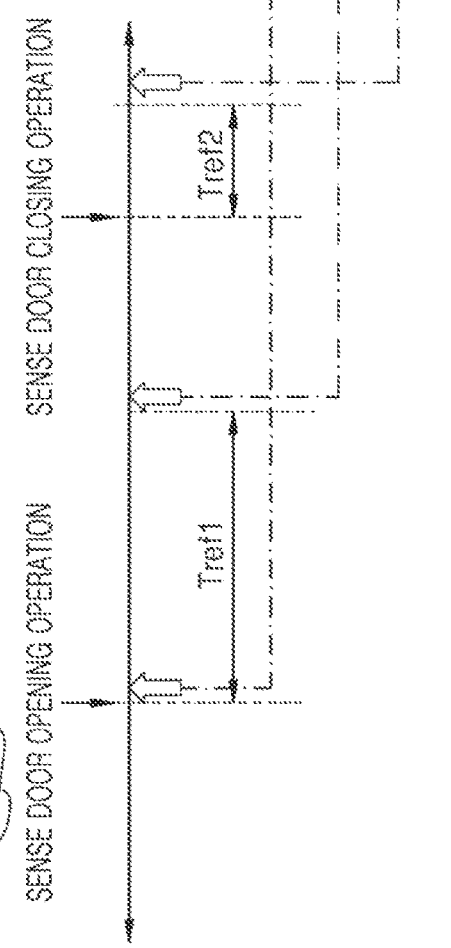
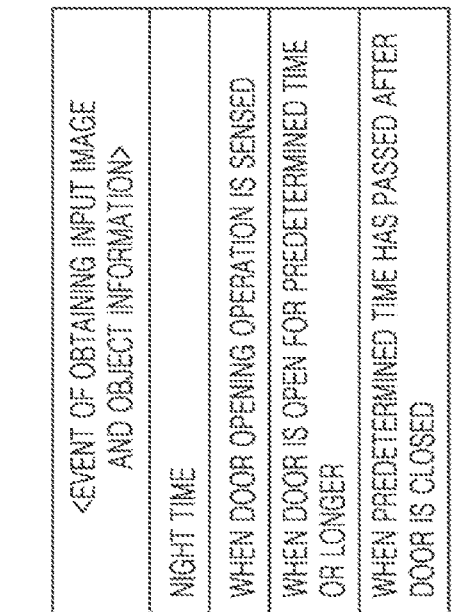

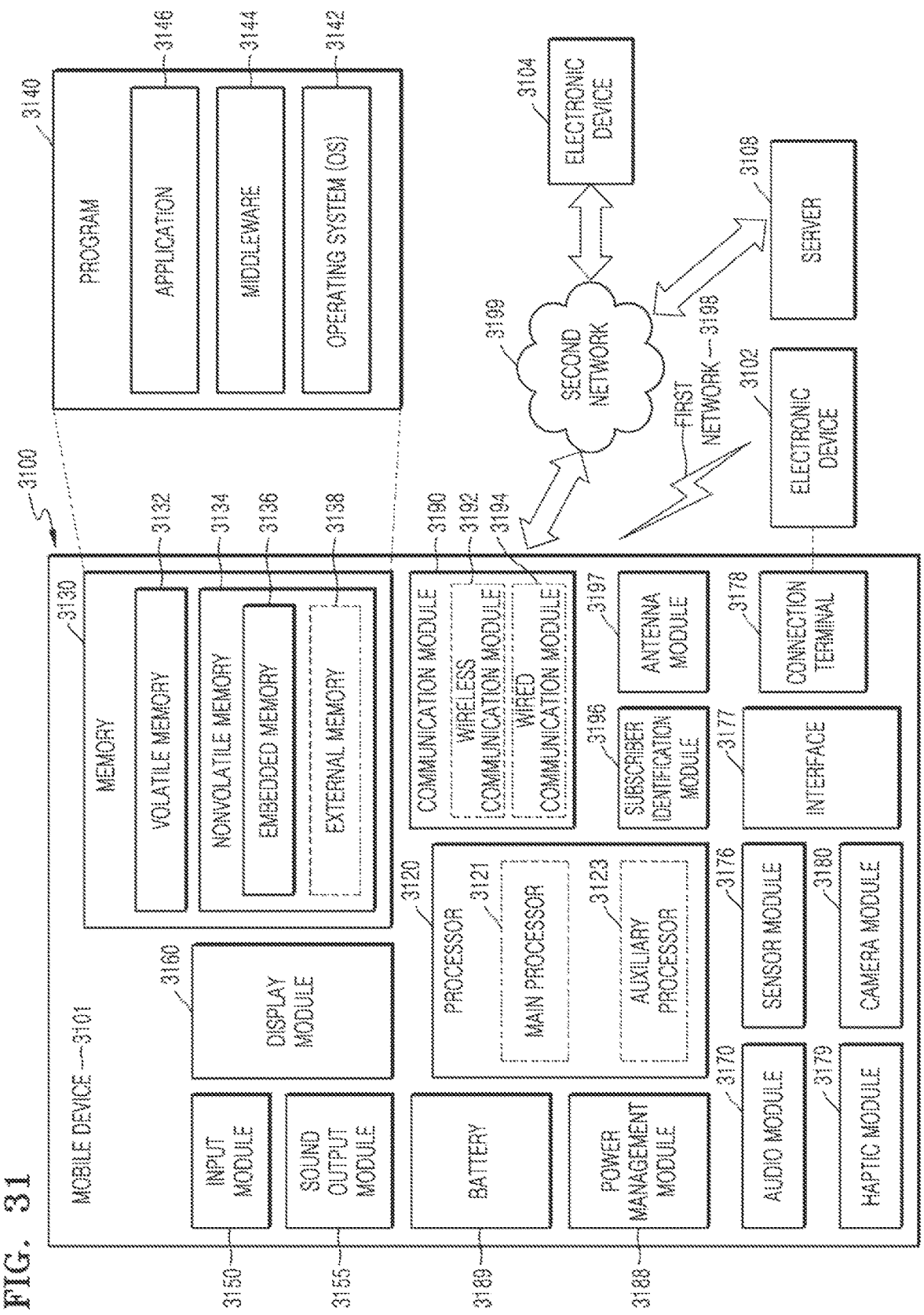

REFRIGERATOR AND CONTROL METHOD THEREOF

CROSS-REFERENCE TO RELATED APPLICATION

This application is a continuation application, under 35 U.S.C. § 111(a), of international application No. PCT/KR2022/014470, filed on Sep. 27, 2022, which claims priority under 35 U. S. C. § 119 to Korean Patent Application No. 10-2021-0134445, filed on Oct. 8, 2021, in the Korean Intellectual Property Office, the disclosures of which are incorporated by reference herein in their entireties.

TECHNICAL FIELD

Embodiments of the disclosure relate to a refrigerator, a control method for the refrigerator, and a computer-readable recording medium having recorded thereon a program for executing the control method for the refrigerator on a computer.

BACKGROUND ART

Recently, with improvements in user interfaces of refrigerators, various user convenience functions have been provided in refrigerators. For example, there is an increasing number of cases in which a camera is installed in a refrigerator or a user interface including a large-sized display is provided on a door of a refrigerator. A user may obtain a variety of information from a refrigerator by using improved user interfaces. For example, through a user interface, a user may view an image of an inner space of a refrigerator or obtain information with respect to food and beverage contained in a refrigerator. Also, a refrigerator may provide various functions in conjunction with a server configured to provide diverse functions. A refrigerator may provide a variety of Internet of things (IoT) functions provided through a server and may reinforce interconnection with a mobile device.

However, when a refrigerator is used by a person with visual impairment, there may be a lot of difficulties. It may be difficult for a visually impaired person to identify the position of food in a refrigerator and obtain a desired food. Thus, there is a demand for a refrigerator which may be conveniently used by persons having a sight disability.

DISCLOSURE

Technical Solution

According to an aspect of an embodiment of the disclosure, there is provided a control method for a refrigerator. The control method for the refrigerator includes obtaining an input image generated by photographing an inner space of the refrigerator. Also, the control method for the refrigerator includes, with respect to one or more objects recognized from the input image, obtaining object information including a type and a position of the one or more objects, respectively. Also, the control method for the refrigerator includes, by using an ultra-wide band (UWB) module included in the refrigerator, detecting a UWB signal output from a UWB device while the UWB device is arranged inside the refrigerator. Also, the control method for the refrigerator includes, based on the detected UWB signal, identifying a position of the UWB device. Also, the control method for the refrigerator includes, identifying an object located around the UWB device, from among the one or more objects recognized from the input image, based on the identified position of the UWB device. Also, the control method for the refrigerator includes outputting the object information with respect to the object identified as being located around the UWB device as an audio signal.

Also, according to an aspect of an embodiment of the disclosure, there is provided a refrigerator. The refrigerator includes a camera configured to photograph an inner space of the refrigerator and one or more ultra-wide band (UWB) modules configured to detect a UWB signal. Also, the refrigerator includes a speaker configured to output an audio signal. Also, the refrigerator includes a memory storing one or more instructions. Also, the refrigerator includes one or more processors connected to the memory. The one or more processors are configured to execute the one or more instructions to obtain an input image captured by the camera. The one or more processors are configured to execute the one or more instructions to, with respect to one or more objects recognized from the input image, obtain object information including a type and a position of the one or more objects, respectively. The one or more processors are configured to execute the one or more instructions to, by using the one or more UWB modules, detect a UWB signal output from a UWB device while the UWB device is arranged in the refrigerator. The one or more processors are configured to execute the one or more instructions to, based on the detected UWB signal, identify a position of the UWB device. The one or more processors are configured to execute the one or more instructions to identify an object which is located around the UWB device, from among the one or more objects recognized from the input image, based on the identified position of the UWB device. The one or more processors are configured to execute the one or more instructions to output the object information with respect to the object identified as being located around the UWB device as an audio signal by using the speaker.

Also, according to an aspect of an embodiment of the disclosure, there is provided a computer-readable recording medium having recorded thereon a program for executing the control method for the refrigerator on a computer.

DESCRIPTION OF DRAWINGS

FIG. 7 is a diagram showing a time point at which an input image and object information are obtained, according to an embodiment of the disclosure.

FIG. 27 is a diagram showing a process of detecting an operation and a position of a UWB device, according to an embodiment of the disclosure.

FIG. 31 is a block diagram of a mobile device 2801 in a network environment 2800, according to various embodiments.

MODE FOR INVENTION

Figure 1:
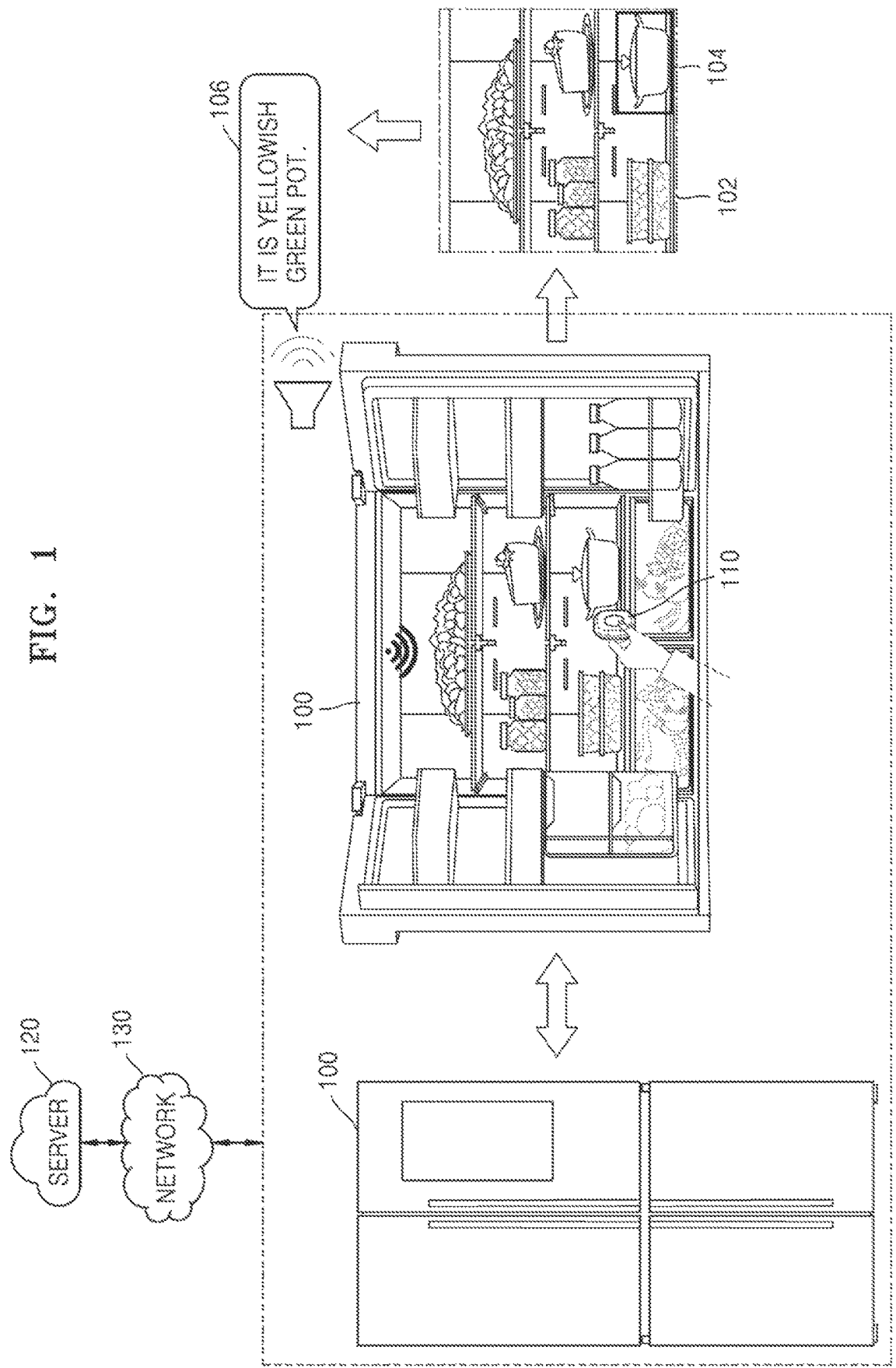
FIG. 1 is a diagram showing a refrigerator, an ultra-wideband (UWB) device, and a server, according to an embodiment of the disclosure.

In this specification, principles of embodiments are described and disclosed for one of ordinary skill in the art of the embodiments of the disclosure to implement an embodiment described in the claims. The disclosed embodiments may be implemented in various forms.

Throughout the specification, like reference numerals refer to like elements. Not all elements of the embodiments are described in this specification, and general aspects in the art or the same aspects of the embodiments are not described. The term "module" or "unit" used in the specification may be implemented by software, hardware, or firmware or a combination thereof. Also, according to embodiments, a plurality of "modules" or "units" may be implemented by one element, or one "module" or "unit" may include a plurality of elements.

When describing the embodiments, well-known arts will not be described in detail, when it is determined that the detail descriptions thereof may unnecessarily blur the concept of the disclosure. Also, the numbers (for example, a first, a second, etc.) used for the descriptions in the specification are only identifiers for distinguishing elements from other elements.

Also, when it is described in this specification that one element is "connected to" or "in connection with" another element, the element may be directly connected to or in connection with the other element, but it shall be also understood that the element may be connected to or in connection with the other element with yet another element present therebetween, unless particularly otherwise described.

Hereinafter, operation principles of embodiments of the disclosure and various embodiments are described with reference to the accompanying drawings.

According to embodiments of the disclosure, there are provided a refrigerator and a control method for the refrigerator, for helping a person with visual impairment accurately identify positions of food and beverage and a food ingredient in the refrigerator. FIG. 1 is a diagram showing a refrigerator, an ultra-wideband (UWB) device, and a server, according to an embodiment of the disclosure.

A refrigerator 100 contains various kinds of food and beverage in an inner space thereof. The inner space of the refrigerator 100 is sectioned into a shelf, a partition, a tray, a drawer, etc. Various types of food and beverage are contained in the plurality of sections in the refrigerator 100. When a person with vision impairment searches for food and beverage in the refrigerator 100, it may be difficult to identify a position of a desired food due to vision impairment. The refrigerator 100 according to embodiments of the disclosure may detect a position of a UWB device 110 that a user arranges in an inner space of the refrigerator 100, photograph the inner space of the refrigerator 100, and provide, as an audio signal, information with respect to a food corresponding to the position of the UWB device 110 arranged by the user. According to an embodiment of the disclosure, based on this configuration, it is possible to assist persons with vision impairment in searching for a desired food in the refrigerator 100.

The refrigerator 100 may include a camera and may capture an image of the inner space of the refrigerator 100 by using the camera to generate an input image 102. The refrigerator 100 may recognize one or more objects from the input image 102. The refrigerator 100 may also recognize an attribute of each object to generate object information. The refrigerator 100 may obtain the object information of the input image by using a server 120 connected to the refrigerator 100 through a network 130. The server 120 may generate the object information from the input image by using a machine-trained object recognition model and may transmit the generated object information to the refrigerator 100.

The refrigerator 100 may detect the UWB device 110 arranged in the refrigerator 100. The UWB device 110 may correspond to an electronic device configured to output a UWB signal. The refrigerator 100 may include a UWB module including a UWB sensor. The refrigerator 100 may detect a UWB signal output from the UWB device 110 by using the UWB module. The refrigerator 100 may identify a position of the UWB device 110 by using the detected UWB signal.

The refrigerator 100 may identify an object 104 corresponding to the position of the UWB device 110 from among the one or more objects recognized from the input image. The refrigerator 100 may include a speaker and may generate and output object information with respect to the identified object as an audio signal. For example, when the refrigerator 100 identifies a "yellowish green pot," which is an object around the UWB device 110, the refrigerator 100 may generate and output an audio message 106 that "it is a yellowish green pot."

By outputting, as an audio signal, information with respect to a food in the refrigerator 100, the food corresponding to a position designated by the UWB device 110, the refrigerator 100 may assist the person with visually impairment.

Figure 2:
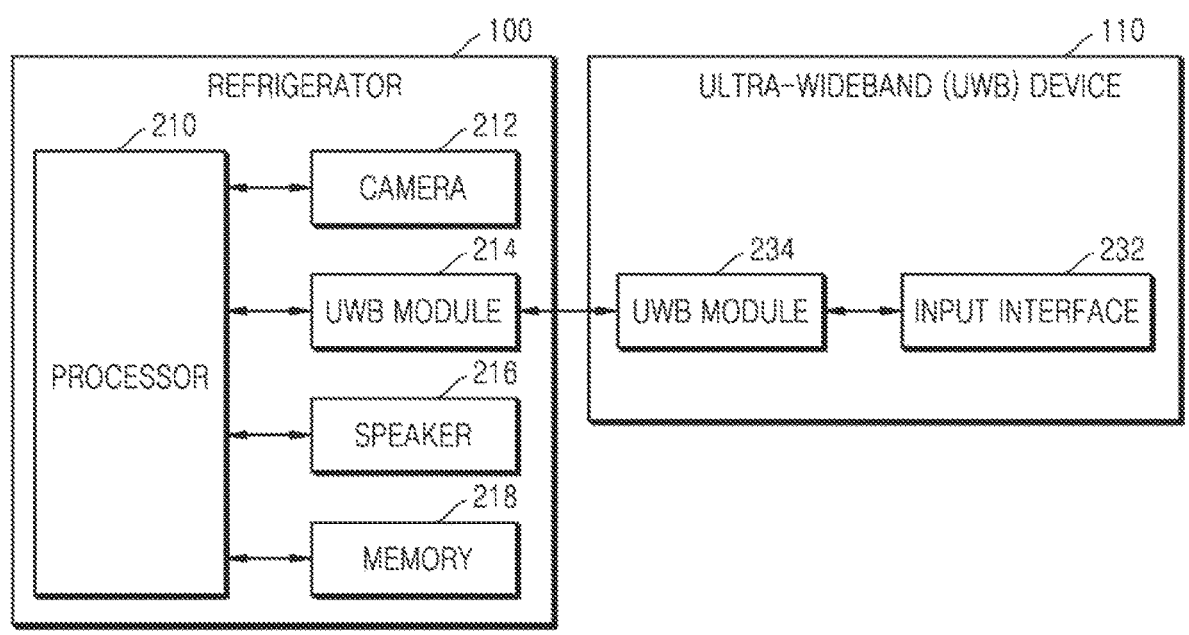
FIG. 2 is a block diagram showing a configuration of a refrigerator and a UWB device, according to an embodiment of the disclosure.
Figure 3:
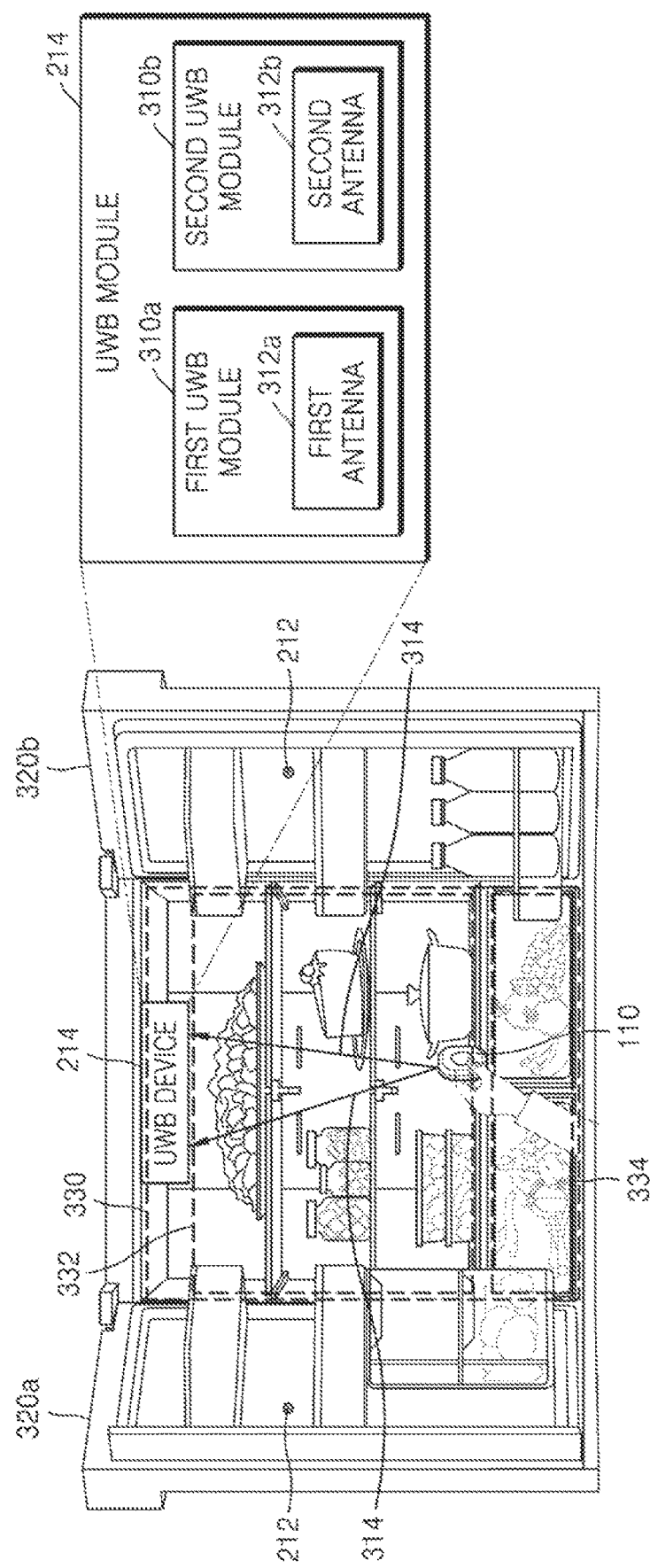
FIG. 3 is a diagram showing a structure of a refrigerator according to an embodiment of the disclosure.

FIG. 2 is a block diagram showing a configuration of a refrigerator and a UWB device, according to an embodiment of the disclosure. FIG. 3 is a diagram showing a structure of a refrigerator according to an embodiment of the disclosure. Referring to FIGS. 2 and 3, the configuration of the refrigerator and the UWB device is described.

The refrigerator 100 may be a device for storing food and beverage at a predetermined low temperature. The refrigerator 100 may include at least one of a fridge compartment or a freezer compartment or a combination of the fridge compartment and the freezer compartment. The refrigerator 100 may be realized in the form of a freezer, a kimchi refrigerator, etc.

The refrigerator 100 may include a processor 210, a camera 212, a UWB module 214, a speaker 216, and a memory 218.

The processor 210 may control general operations of the refrigerator 100. The processor 210 may be implemented as one or more processors. The processor 210 may perform a predetermined operation by executing an instruction or a command stored in the memory 218. Also, the processor 210 may control operations of the elements included in the refrigerator 100. The processor 210 may include at least one of a central processing unit (CPU), a graphics processing unit (GPU), or a neural processing unit (NPU) or a combination thereof.

The camera 212 may capture a still image and a motion image. According to an embodiment, the camera 212 may include one or more lenses, image sensors, image signal processors, or flashes. The camera 212 may photograph an inner space of the refrigerator 100 and may output a signal generated by capturing an image of the inner space of the refrigerator 100 to the memory 218 or the processor 210. The processor 210 may generate an input image from the signal generated by the camera 212 by capturing the image of the inner space of the refrigerator 100.

The camera 212 may be provided on doors 320a and 320b of the refrigerator 100. The camera 212 may be arranged to photograph an image in a direction from the doors 320a and 320b toward a container 330 in the refrigerator 100. One or more cameras 212 may be provided on the doors 320a and 320b of the refrigerator 100. The camera 212 may have a field of view (FOV) set to photograph the entire area of the container 330 in a front view.

The container 330 of the refrigerator 100 may be a space for containing food and beverage. The container 330 may be maintained at a predetermined low temperature by a fridge module or a freezer module of the refrigerator 100. The container 330 may include a shelf area 332 and a drawer area 334. According to an embodiment of the disclosure, the FOV of the camera 212 may be set to photograph a front side of the shelf area 332. When the refrigerator 100 recognizes an object in the input image, the refrigerator 100 may recognize an object in the shelf area 332 and may not recognize an object in the drawer area 334. The object in the drawer area 334 may be difficult to be identified in the input image, and thus, the refrigerator 100 may perform object recognition only on the shelf area 332. Thus, the camera 212 may essentially photograph the front side of the shelf area 332, and the drawer area 334 may or may not be included in the FOV.

The UWB module 214 may include one or more elements for enabling UWB communication. The UWB communication, that is, ultra-wideband communication, may denote wireless communication for transmitting a large volume of information with a low power supply throughout an extremely wider band compared to a previous spectrum. According to the UWB communication technique, whether or not a UWB tag device is located in an adjacent area may be accurately determined. According to embodiments of the disclosure, the UWB device 110 may correspond to the UWB tag device. The UWB module 214 may measure a distance to the UWB device 110 based on a UWB signal. Also, the UWB module 214 may measure, based on the UWB signal, an angle between a reference line and the UWB device 110. The UWB signal may include time stamp information. The UWB module 214 may calculate a time of flight (ToF) result value based on the time stamp information of the UWB signal and an arrival time of the UWB signal. The UWB module 214 may measure, based on the ToF result value, a distance from an antenna of the UWB module 214 to the UWB device 110.

The UWB module 214 may include a first UWB module 310a and a second UWB module 310b. The first UWB module 310a may include a first antenna 312a. The first UWB module 310a may detect, through the first antenna 312a, a UWB signal 314 output from the UWB device 110. The second UWB module 310b may include a second antenna 312b. The second UWB module 310b may detect, through the second antenna 312b, the UWB signal 314 output from the UWB device 110.

The UWB module 214 may calculate a first distance between the first antenna 312a and the UWB device 110 by using a first UWB signal detected by the first UWB module 310a. Also, the UWB module 214 may calculate a second distance between the second antenna 312b and the UWB device 110 by using a second UWB signal detected by the second UWB module 310b. By using the first distance and the second distance, the UWB module 214 may calculate an angle between a predetermined reference line defined based on the structure of the refrigerator 100 and the UWB device 100. The processor 210 may define a physical coordinate of the UWB device 100 based on the first distance, the second distance, and the angle with respect to the UWB device 100. The physical coordinate may be defined in an inner space of the container 330 of the refrigerator 100. A process of obtaining the distance, the angle, and the physical coordinate with respect to the UWB device 100 is to be described in detail with reference to FIG. 18.

The UWB module 214 may be separately mounted on a separate part of the container 330. For example, when the refrigerator 100 is divided into a fridge compartment and a freezer compartment, the UWB module 214 may be arranged in the fridge compartment and the different UWB module 214 may be arranged in the freezer compartment. Each UWB module 214 may be activated when a door of the corresponding container is open. For example, each UWB module 214 may be maintained in an inactive state while the door is being closed, and when the door of the fridge compartment is open, the UWB module 214 arranged in the fridge compartment may be activated. When the door of the fridge compartment is open and the door of the freezer compartment is not open, the UWB module 214 of the freezer compartment may be maintained in the inactive state. On the contrary, when the door of the freezer compartment is open, the UWB module 214 arranged in the freezer compartment may become active and the UWB module 214 arranged in the fridge compartment may be maintained in the inactive state.

The speaker 216 may output an audio signal. The processor 210 may generate object information corresponding to a position of the UWB device 100, based on object information recognized in the input image and the physical coordinate of the UWB device 100. Also, the processor 210 may generate an audio message corresponding to the object information. The speaker 216 may convert the audio message generated by the processor 210 into a driving signal of the speaker 216, and the driving signal may be output through the speaker 216. By using a driving signal input from the processor 210, the speaker 216 may output an audio signal corresponding to the audio message.

The object information may be information defining an attribute of each object and may include, for example, at least one of an area coordinate, an object type, or a product name or a combination thereof. The coordinate may be defined as a coordinate in the input image. An image coordinate may be defined in the input image, based on a structure of the container 330 in the refrigerator 100. The image coordinate may be defined as a two-dimensional coordinate. The object type may indicate a food type. For example, the object type may be defined as a salad, an onion, a carrot, a potato, an apple, grapes, a fish, bacon, a container, a water-bottle, flesh, etc. The product name may be a product title defined with respect to an industrial product. Only some objects may have defined product names, and there may be an object not having a defined product name. The product name may be defined, for example, as sausage A, milk B, etc. The product name may be defined by a product label, a barcode, a packing material, etc.

The memory 218 may store various information, data, instructions, programs, etc. necessary for operations of the refrigerator 100. The memory 218 may include at least one of a volatile memory or a nonvolatile memory or a combination thereof. The memory 218 may include at least one type of storage medium from among a flash memory type, a hard disk type, a multimedia card micro type, a card-type memory (e.g., an SD or XD memory), random-access memory (RAM), static RAM (SRAM), read-only memory (ROM), electrically erasable programmable ROM (EE-PROM), programmable ROM (PROM), a magnetic memory, a magnetic disk, and an optical disk. Also, the memory 218 may correspond to a web storage or a cloud server performing a storage function on the Internet.

The memory 218 may store the input image captured by the camera 212. Also, the memory 218 may store the object information obtained from the input image. The processor 210 may recognize one or more objects from the input image and may generate the object information with respect to each of the one or more objects. The processor 210 may store the object information with respect to the one or more objects in the memory 218. Also, the processor 210 may search for and use the necessary object information stored in the memory 218.

The UWB device 110 may provide a UWB communication function. The UWB device 110 may be realized in the form of a mobile device. A user may possess the UWB device 110 in his or her hand and may arrange the UWB device 110 at a desired position. For example, the UWB device 110 may be realized as a smart tag, a smartphone, a smart watch, a vehicle smart key, or the like.

The UWB device 110 may include an input interface 232 and a UWB module 234. The input interface 232 may receive an input from a user. The input interface 232 may be realized, for example, in the form of a button, a key, a dial, a touch screen, a touch pad, etc. According to an embodiment of the disclosure, the input interface 232 may be realized in the form of a button, a key, a dial, etc. which may be identified through the sense of touch. For example, the input interface 232 may be realized in the form of a protrusion-type button, key, dial, etc.

The UWB module 234 may generate and output a UWB signal. The UWB module 234 may generate and output the UWB signal including a time stamp. When a first control signal is received from the input interface 232, the UWB module 234 may generate and output the UWB signal. The UWB module 234 may be activated by the first control signal.

The input interface 232 may generate the first control signal when a user presses a button or a key. Also, for example, the input interface 232 may generate the first control signal when a user manipulates a GUI of the touch screen. Also, for example, the input interface 232 may generate the first control signal when a user manipulates the dial, the touch pad, etc.

According to an embodiment, the UWB device 110 may further include a processor (not shown). The UWB device 110 may provide the processor and may process an input of the input interface 232 and control the UWB module 234.

Figure 4:
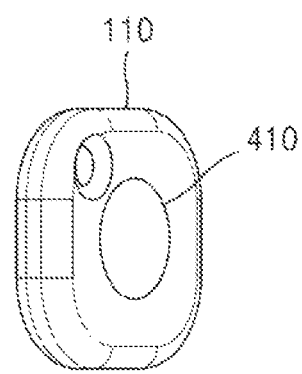
FIG. 4 is a diagram showing a structure of a UWB device 110 according to an embodiment of the disclosure.

FIG. 4 is a diagram showing a structure of the UWB device 110 according to an embodiment of the disclosure.

The UWB device 110 according to an embodiment of the disclosure may be realized in the form of a smart tag. A user may hold the UWB device 110 in his or her hand and may place the UWB device 110 at a desired position in the refrigerator 100.

The UWB device 110 may include a button 410 in the center thereof. When the user presses the button 410, the UWB device 110 may generate a first control signal, and based on the first control signal, the UWB module 234 may generate and output a UWB signal.

Figure 5:
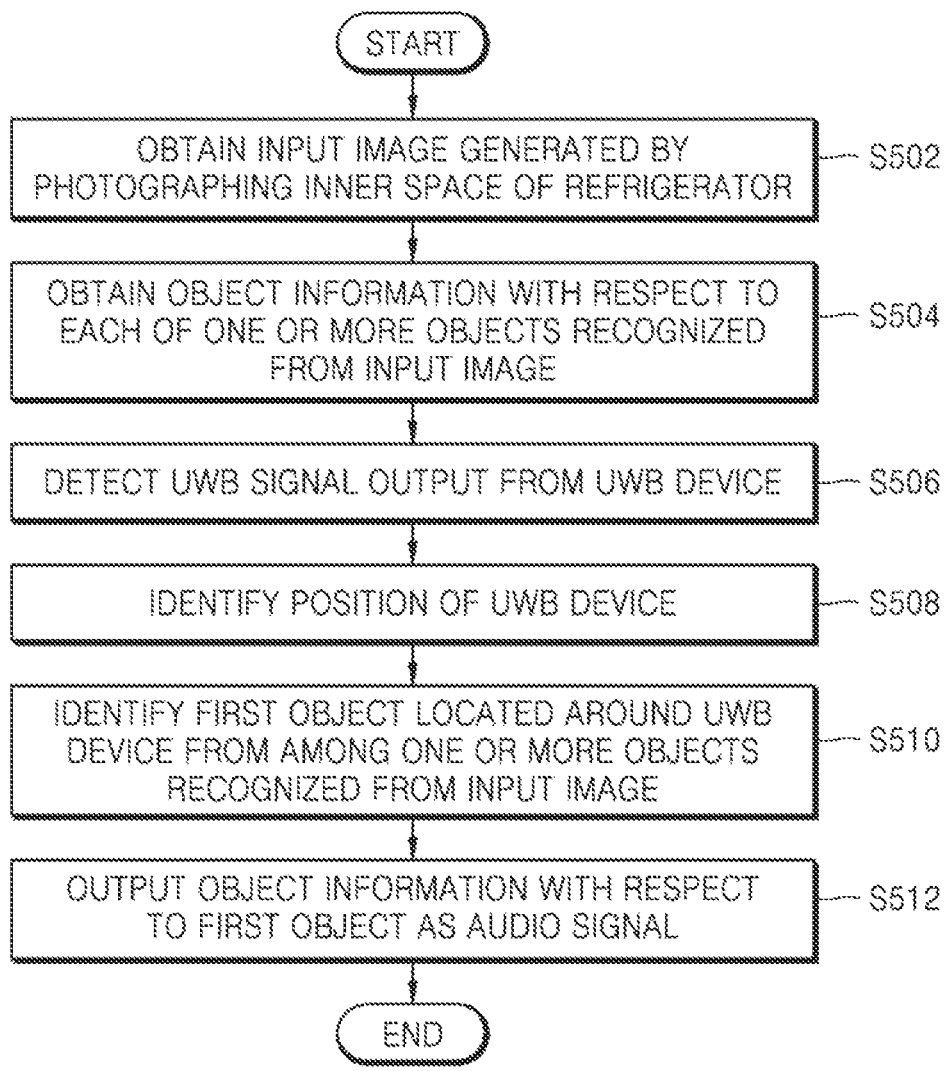
FIG. 5 is a flowchart of a control method for a refrigerator, according to an embodiment of the disclosure.

FIG. 5 is a flowchart of a control method for a refrigerator, according to an embodiment of the disclosure.

Each of operations included in the control method for the refrigerator, according to an embodiment of the disclosure, may be performed by various forms of refrigerators having a UWB module. In the present disclosure, an embodiment, according to which the refrigerator 100 according to embodiments of the disclosure performs the control method for the refrigerator, is mainly described. Therefore, the embodiments described with respect to the refrigerator 100 may be applied to the embodiments with respect to the control method for the refrigerator, and reversely, the embodiments described with respect to the control method for the refrigerator may be applied to the embodiments with respect to the refrigerator 100. The control method for the refrigerator according to the embodiments disclosed is not limited to the control method performed by the refrigerator 100 disclosed in this disclosure. Rather, the control method for the refrigerator according to the embodiments may be performed by various forms of refrigerators.

In operation S502, the refrigerator 100 may obtain an input image generated by photographing an inner space of the refrigerator. The refrigerator 100 may use the camera 212 to obtain the input image generated by photographing the inner space of the refrigerator. A FOV of the camera 212 may be set to photograph the container 330 in the refrigerator 110. The camera 212 may have the FOV including the shelf area 332 of the container 330. The camera 212 may photograph the inner space of the refrigerator 100, when the doors 320*a* and 320*b* of the refrigerator are closed. The processor 210 may generate the input image from an image signal captured by the camera 212. The processor 210 may crop a portion corresponding to the shelf area 332 from an image generated from the image signal and may correct distortion of the image to generate the input image corresponding to the shelf area 332.

Next, in operation S504, the refrigerator 100 may obtain object information with respect to each of objects recognized from the input image. The processor 210 may obtain the object information from the input image, by using a predetermined object recognition algorithm or object recognition machine-learning model. According to an embodiment, the processor 210 may obtain the object information from the input image, by performing an object recognition algorithm or an object recognition machine-learning model stored in the memory 218. Also, according to an embodiment, the processor 210 may obtain the object information from the input image by using an object recognition model performed by the server 120. The processor 210 may transmit the input image to the server 120 and request the object information, and then, may obtain the object information from the server 120.

The processor 210 or the server 120 may recognize one or more objects from the input image. The processor 210 or the server 120 may recognize an object corresponding to a pre-defined class from the input image. The pre-defined class may correspond to a type of food and beverage stored in the refrigerator 100. For example, the pre-defined class may include a salad, an onion, a carrot, a potato, an apple, grapes, a fish, bacon, a container, a water-bottle, flesh, etc. Also, the pre-defined class may include a class indicating an object not defined. With respect to each object, the processor 210 or the server 120 may generate the object information including at least one of an object area coordinate, an object type, or a product name or a combination thereof. The processor 210 may store the generated object information in the memory 218.

Next, in operation S506, the refrigerator 100 may detect a UWB signal output from the UWB device 110. When a first control signal is input through the input interface 232, the UWB device 110 may output the UWB signal from the UWB module 234. The refrigerator 100 may detect the UWB signal output from the UWB device 110. The refrigerator 100 may detect the UWB signal by using the first antenna 312*a* and the second antenna 312*b* provided in the UWB module 214. The UWB module 214 may detect a first UWB signal by using the first antenna 312*a* and a second UWB signal by using the second antenna 312*b*.

According to an embodiment of the disclosure, the refrigerator 100 may activate the UWB module 214 and detect the UWB signal, when door opening is detected. The refrigerator 100 may maintain the UWB module 214 in an inactive state by blocking a power supply thereto while a door of the refrigerator 100 is being closed, and when the door opening of the refrigerator 100 is detected, the refrigerator 100 may supply power to the UWB module 214 to change the UWB module 214 to be in an active state.

Next, in operation S508, the refrigerator 100 may identify a position of the UWB device 100. The UWB module 214 or the processor 210 may calculate a first distance between the UWB device 100 and the first antenna 312*a* by using the first UWB signal detected from the first antenna 312*a*. Also, the UWB module 214 or the processor 210 may calculate a second distance between the UWB device 100 and the second antenna 312*b* by using the second UWB signal detected from the second antenna 312*b*. The processor 210 may calculate a physical coordinate indicating the position of the UWB device 110 in the container 330 of the refrigerator 100, based on the first distance and the second distance. The physical coordinate may be a two-dimensional coordinate. For example, the processor 210 may define the physical coordinate in a two-dimensional coordinate system defined by an x axis and a y axis orthogonal to each other. An xy plane on the coordinate system may correspond to a plane in a direction toward the container 330 from the camera 212.

Next, in operation S510, the refrigerator 100 may identify a first object located in the vicinity of the UWB device 110 from among the objects recognized from the input image. The refrigerator 100 may recognize an area coordinate of each object from the input image. The area coordinate of each object may be defined by a coordinate of the input image. The coordinate of the input image may be defined by counting the number of pixels of the input image with respect to a predetermined structure (e.g., an upper surface, a left-side surface, a right-side surface, a bottom surface of a shelf, etc. of the container 330) in the input image. Also, the refrigerator 100 may pre-store physical length information of the container 330 of the refrigerator 100. For example, the refrigerator 100 may pre-store information about a width and a height of the container 330 in the memory 218. The refrigerator 110 may convert the coordinate of the input image into a physical coordinate or may convert the physical coordinate into the coordinate of the input image, based on a length of the container 330 in the input image or the pre-stored physical length information of the container 330. The refrigerator 100 may convert the area coordinate of each object into a physical coordinate and compare the physical coordinate of each object with the physical coordinate of the UWB device 110.

The refrigerator 100 may compare the physical coordinate of each object with the physical coordinate of the UWB device 110 and may identify a first object around the UWB device 110. The refrigerator 100 may identify the first object based on a predetermined reference. According to an embodiment, the refrigerator 100 may identify an object having a least distance to the UWB device 110 as the first object. Also, according to an embodiment, the refrigerator 100 may identify an object having a least distance from among objects located in the same partition of the container 330 as the first object. Also, according to an embodiment, the refrigerator 100 may identify the UWB device 110 in which the user places the UWB device 110 as the first object.

Next, in operation S512, the refrigerator 100 may output the object information with respect to the first object as an audio signal. The refrigerator 100 may generate an audio message by using the object information of the first object. According to an embodiment, the refrigerator 100 may generate the audio message by using a type or a product name of the first object. For example, the refrigerator 100 may generate the audio message that "there is a yellowish green pot." Also, for example, the refrigerator 100 may generate the audio message by using information indicating a direction of the first object together with the type or the product name of the first object. The direction information may be generated by defining a right side, a left side, a top side, and a bottom side in a direction from the outside of the refrigerator 100 toward the container 330. For example, the refrigerator 100 may generate the audio message that "there is a yellowish green pot on the right side." The refrigerator 100 may output the audio message as an audio signal by using the speaker 216.

Figure 6:
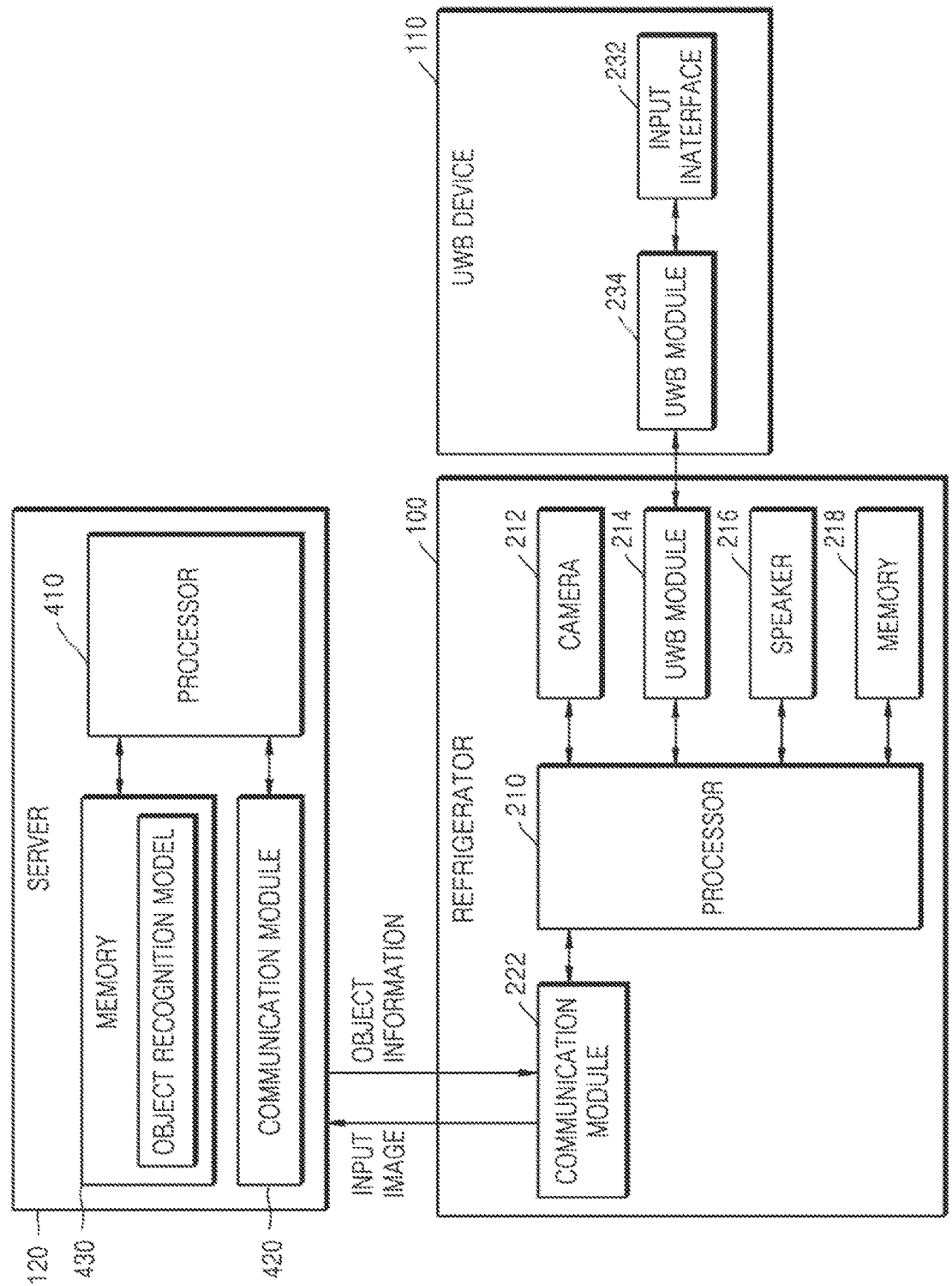
FIG. 6 is a diagram showing a refrigerator, a UWB device, and a server, according to an embodiment of the disclosure.

FIG. 6 is a diagram showing a refrigerator, a UWB device, and a server, according to an embodiment of the disclosure.

According to an embodiment of the disclosure, the refrigerator 100 may communicate with the server 120 through a network. The refrigerator 100 may transmit an input image to the server 120 and request object information from the server 120. The server 120 may receive the input image from the refrigerator 100 and recognize an object from the input image. The server 120 may transmit object information generated from the input image to the refrigerator 100. The refrigerator 100 may have a limited resource, and thus, it may be difficult for the refrigerator 100 to execute a machine-learning model for object recognition. To this end, the refrigerator 100 may obtain the object information by using a machine-learning model of the server 120.

The refrigerator 100 may include the processor 210, the camera 212, the UWB module 214, the speaker 216, the memory 218, and a communication module 222. Operations of the camera 212, the UWB module 214, the speaker 216, and the memory 218 of the refrigerator 100 are the same as described above with reference to FIG. 2, and thus, the same descriptions are omitted. In FIG. 6, operations of the communication module 222 and the processor 210 from among the elements of the refrigerator 100 are mainly described.

The communication module 222 may communicate with an external device by wire or wirelessly. The communication module 222 may access an access point (AP) device and transmit and receive a wireless fidelity (Wifi) signal to and from the AP device. The processor 210 may control a transmission and reception operation of the communication module 222.

The communication module 222 may include a wireless communication module (for example, a cellular communication module, a near-field communication module, or a global navigation satellite system (GNSS) communication module) or a wired communication module (for example, a local area network (LAN) communication module or a power line communication module). Also, the communication module 222 may perform short-range communication and may use, for example, Bluetooth, Bluetooth low energy (BLE), near-field communication, wireless LAN (WLAN) (or Wifi), Zigbee, infrared data association (IrDA) communication, Wifi direct (WFD), UWB, Ant+ communication, etc. Also, for example, the communication module 222 may perform remote communication and may communicate with an external device through for example a legacy cellular network, a 5th generation (5G) network, a next-generation communication network, the Internet, a computer network (for example, a LAN or a wide area network (WAN)), or the like.

Also, for example, the communication module 222 may use mobile communication and may transmit and receive a wireless signal to and from at least one of a base station, an external terminal, and a server on a mobile communication network.

The communication module 222 may communicate with the server 120. According to an embodiment, the communication module 222 may be connected to an AP device in a household through Wifi communication. The communication module 222 may communicate with the server 120 through the AP device.

The communication module 222 may transmit an input image and a request for object information to the server 120. Also, the communication module 222 may receive the object information from the server 120.

The processor 210 may generate the input image from an image signal captured by the camera 212. The processor 210 may generate the input image and the request for the object information and transmit the input image and the request for the object information to the server 120 through the communication module 222. The request for the object information may include at least one of identification information of the refrigerator 100, authentication information, or information indicating a request for the object information or a combination thereof.

The server 120 may correspond to an AI server configured to execute a machine-learning object recognition model. In addition to the AI server, the refrigerator 100 may communicate with various types of servers, such as an IoT server configured to provide an IoT service, a setup server configured to process an initial registration process of a product, etc. The AI server may be realized as a server separate from the IoT server, the setup server, etc.

The server 120 may include a processor 410, a communication module 420, and a memory 430.

The processor 410 may control general operations of the server 120. The processor 410 may be realized as one or more processors. The processor 410 may perform a predetermined operation by executing an instruction or a command stored in the memory 430. Also, the processor 410 may control operation of the elements included in the server 120. The processor 410 may include at least one of a CPU, a GPU, or an NPU or a combination thereof.

The communication module 420 may communicate with an external device by wire or wirelessly. The processor 410 may control a transmission and reception operation of the communication module 420.

The communication module 420 may include a wireless communication module (for example, a cellular communication module, a near-field communication module, or a GNSS communication module) or a wired communication module (for example, a LAN communication module or a power line communication module). Also, the communication module 420 may perform short-range communication and may use, for example, Bluetooth, BLE, near-field communication, WLAN (or Wifi), Zigbee, IrDA communication, WFD, UWB, Ant+ communication, etc. Also, for example, the communication module 420 may perform remote communication and may communicate with an external device through for example a legacy cellular network, a 5G network, a next-generation communication network, the Internet, a computer network (for example, a LAN or a WAN), or the like.

The communication module 420 may receive the input image and the request for the object information from the refrigerator 100. Also, when the object information is generated by the processor 410, the communication module 420 may transmit the object information to the refrigerator 100.

The memory 430 may store various information, data, instructions, programs, etc. required for the operations of the server 120. The memory 430 may include at least one of a volatile memory or a non-volatile memory or a combination thereof. The memory 430 may include a storage medium of at least one of a flash memory-type, a hard disk-type, a multimedia card micro-type, a card-type memory (for example, SD or XD memory), RAM, SRAM, ROM, EEPROM, PROM, a magnetic memory, a magnetic disk, or an optical disk. Also, the memory 430 may correspond to a web storage or a cloud server performing a storage function on the Internet.

The memory 430 may store an instruction or a computer program code of a machine-learning object recognition model. The processor 410 may execute the object recognition model stored in the memory 430 and perform an operation of the object recognition model. When the processor 410 receives the input image and the request for the object information, the processor 410 may input the input image and the request for the object information to the object recognition model. The processor 410 may obtain the object information corresponding to the input image from the object recognition model. The object information may include at least one of area information, a type, or a product name of an object or a combination thereof. When the object information is generated, the processor 410 may transmit the object information to the refrigerator 100 by referring to an address of the refrigerator 100 included in the request for the object information.

FIG. 7 is a diagram showing a time point at which an input image and object information are obtained, according to an embodiment of the disclosure.

According to an embodiment of the disclosure, the refrigerator 100 may capture an input image and may obtain object information corresponding to the input image at a predetermined time point. FIG. 7 is described assuming a case where a user opens the door 320*a* of the refrigerator 100, and after the user maintains the door 320*a* of the refrigerator 100 in an open state for a predetermined time period, the user closes the door 320*a* of the refrigerator. The refrigerator 100 may provide a door opening and closing sensor and may sense opening and closing of the door 320*a*.

According to an embodiment of the disclosure, the refrigerator 100 may photograph an inner space of the refrigerator 100 to generate an input image and may transmit the input image to the server 120 and obtain object information, at night time. The night time may be pre-defined, for example, as between 2 am and 5 am. When the refrigerator 100 transmits the input image to the server 120 and obtains the object information from the server 120, a delay for communication with the server 120 may occur or a delay due to a data processing load of the server 120 may occur. According to an embodiment of the disclosure, by obtaining the input image and obtaining the object information with respect to the input image from the server 120, at night time, it may be possible to prevent the delay for obtaining the object information. Also, according to an embodiment of the disclosure, because the object information may be obtained in advance, it may be possible to provide the object information in real time without a delay when a user uses the refrigerator 100.

Also, according to an embodiment of the disclosure, the refrigerator 100 may obtain the input image and the object information when the refrigerator 100 senses a door-opening operation. However, when the camera 212 is mounted on the door 320*a*, it is not possible to capture the input image while the door is being open, and thus, when an event of opening the door 320*a* takes place, the refrigerator 100 may obtain the input image and the object information after the refrigerator 100 senses a door-closing operation.

Also, according to an embodiment of the disclosure, when a first reference time Tref1 has passed while the door 320*a* is being open, the refrigerator 100 may obtain the input image and the object information. However, when the camera 212 is mounted on the door 320*a*, it is not possible to capture the input image while the door is being open, and thus, when an event takes place, in which the first reference time Tref1 has passed while the door 320*a* is being open, the refrigerator 100 may obtain the input image and the object information after the refrigerator 100 senses a door-closing operation.

Also, according to an embodiment of the disclosure, the refrigerator 100 may obtain the input image and the object information when a second reference time Tref2 has passed after the refrigerator 100 sense the door-closing operation. When the second reference time Tref2 has passed after the refrigerator 100 sense the door-closing operation, the refrigerator 100 may capture the input image and obtain, from the server 120, the object information.

Figure 8:
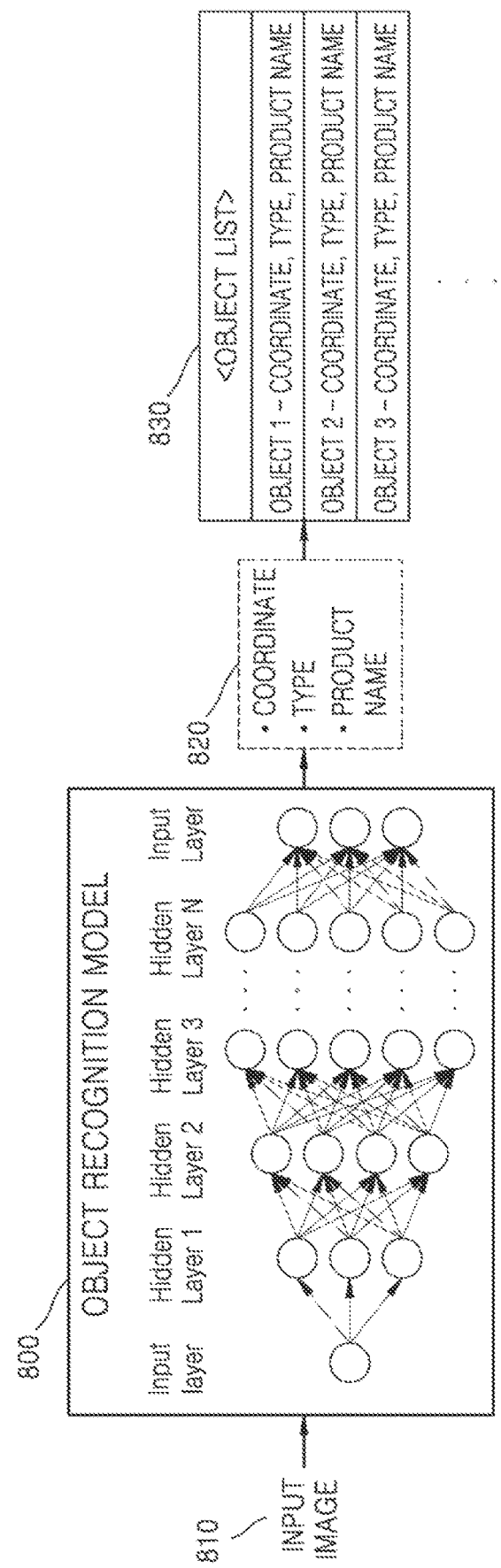
FIG. 8 is a diagram showing an object recognition model and an input and an output, according to an embodiment of the disclosure.

FIG. 8 is a diagram showing an object recognition model and an input and an output, according to an embodiment of the disclosure.

According to an embodiment of the disclosure, the refrigerator 100 or the server 120 may obtain object information 820 from an input image 810 by using a machine-learning object recognition model 800.

The object recognition model 800 may be a machine-learning model configured to recognize an object of a pre-defined class. The refrigerator 100 or the server 120 may use the input image 810 as input data of the object recognition model 800 and may obtain output data generated by recognizing an object in the input image 810. The object recognition model 800 may be generated through learning. Here, to be formed through learning denotes that the default object recognition model 800 is trained by using a plurality of pieces of learning data through a learning algorithm so as to form a predefined operation rule or AI model configured to perform a desired feature (or purpose). The object recognition model 800 may include a plurality of neural network layers. The plurality of neural network layers may respectively have a plurality of weight values and may perform calculation using a calculation result of a previous layer and the plurality of weight values.

The object recognition model 800 may include an input layer, one or more hidden layers Hidden Layer 1, Hidden Layer 2, Hidden Layer 3, . . . , and Hidden Layer N, and an output layer. Through the plurality of layers, the object recognition model 800 may generate a feature map of the input image 810 and may detect a predetermined class from the feature map. Also, the object recognition model 800 may generate and output the object information 820 corresponding to the predetermined class detected from the input image 810. The object information 820 may include an area coordinate, a type, and a product name. The product name may be generated only in the case of an industrial product, and when information about the product name is not to be obtained, the information about the product name may not be obtained.

The object recognition model 800 may generate object list information 830 with respect to one or more objects recognized through the input image 810. When the object recognition model 800 recognizes the plurality of objects from the input image 810, the object recognition model 800 may generate the object list information 830 indicating a coordinate, a type, and a product name with respect to each object. The object list information 830 may include a plurality of pieces of object information 820. The refrigerator 100 or the server 120 may generate the object list information 830 and may use the plurality of pieces of object information 820 included in the object list information 830. When the server 120 obtains the object information, the server 120 may transmit the object list information 830 to the refrigerator 100.

Figure 9:
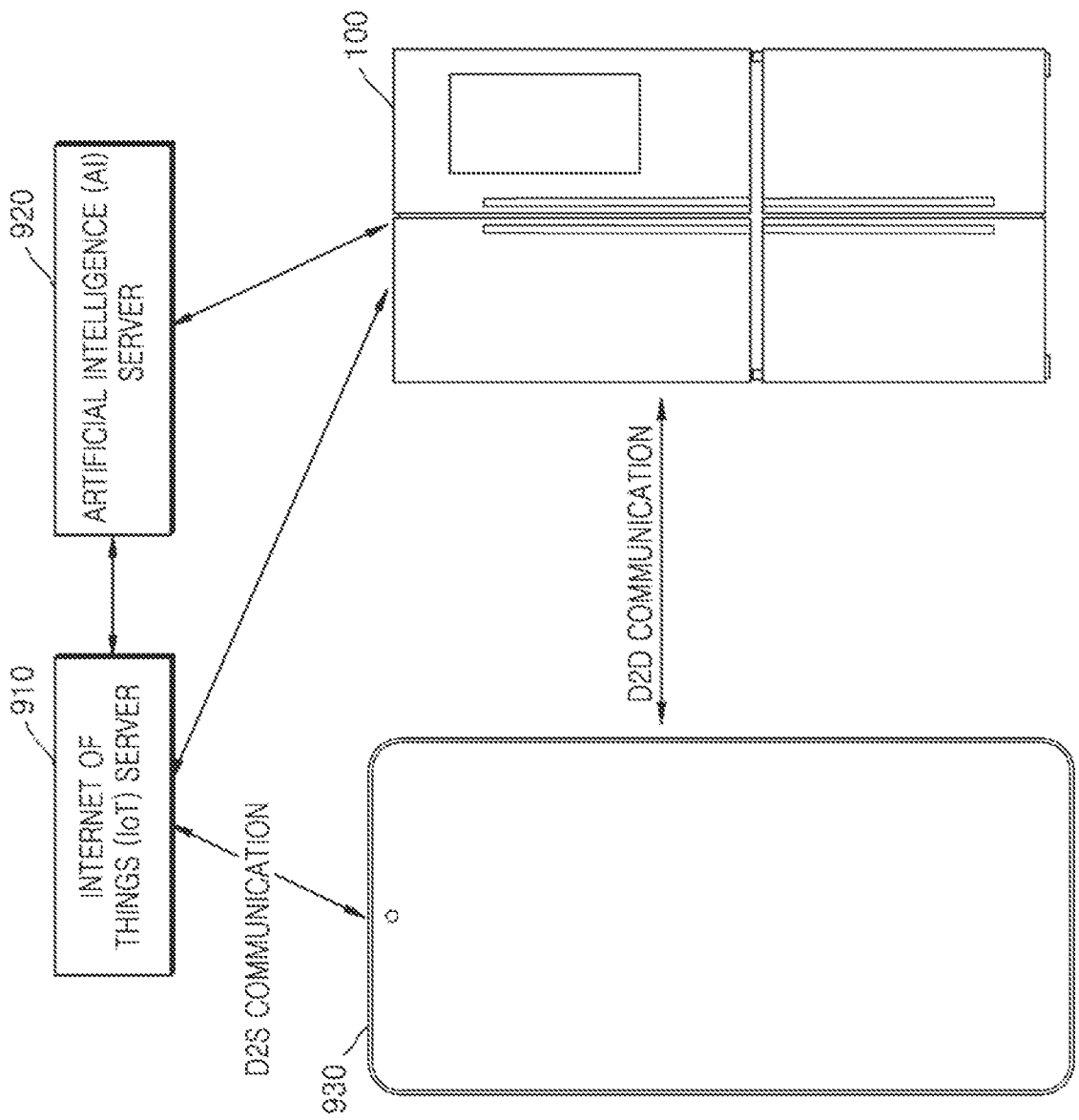
FIG. 9 is a diagram showing an Internet of things (IOT) server, an artificial intelligence (AI) server, a mobile device, and a refrigerator, according to an embodiment of the disclosure.

FIG. 9 is a diagram showing an IoT server, an AI server, a mobile device, and a refrigerator, according to an embodiment of the disclosure.

According to an embodiment of the disclosure, the refrigerator 100 may communicate with an IoT server 910 and an AI server 920. Also, a mobile device 930 may communicate with the IoT server 910. The mobile device 930 may monitor the refrigerator 100 and control the refrigerator 100 through the IoT server 910.

The IoT server 910 may be configured to register at least one home appliance, mobile device, etc. and provide a monitoring and controlling function with respect to the home appliance. The IoT server 910 may store information of each user account and may store information about the home appliance and the mobile device registered in each user account. Also, the IoT server 910 may perform a communication operation between the home appliance and the mobile device registered in the same user account. The home appliance and the mobile device may perform device to server (D2S) communication through the IoT server 910. Also, the IoT server 910 may perform a function provided through an IoT application executed by the mobile device 930 and may provide data provided through the IoT application to the mobile device 930.

The AI server 920 may provide an AI-related function requested by the refrigerator 100. The AI server 920 may correspond to the server 120 described above. The AI server 920 may receive an input image from the refrigerator 100, generate object information, and transmit the object information to the refrigerator 100.

The IoT server 910 and the AI server 920 may also perform direct communication between each other. According to an embodiment of the disclosure, the IoT server 910 may obtain the object information from the AI server 920 and may transmit the object information to the mobile device 930.

The mobile device 930 may execute the IoT application and may provide a monitoring and controlling function for the refrigerator 100 through the IoT application. The mobile device 930 may communicate with the IoT server 910 and may obtain monitoring information for the refrigerator 100 through the IoT server 910. Also, the mobile device 930 may control the refrigerator 100 through the IoT server 910.

According to an embodiment, when the mobile device 930 is registered in the same user account as the refrigerator 100 and when it is authenticated through the IoT server 910 that the mobile device 930 is registered in the same user account as the refrigerator 100, the mobile device 930 may establish device to device (D2D) communication with the refrigerator 100 and may communicate with the refrigerator 100 through the D2D communication. D2D communication may be performed by using, for example, Bluetooth, BLE, near field communication, WLAN, Zigbee, IrDA communication, WFD, UWB, or Ant+ communication.

The mobile device 930 may correspond to a smartphone, a tablet PC, a wearable device, etc.

Figure 10:
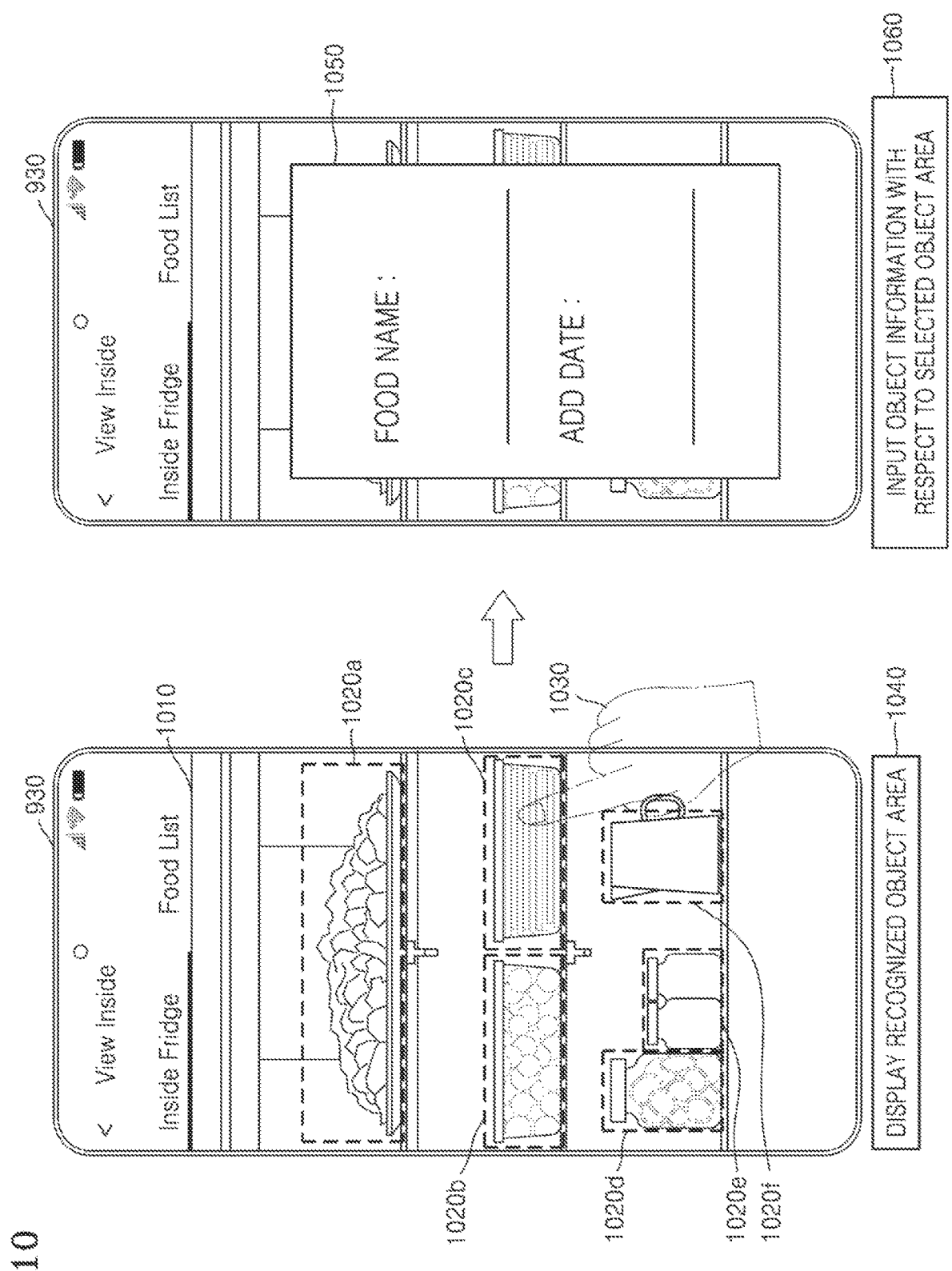
FIG. 10 is a diagram showing a method of inputting object information, according to an embodiment of the disclosure.

FIG. 10 is a diagram showing a method of inputting object information, according to an embodiment of the disclosure.

According to an embodiment of the disclosure, object information may be input through the mobile device 930. An input image may be transmitted from the refrigerator 100 to the AI server 920, and the object information may be generated by the AI server 920. The mobile device 930 may obtain the input image and the object information from the IoT server 910. The IoT server 910 may obtain the input image from the refrigerator 100. Also, the IoT server 910 may obtain the object information from the AI server 920 or the refrigerator 100.

In operation S1040, the mobile device 930 may execute an IoT application and may display an input image 1010 through the IoT application. Also, the mobile device 930 may display pieces of area information 1020*a*, 1020*b*, 1020*c*, 1020*d*, 1020*e*, and 1020*f* of objects on the input image 1010. The pieces of area information 1020*a*, 1020*b*, 1020*c*, 1020*d*, 1020*e*, and 1020*f* may be displayed in the form of indicators respectively indicating areas of the objects.

A user 1030 may select one of the pieces of area information 1020*a*, 1020*b*, 1020*c*, 1020*d*, 1020*e*, and 1020*f* in a GUI view displaying the pieces of area information 1020*a*, 1020*b*, 1020*c*, 1020*d*, 1020*e*, and 1020*f*. The user 1030 may select one of the pieces of area information 1020*a*, 1020*b*, 1020*c*, 1020*d*, 1020*e*, and 1020*f* and may input object information with respect to an object corresponding to the selected piece of area information.

In operation S1060, the mobile device 930 may provide an object information input GUI 1050 through which the user may input the object information corresponding to the selected object. The object information input GUI 1050 may include a GUI through which each item of the object information may be input. For example, the object information input GUI 1050 may include the GUI through which a food name and an adding date may be input. According to an embodiment, the mobile device 930 may receive the object information by using a sound recognition function.

The mobile device 930 may transmit the object information input through the object information input GUI 1050 to the IoT server 910. The IoT server 910 may transmit the object information input through the object information input GUI 1050 to the refrigerator 100. The refrigerator 100 may update object information stored in the memory 218 by using the object information received from the IoT server 910.

According to an embodiment of the disclosure, because a user may directly input the object information, it may be possible to obtain relatively more accurate object information. Also, when a person with vision impairment uses the refrigerator 100, a guardian may input the object information in advance through the mobile device 930, so that the person with vision impairment may hear the object information as an audio signal, according to embodiments of the disclosure. As described above, because the object information is input in advance, when a person visually impaired subsequently uses the refrigerator 100, the user may hear relatively more accurate object information as the audio signal.

Figure 11:
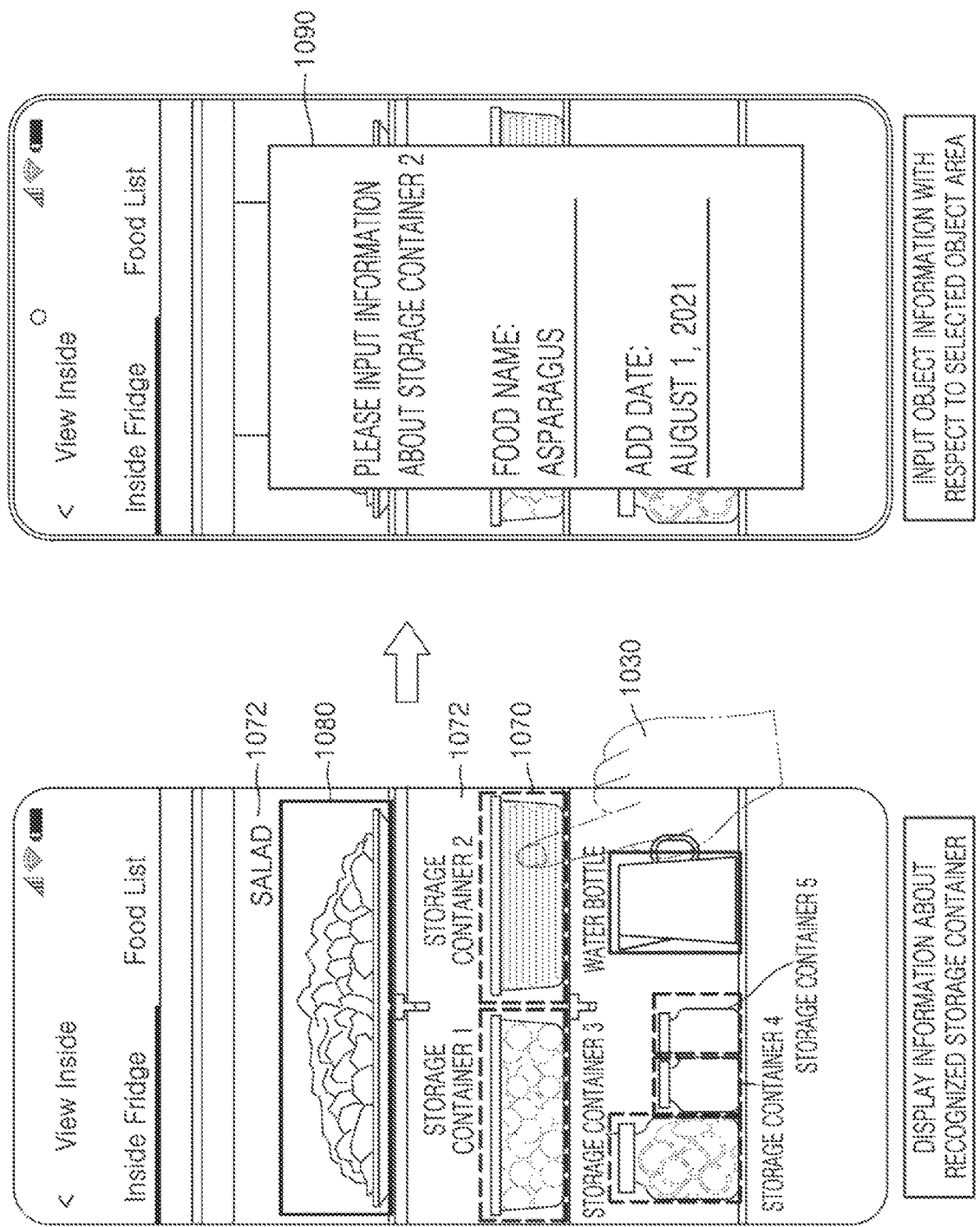
FIG. 11 is a diagram showing a method of inputting object information, according to an embodiment of the disclosure.

FIG. 11 is a diagram showing a method of inputting object information, according to an embodiment of the disclosure.

According to an embodiment of the disclosure, when a storage container is recognized in an input image, object information may be input through the mobile device 930. In the case of the storage container, it may be difficult to find out which food item is contained in the storage container only by using an image. When object information is to be obtained based on the input image, it may be difficult to provide actual information to a user, as a plurality of storage containers are arranged in the refrigerator 100. According to an embodiment of the disclosure, when a storage container is recognized, a user may input the object information through the mobile device 930, so as to provide, to a person with low vision, actual information with respect to foods in the refrigerator 100.

An input image may be transmitted from the refrigerator to the AI server 920, and object information may be generated by the AI server 920. The mobile device 930 may obtain the input image and the object information from the IoT server 910. The IoT server 910 may obtain the input image from the refrigerator 100. Also, the IoT server 910 may obtain the object information from the AI server 920 or the refrigerator 100.

When an IoT application of the mobile device 930 displays area information, the IoT application may display a storage container and an object which is not the storage container differently from each other. For example, an indicator 1070 of an object corresponding to the storage container may be displayed by a red line, and an indicator 1080 corresponding to the object which is not the storage container may be displayed by a gray line. Also, object type information 1072 may also be displayed on the indicators 1070 and 1080.

When a user 1030 selects the indicator 1070 of the storage container, the IoT application of the mobile device 930 may display a storage container object information adding GUI 1090. The storage container object information adding GUI 1090 may include a GUI for indicating information with respect to the storage container (Storage Container 2) and through which an object information item may be input. A user may input information about a food in the storage container, through the storage container object information adding GUI 1090. According to an embodiment, the mobile device 930 may receive the object information by using a sound recognition function.

The mobile device 930 may transmit the object information input through the storage container object information adding GUI 1090 to the IoT server 910. The IoT server 910 may transmit the object information input through the storage container object information adding GUI 1090 to the refrigerator 100. The refrigerator 100 may update the object information stored in the memory 218 by using the object information received from the IoT server 910.

Figure 12:
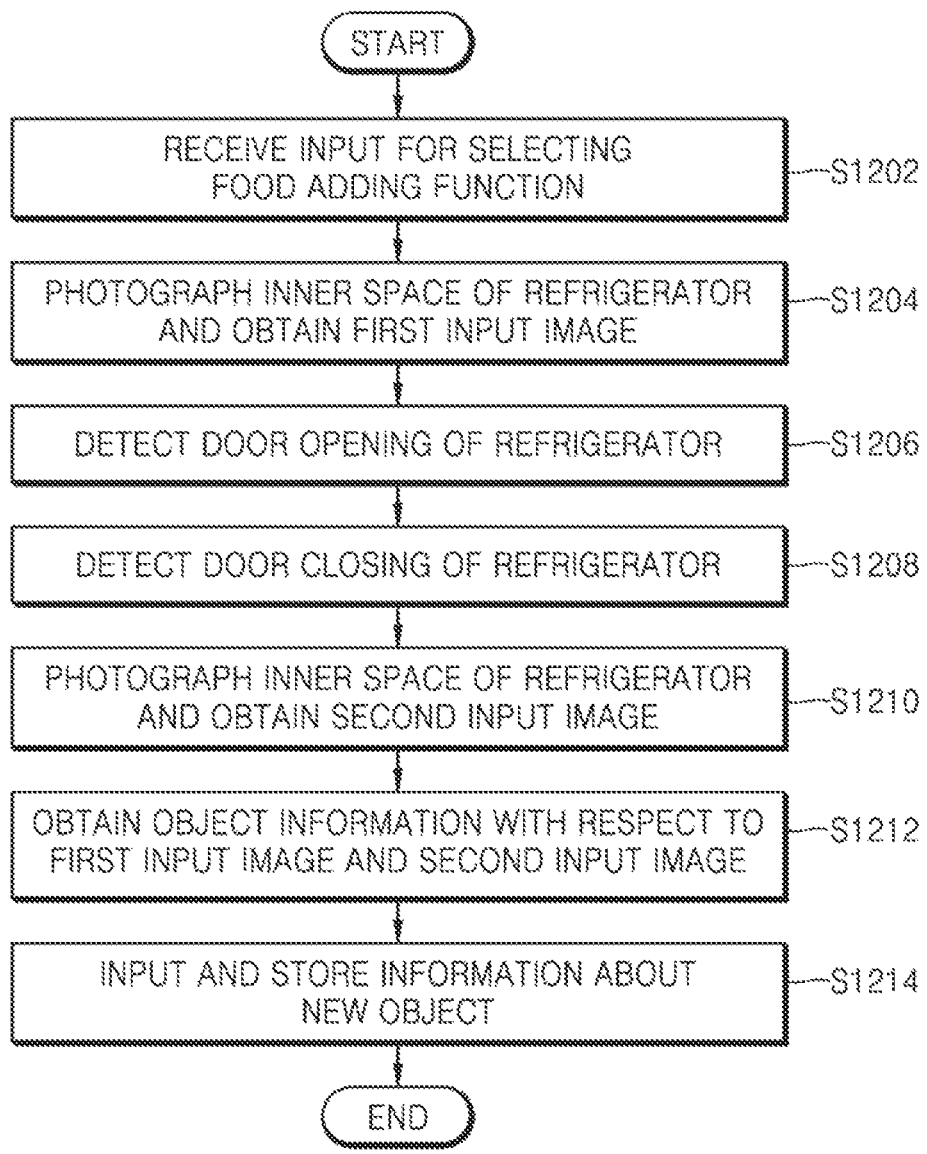
FIG. 12 is a flowchart illustrating a process of providing, via a refrigerator, a food adding function, according to an embodiment of the disclosure.

FIG. 12 is a flowchart of a process, performed by a refrigerator, of providing a food adding function, according to an embodiment of the disclosure.

According to an embodiment of the disclosure, the refrigerator 100 may provide a food adding function. A user may select the food adding function of the refrigerator 100 and may add a food and directly input object information. The refrigerator 100 may include an input and output interface and may provide a GUI for the food adding function through the input and output interface.

Figure 13:
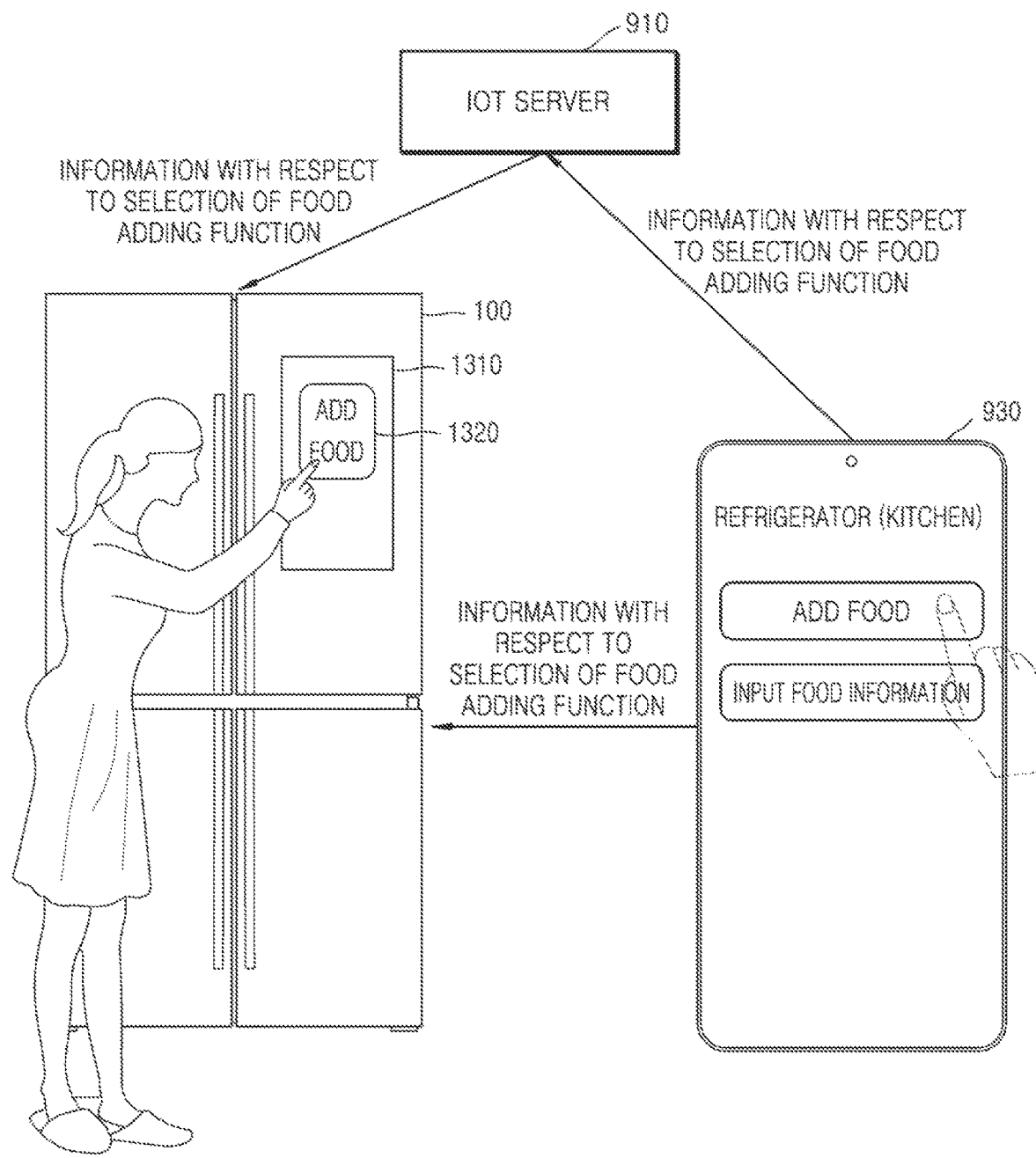
FIG. 13 is a diagram showing an example in which a food adding function is provided in a refrigerator, according to an embodiment of the disclosure.

In operation S1202, the refrigerator 100 may receive an input for selecting the food adding function through the input and output interface. Referring to FIG. 13, a process of receiving the input for selecting the food adding function is described.

FIG. 13 is a diagram showing an example in which afood adding function is provided in a refrigerator, according to an embodiment of the disclosure.

According to an embodiment of the disclosure, the refrigerator 100 may include an input and output interface 1310. The refrigerator 100 may provide, through the input and output interface 1310, a food adding function GUI 1320 through which a user may select the food adding function. When the user selects the food adding function while a door of the refrigerator 100 is being closed, the refrigerator 100 may activate the food adding function. According to an embodiment, the refrigerator 100 may receive an input for selecting the food adding function, by using a sound recognition function.

Also, according to an embodiment of the disclosure, the refrigerator 100 may receive the input for selecting the food adding function through the mobile device 930. The mobile device 930 may provide, through an IoT application, a GUI for selecting the food adding function of the refrigerator 100. According to an embodiment, the mobile device 930 may receive an input for selecting the food adding function, by using a sound recognition function.

When the mobile device 930 receives the input by a user for selecting the food adding function, the mobile device 930 may transmit information about the selection of the food adding function to the IoT server 910. When the IoT server 910 receives the information about the selection of the food adding function from the mobile device 930, the IoT server 910 may activate the food adding function. According to an embodiment, D2D communication may be established between the refrigerator 100 and the mobile device 930, and through the D2D communication, the information about the selection of the food adding function may be directly transmitted from the mobile device 930 to the refrigerator 100.

Figure 14:
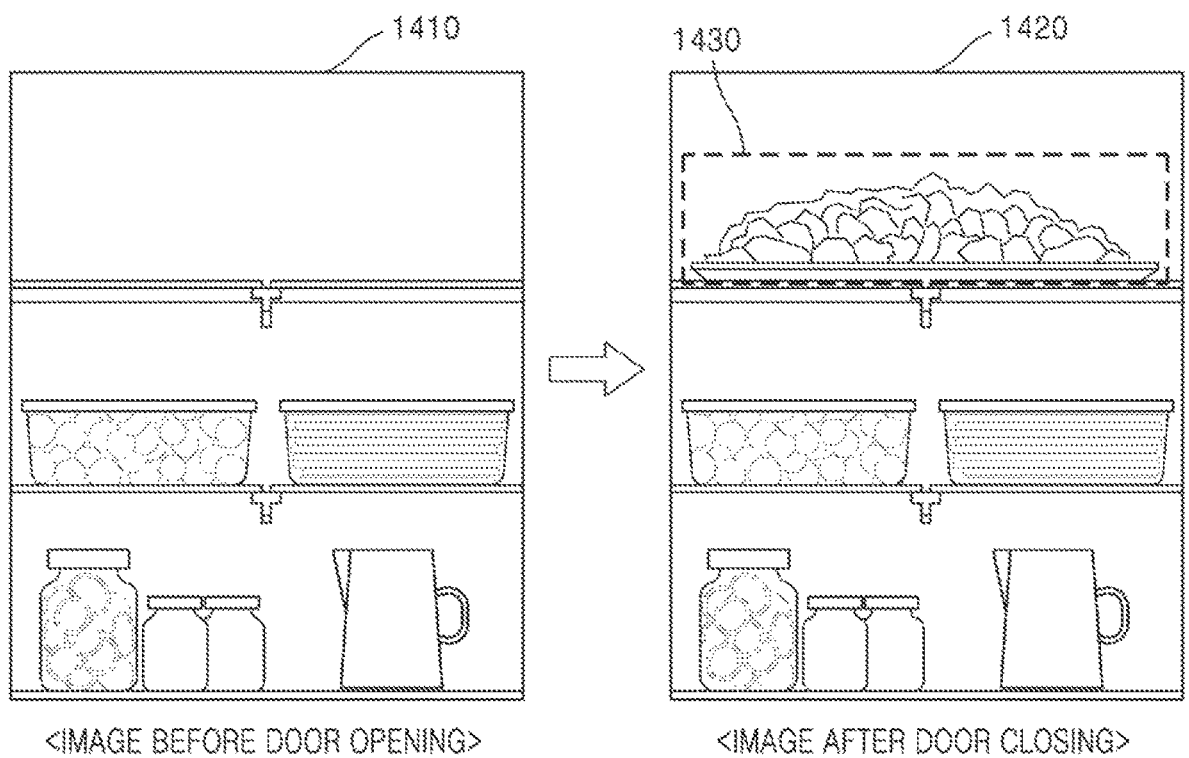
FIG. 14 is a diagram showing a first input image before door opening and a second input image after door closing, according to an embodiment of the disclosure.

Next, aspects with respect to the food adding function are described by referring to FIGS. 12 and 14.

FIG. 14 is a diagram showing a first input image before door opening and a second input image after door closing, according to an embodiment of the disclosure.

When the food adding function is selected, the refrigerator 100 may generate a first input image 1410 by photographing an inner space of the refrigerator 100, in operation S1204. Operation S1204 may be performed while a door of the refrigerator 100 is being closed. The refrigerator 100 may generate the first input image 1410 by photographing an inner space of the refrigerator 100 before a food item is added.

Next, in operation S1206, the refrigerator 100 may detect door opening of the refrigerator 100. In order to add a food item, a user may open the door of the refrigerator 100 and may add the food item in a container in the refrigerator 100.

Next, in operation S1208, the refrigerator 100 may detect door closing of the refrigerator 100. The user may close the door of the refrigerator 100 after adding the food item.

Next, in operation S1210, the refrigerator 100 may generate a second input image 1420 by photographing the inner space of the refrigerator 100. The second input image 1420 may indicate an inner space after the user adds the food item in the refrigerator 100.

Next, in operation S1212, the refrigerator 100 may obtain object information from the first input image 1410 and the second input image 1420. The refrigerator 100 may transmit the first input image 1410 and the second input image 1420 to the AI server 920 and may obtain the object information with respect to each image from the AI server 920.

According to an embodiment of the disclosure, the refrigerator 100 may compare the object information of the first input image 1410 with the object information of the second input image 1420 and may detect an added new object. The refrigerator 100 may provide the second input image 1420 and new object information 1430 through the input and output interface 1310 of the refrigerator 100.

Also, according to an embodiment of the disclosure, the refrigerator 100 may request the IoT server 910 to process the food adding function. The refrigerator 100 may transmit the first input image 1410, the object information of the first input image 1410, the second input image 1420, and the object information of the second input image to the IoT server 910. The IoT server 910 may compare the object information of the first input image 1410 with the object information of the second input image 1420 and may detect the added new object. The IoT server 910 may detect the new object and transmit information about the new object to the refrigerator 100. The information about the new object may be information for identifying an object corresponding to the new object, from among objects included in the object information of the second input image 1420. When the refrigerator 100 receives the object information, the refrigerator 100 may provide the second input image 1420 and new object information 1430 through the input and output interface 1310 of the refrigerator 100.

Next, in operation S1214, the refrigerator 100 may input and store the new object information.

According to an embodiment, the refrigerator 100 may receive the new object information through the input and output interface 1310. The input and output interface 1310 of the refrigerator 100 may provide a GUI through which a user may input the object information. Also, for example, the refrigerator 100 may receive the object information by using a sound recognition function.

Figure 15:
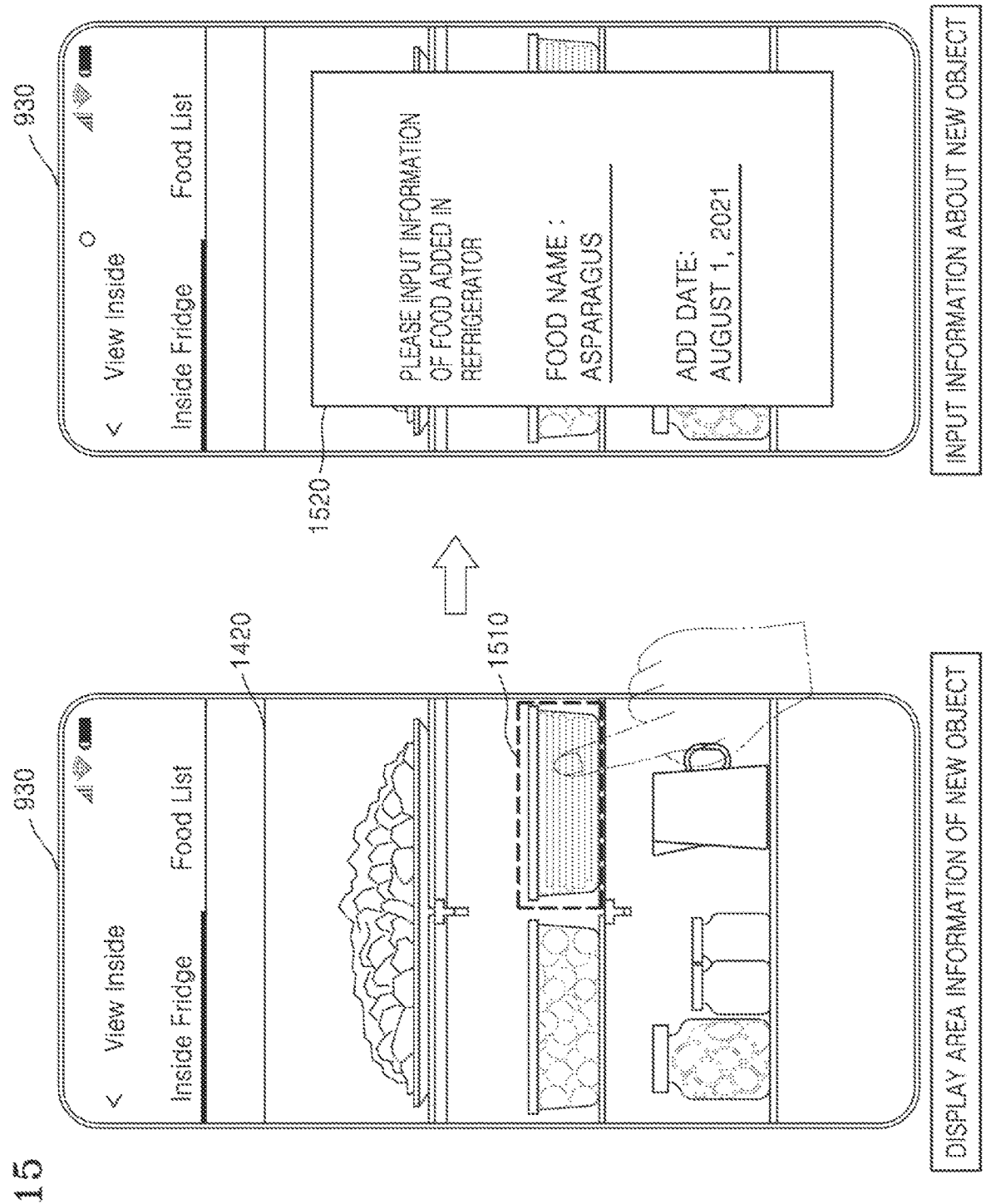
FIG. 15 is a diagram showing a process of receiving new object information, according to an embodiment of the disclosure.

FIG. 15 is a diagram showing a process of receiving new object information, according to an embodiment of the disclosure.

According to an embodiment of the disclosure, the mobile device 930 may display the second input image 1420 and a new object indicator 1510 through an IoT application. A user may select the new object indicator 1510 and may input object information with respect to a new object.

When the user selects the new object indicator 1510, the mobile device 930 may provide a new object information adding UI 1520. The mobile device 930 may receive the object information with respect to the new object through the new object information adding UI 1520. For example, the new object information may include a food name, an adding date, etc.

When the mobile device 930 receives the new object information, the mobile device 930 may transmit the new object information to the IoT server 910. The IoT server 910 may transmit the new object information received from the mobile device 930 to the refrigerator 100. When the new object information is received, the refrigerator 100 may update the object information with respect to the new object.

Also, for example, the mobile device 930 may transmit the new object information to the refrigerator 100 through D2D communication. When the new object information is received, the refrigerator 100 may update the object information with respect to the new object.

Figure 16:
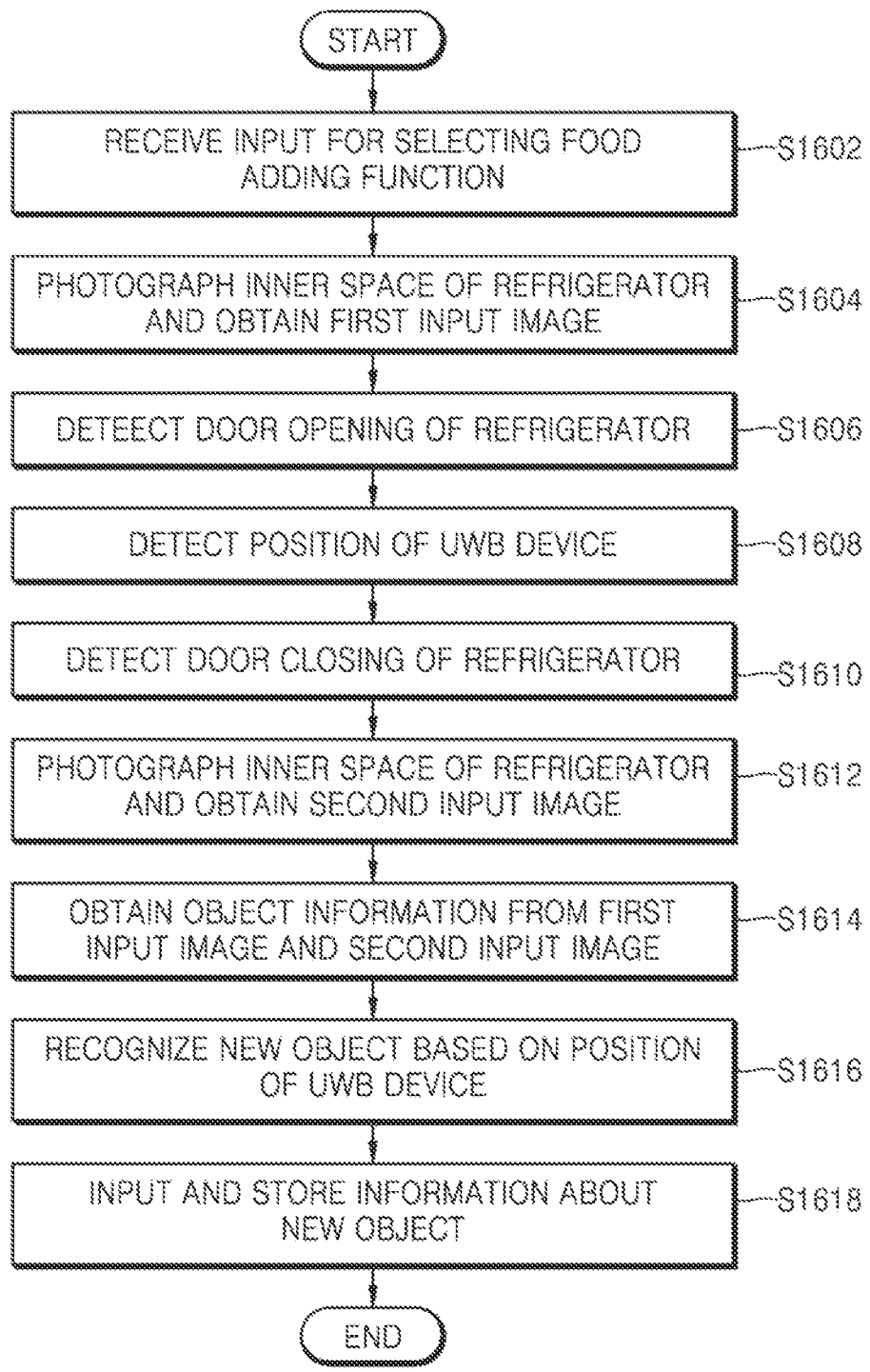
FIG. 16 is a flowchart of providing a food adding function by using a UWB device, according to an embodiment of the disclosure.
Figure 17:
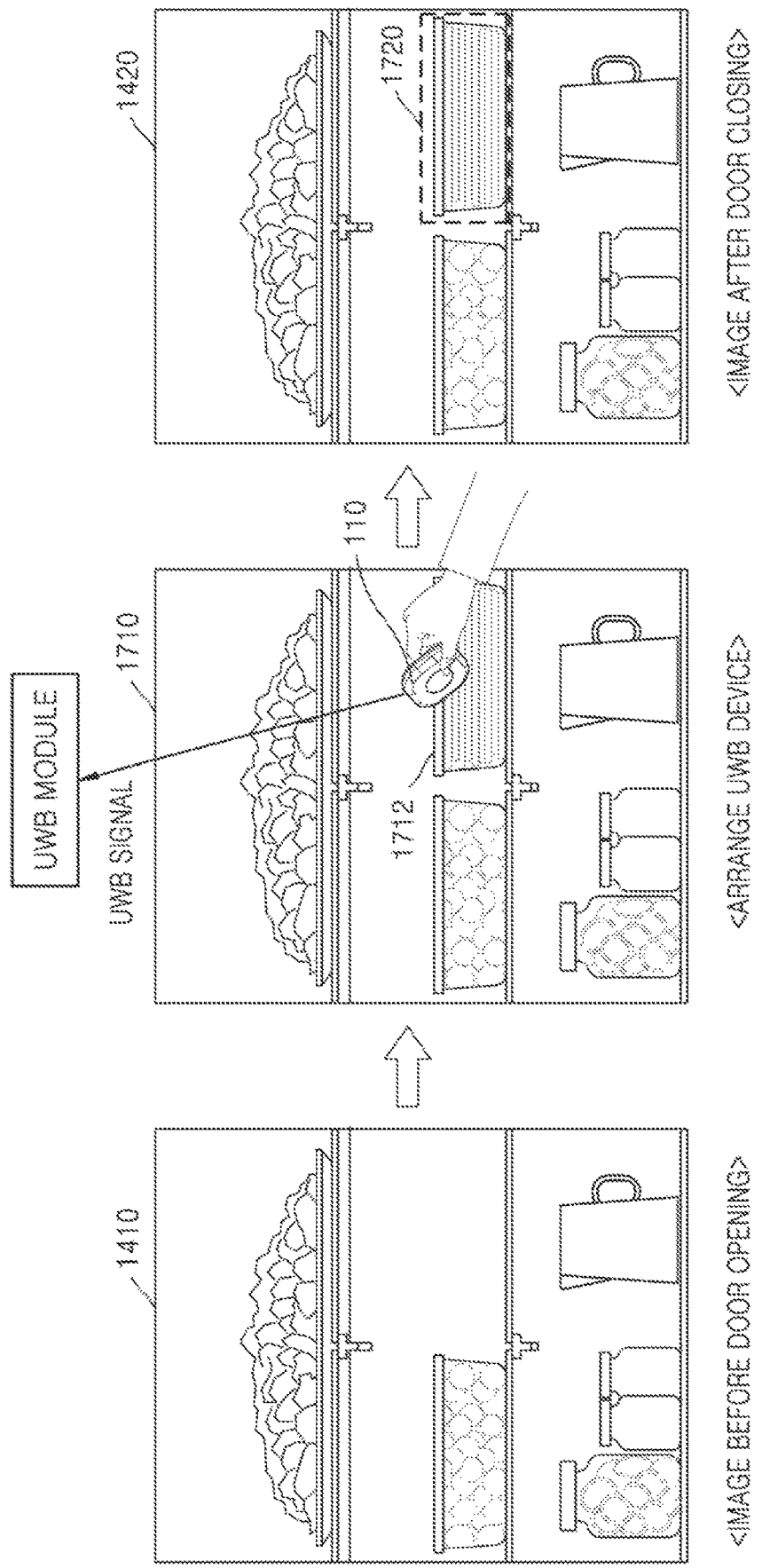
FIG. 17 is a diagram for describing a function of adding a food by using a UWB device, according to an embodiment of the disclosure.

FIG. 16 is a flowchart of providing a food adding function by using a UWB device, according to an embodiment of the disclosure. FIG. 17 is a diagram for describing a food adding function performed by using a UWB device, according to an embodiment of the disclosure. Referring to FIGS. 16 and 17, the process of providing the food adding function by using the UWB device 110 is described.

According to an embodiment of the disclosure, when the refrigerator 100 performs the food adding function, the refrigerator 100 may also obtain position information of a new food item by using the UWB device 110. When the user adds the new food item in the refrigerator 100, the user may arrange the UWB device 110 in the vicinity of the new food item and may accurately provide a position of the new food item to the refrigerator 100. Based on this configuration, the refrigerator 100 may relatively more accurately obtain information that a new food item is added and position information of the new food item.

In operation S1602, the refrigerator 100 may receive an input for selecting the food adding function. The input for selecting the food adding function may be received as described above with reference to FIGS. 12 and 13. By receiving the input for selecting the food adding function, the refrigerator 100 may perform the food adding function.

Next, in operation S1604, the refrigerator 100 may generate the first input image 1410 by photographing an inner space of the refrigerator 100. Operation S1604 may be substantially the same as operation S1204 of FIG. 12, and thus, its detailed description is omitted.

Next, in operation S1606, the refrigerator 100 may detect door opening of the refrigerator 100. A user may arrange a new food item in the container 330 of the refrigerator 100 and may arrange the UWB device 110 around the new food item while the doors 320*a* and 320*b* of the refrigerator 100 are being open. For example, as illustrated in operation 1710 of FIG. 17, the user may arrange a new food item 1712 in the container 330 in the refrigerator and may arrange the UWB device 110 in the vicinity of the new food item 1712.

Next, in operation S1608, the refrigerator 100 may detect a position of the UWB device 110. The user may generate a first control signal through the input interface 232 of the UWB device 110. Also, when the first control signal is input, the UWB device 110 may output an UWB signal. The refrigerator 100 may detect the UWB signal output from the UWB device 110. The UWB module 214 of the refrigerator 100 may detect the UWB signal output from the UWB device 110 and may detect the position of the UWB device 110. The refrigerator 100 may identify the position of the UWB device 100 as a position of the new food item.

Next, in operation S1610, the refrigerator 100 may detect door closing of the refrigerator.

Next, in operation S1612, the refrigerator 100 may photograph the inner space of the refrigerator 100 and may obtain the second input image 1420 while the door of the refrigerator is being closed. The second input image 1420 may indicate the inner space of the refrigerator 100 after the user adds the food item in the refrigerator 100.

Next, in operation S1614, the refrigerator 100 may obtain object information from the first input image 1410 and the second input image 1420. The refrigerator 100 may transmit the first input image 1410 and the second input image 1420 to the AI server 920 and may obtain the object information with respect to each image from the AI server 920.

Next, in operation S1616, the refrigerator 100 may recognize a new object corresponding to the position of the UWB device 110. According to an embodiment of the disclosure, the refrigerator 100 may obtain the object information of the second input image 1420 and may define an object of the second input image 1420, the object corresponding to the position of the UWB device 110, as the new object. According to the present embodiment, the refrigerator 100 may recognize the new object from the second input image 1420 based on the position information of the UWB device 110, without a process of comparing the object information of the first input image 1410 with the object information of the second input image 1420. When the refrigerator 100 receives object information, the refrigerator 100 may provide the second input image 1420 and new object information 1720 through the input and output interface 1310 of the refrigerator 100.

According to an embodiment of the disclosure, when the UWB device 110 is recognized when the door of the refrigerator is open, the refrigerator 100 may recognize the object from among objects recognized in the second input image, the object corresponding to the position of the UWB device 110, as the new object, without the process of comparing the object information of the first input image 1410 with the object information of the second input image 1420. When the UWB device 110 is not recognized when the door of the refrigerator is open, the refrigerator 100 may recognize the new object from the second input image 1420 by comparing the object information of the first input image 1410 with the object information of the second input image 1420.

Also, according to an embodiment of the disclosure, the refrigerator 100 may request the IoT server 910 to process the food adding function. The refrigerator 100 may transmit the first input image 1410, the object information of the first input image 1410, the second input image 1420, the object information of the second input image, and the position information of the UWB device 110 to the IoT server 910. The IoT server 910 may define an object from among objects recognized in the second input image 1420, the object corresponding to a position of the UWB device 110, as a new object. The IoT server 910 may detect the new object and transmit information about the new object to the refrigerator 100. The information about the new object may be information for identifying an object corresponding to the new object, from among objects included in the object information of the second input image 1420. When the refrigerator 100 receives the object information, the refrigerator 100 may provide the second input image 1420 and the new object information 1720 through the input and output interface 1310 of the refrigerator 100.

Next, in operation S1618, the refrigerator 100 may input and store the new object information. Operation S1618 may correspond to operation S1204 of FIG. 12, and thus, its detailed description is omitted.

Figure 18:
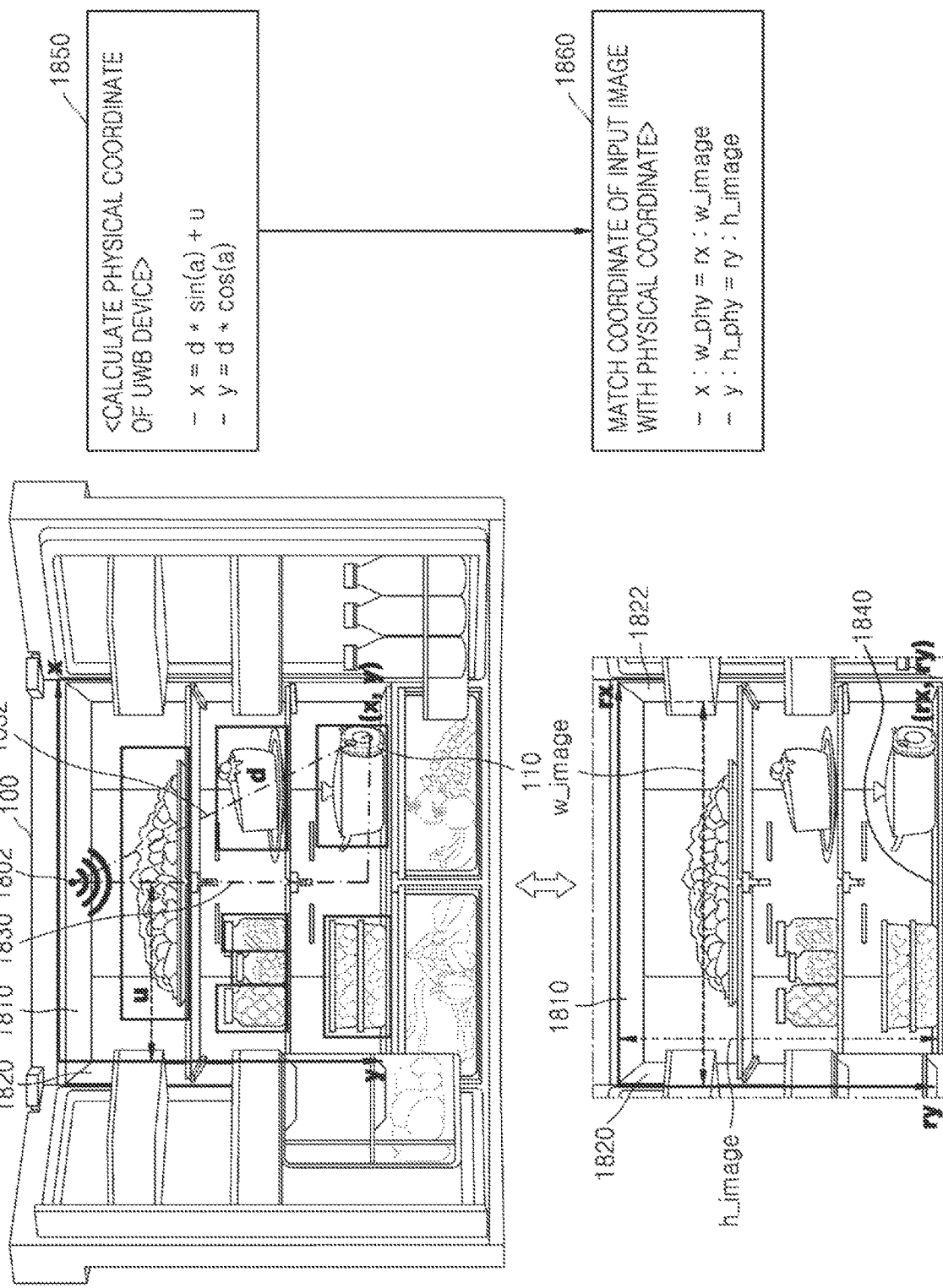
FIG. 18 is a diagram for describing a process of conversion between a coordinate of an input image and a physical coordinate, according to an embodiment of the disclosure.

FIG. 18 is a diagram for describing a process of conversion between a coordinate of an input image and a physical coordinate, according to an embodiment of the disclosure.

When the refrigerator 100 identifies position information of the UWB device 110, the refrigerator 100 may define a physical position of the UWB device 110 by using distance information d and angle information a between the UWB module 214 and the UWB device 110, wherein the distance information d and the angle information a are recognized by the UWB module 214. A physical position of the UWB device 110 may be defined as a physical coordinate (x, y). Area information included in object information obtained by the refrigerator 100 may indicate a coordinate (rx and ry) on the input image. Thus, the area information of the object may be defined as the image coordinate (rx and ry). However, the physical coordinate (x and y) and the image coordinate (rx and ry) are the coordinates defined on different coordinate systems from each other, and thus, in order to match the two coordinates, the two coordinates may have to be compared with each other on the same coordinate system. According to an embodiment, the refrigerator 100 may convert an object coordinate (rx1 and ry1) indicating the area information of the object information into a physical coordinate (x1 and y1) and may compare a position of an object recognized in the input image with the position of the UWB device 110. Also, according to an embodiment, the refrigerator 100 may convert a coordinate (x and y) of the UWB device indicating the position of the UWB device 110 into the image coordinate (rx and ry) and may compare the position of the object recognized in the input image with the position of the UWB device 110.

Next, a process 1850, performed by the refrigerator 100, of calculating a physical coordinate is described.

The refrigerator 100 may calculate a distance d from a reference point 1802 to the UWB device 110 by using the first antenna 312a and the second antenna 312b included in the UWB module 214. According to an embodiment, the reference point 1802 may be defined as a central point between the first antenna 312a and the second antenna 312b. The refrigerator 100 may calculate a first ToF value of a first UWB signal detected by the first antenna 312a by using time stamp information included in a UWB signal. The refrigerator 100 may calculate a distance d1 between the UWB device 110 and the first antenna 312a by using the first ToF value. Also, the refrigerator 100 may calculate a second ToF value of a second UWB signal detected by the second antenna 312b by using the time stamp information included in the UWB signal. The refrigerator 100 may calculate a distance d2 between the UWB device 110 and the second antenna 312b by using the second ToF value. The refrigerator 100 may calculate the distance d between the reference point 1802 and the UWB device 110 by using the distances d1 and d2.

Also, the refrigerator 100 may calculate angle information with respect to the position of the UWB device 110 by using the distances d1 and d2. The refrigerator 100 may calculate an angle α between a reference line 1830 perpendicularly extending from the reference point 1802 and a line 1832 connecting the reference point 1802 to the UWB device 110.

The refrigerator 100 may calculate the physical coordinate (x, y) of the UWB device 110 by using the distance d and the angle α. When a distance between a left side surface 1820 of the container 330 of the refrigerator 100 and the reference line 1830 is u, the physical coordinate (x, y) of the UWB device may be defined as represented by Equation 1.

$$x = d \times \sin(a) + u \qquad \text{[Equation 1]}$$
$$y = d \times \cos(a)$$

Next, a conversion process 1860 between an image coordinate and a physical coordinate, performed by the refrigerator 100, is described.

The refrigerator 100 may define a relationship between the image coordinate and the physical coordinate by recognizing, in an input image, two structures, physical distances of which are informed. According to an embodiment, the refrigerator 100 may pre-store an actual distance w_phy between the left side surface 1820 and a right side surface 1822 and an actual distance h_phy between an upper surface 1810 and a predetermined shelf 1840. Also, in the input image, the refrigerator 100 may obtain an image distance w_image between the left side surface 1820 and the right side surface 1822 and an image distance h_image between the upper surface 1810 and the predetermined shelf 1840. The refrigerator 100 may recognize the left side surface 1820, the right side surface 1822, the upper surface 1810, and the shelf 1840 in the input image. The refrigerator 100 may define the number of pixels between the left side surface 1820 and the right side surface 1822 recognized in the input image as the image distance w_image. Also, the refrigerator 100 may define the number of pixels between the upper surface 1810 and the shelf 1840 recognized in the input image as the image distance h_image. By using a relationship between the image coordinate and the physical coordinate as shown in Equation 2, the refrigerator 100 may perform conversion between the two coordinates.

$$x : \text{w\_phy} = rx : \text{w\_image} \quad \text{[Equation 2]}$$
$$y : \text{h\_phy} = ry : \text{h\_image}$$

Figure 19:
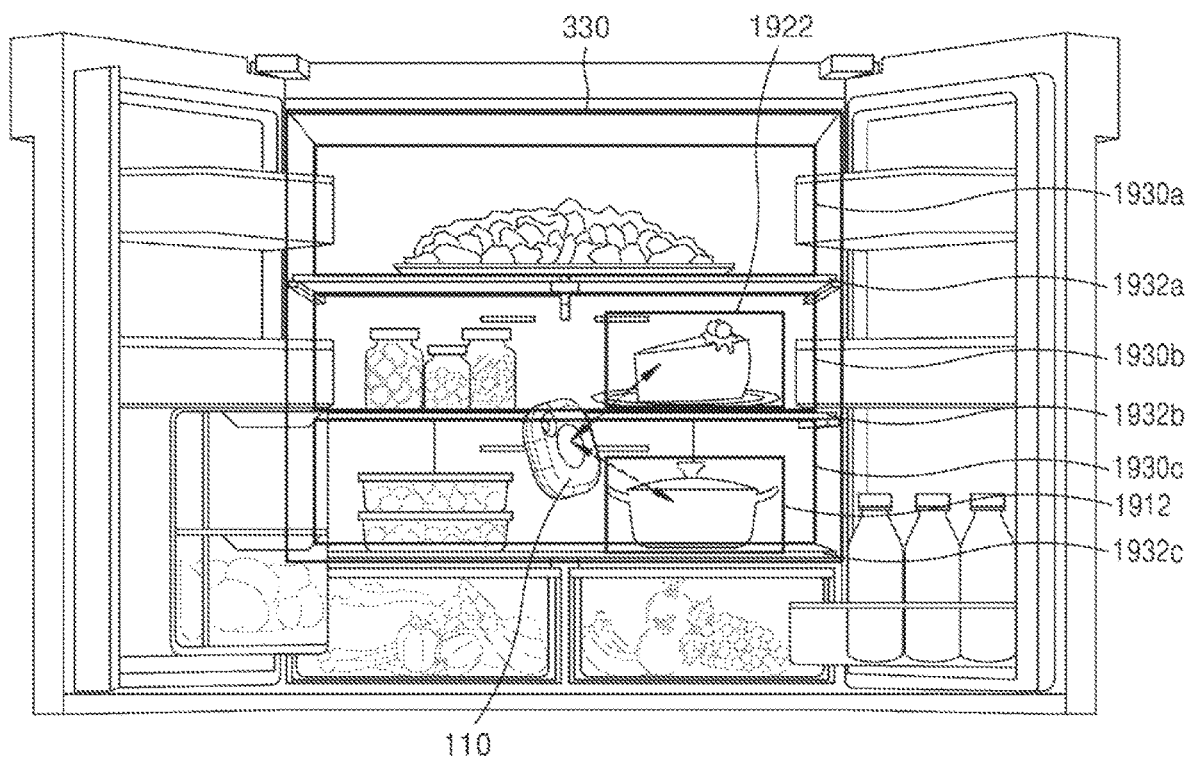
FIG. 19 is a diagram for describing a process of identifying an object around a UWB device, according to an embodiment of the disclosure.

FIG. 19 is a diagram for describing a process of identifying an object around a UWB device, according to an embodiment of the disclosure.

According to an embodiment of the disclosure, the refrigerator 100 may identify the object around the UWB device 110 by comparing a coordinate of the UWB device 110 with a coordinate of an object recognized in an input image. The coordinate of the UWB device 110 and the coordinate of the object recognized in the input image may be converted into the same coordinate system, and the refrigerator 100 may define a distance between the UWB device 110 and each object.

According to an embodiment of the disclosure, the refrigerator 100 may measure a distance between the UWB device 110 and an outermost edge of each object. Also, according to an embodiment, the refrigerator 100 may measure distances between the UWB device 110 and object areas 1912 and 1922. Also, according to an embodiment, the refrigerator 100 may measure distances between the UWB device 110 and a central point of each of the object areas 1912 and 1922.

According to an embodiment of the disclosure, the refrigerator 100 may identify an object which has a least distance to the UWB device 110 as a first object position around the UWB device 110.

Also, according to an embodiment of the disclosure, the refrigerator 100 may define a plurality of sections 1930a, 1930b, and 1930c in the container 330 of the refrigerator 100. The plurality of sections 1930a, 1930b, and 1930c may be defined based on shelves 1932a, 1932b, and 1932c. For example, an upper space of a first shelf 1932a may be defined as a first section 1930a, an upper space of a second shelf 1932b may be defined as a second section 1930b, and an upper space of a third shelf 1932c may be defined as a third section 1930c.

When the refrigerator 100 recognizes a position of the UWB device 110, the refrigerator 100 may determine in which section 1930a, 1930b, or 1930c the UWB device 110 is positioned. The refrigerator 100 may identify an object most adjacent to the UWB device 110 from among objects in the section in which the UWB device 110 is positioned, as the first object. For example, when it is determined that the UWB device 110 is positioned in the third section 1930c, the refrigerator 100 may identify which objects are located in the third section 1930c. The refrigerator 100 may identify an object which is most adjacent to the UWB device 110 from among the objects in the third section 1930c, as the first object.

According to an embodiment of the disclosure, the UWB device 110 may search for and identify, as the first object, an object that is most adjacent to the UWB device 110 in a section 1930a, 1930b, or 1930c in which the UWB device 110 is arranged, even when the UWB device 110 is most adjacent to an object in a different section 1930a, 1930b, or 1930c. Thus, it is possible to identify the first object in a way that is relatively more suitable to an intention of a user. For example, when the UWB device 110 is arranged in the third section 1930c and the object most adjacent to the UWB device 110 is arranged in the second section 1930b, the object arranged in the second section 1930b may not be identified as the first object.

Figure 20:
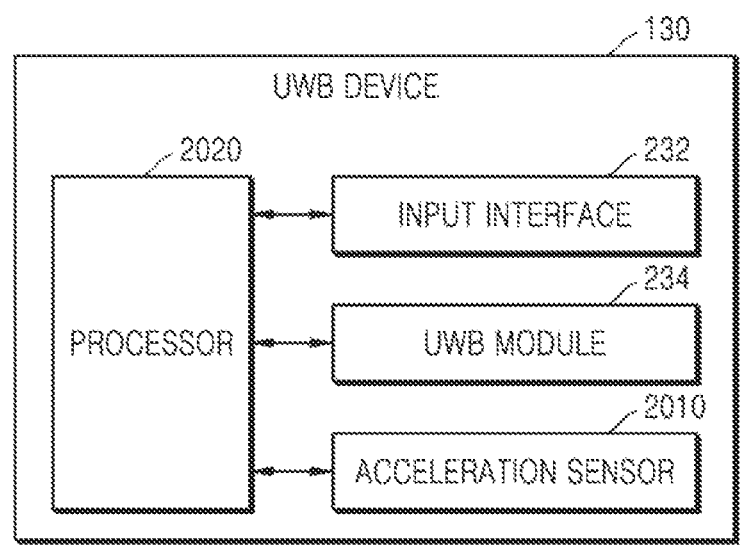
FIG. 20 is a diagram showing a structure of a UWB device 130 according to an embodiment of the disclosure.

FIG. 20 is a diagram of a structure of a UWB device 130 according to an embodiment of the disclosure.

According to an embodiment of the disclosure, the UWB device 130 may include an input interface 232, a UWB module 234, an acceleration sensor 2010, and a processor 2020. The UWB device 130 may detect shaking of the UWB device 130 by including the acceleration sensor 2010.

The acceleration sensor 2010 may detect an acceleration of the UWB device 130. The processor 2020 of the UWB device 130 may determine whether the UWB device 130 is arranged in a predetermined position or whether the UWB device 130 is held by a user by using a detection value of the acceleration sensor 2010. When the acceleration detection value detected by the acceleration sensor 2010 is a predetermined reference value or greater, the processor 2020 may determine that the UWB device 130 is held, and when the acceleration value is less than the predetermined reference value, the processor 2020 may determine that the UWB device 130 is arranged in a predetermined position.

The UWB device 130 may transmit information about whether or not the UWB device 130 is held to the refrigerator 100. According to an embodiment, the UWB device 130 may establish UWB communication with the refrigerator 100 and may transmit information about a state of the UWB device 130 to the refrigerator 100 through the UWB communication. Also, according to an embodiment, the UWB device 130 may further include a communication module for performing other types of communication operations, such as Wifi, BLE, etc. The UWB device 130 may transmit the information about whether or not the UWB device 130 is held to the refrigerator 100 through the communication module.

Figure 21:
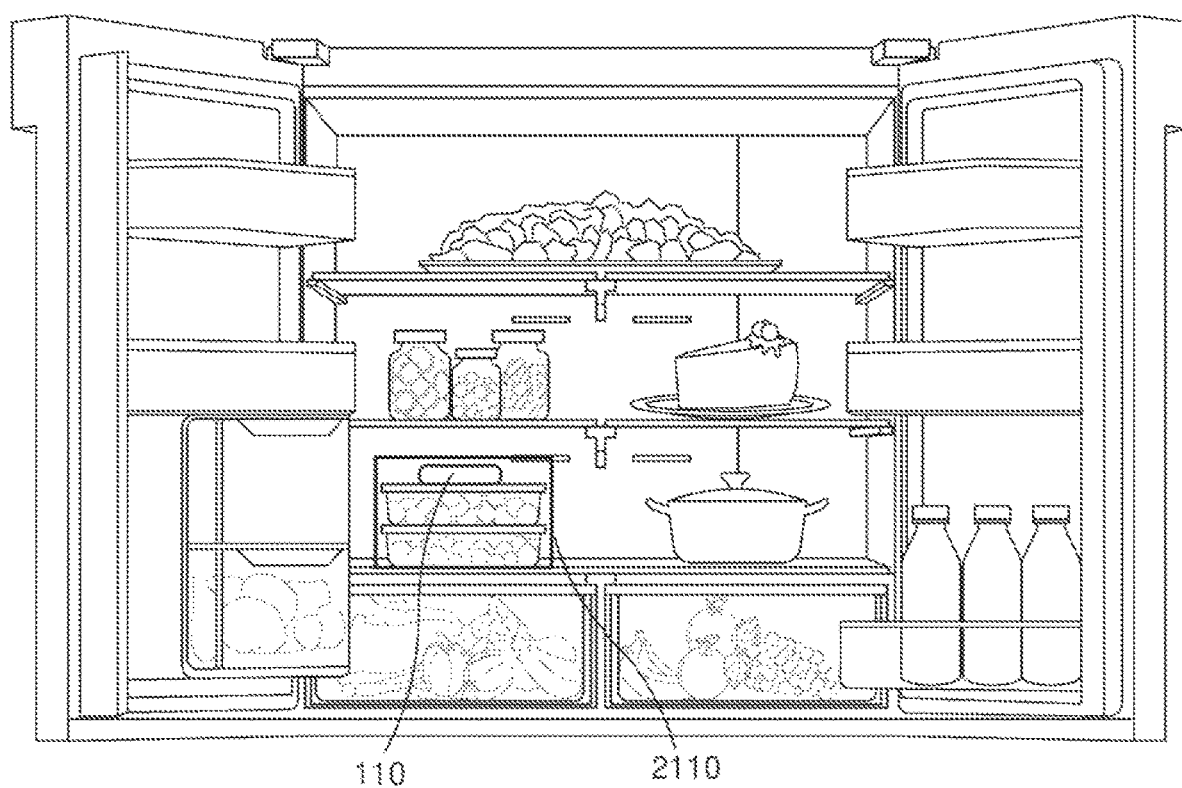
FIG. 21 is a diagram showing a process of identifying a first object around a UWB device, according to an embodiment of the disclosure.

FIG. 21 is a diagram showing a process of identifying a first object around a UWB device, according to an embodiment of the disclosure.

Figure 22:
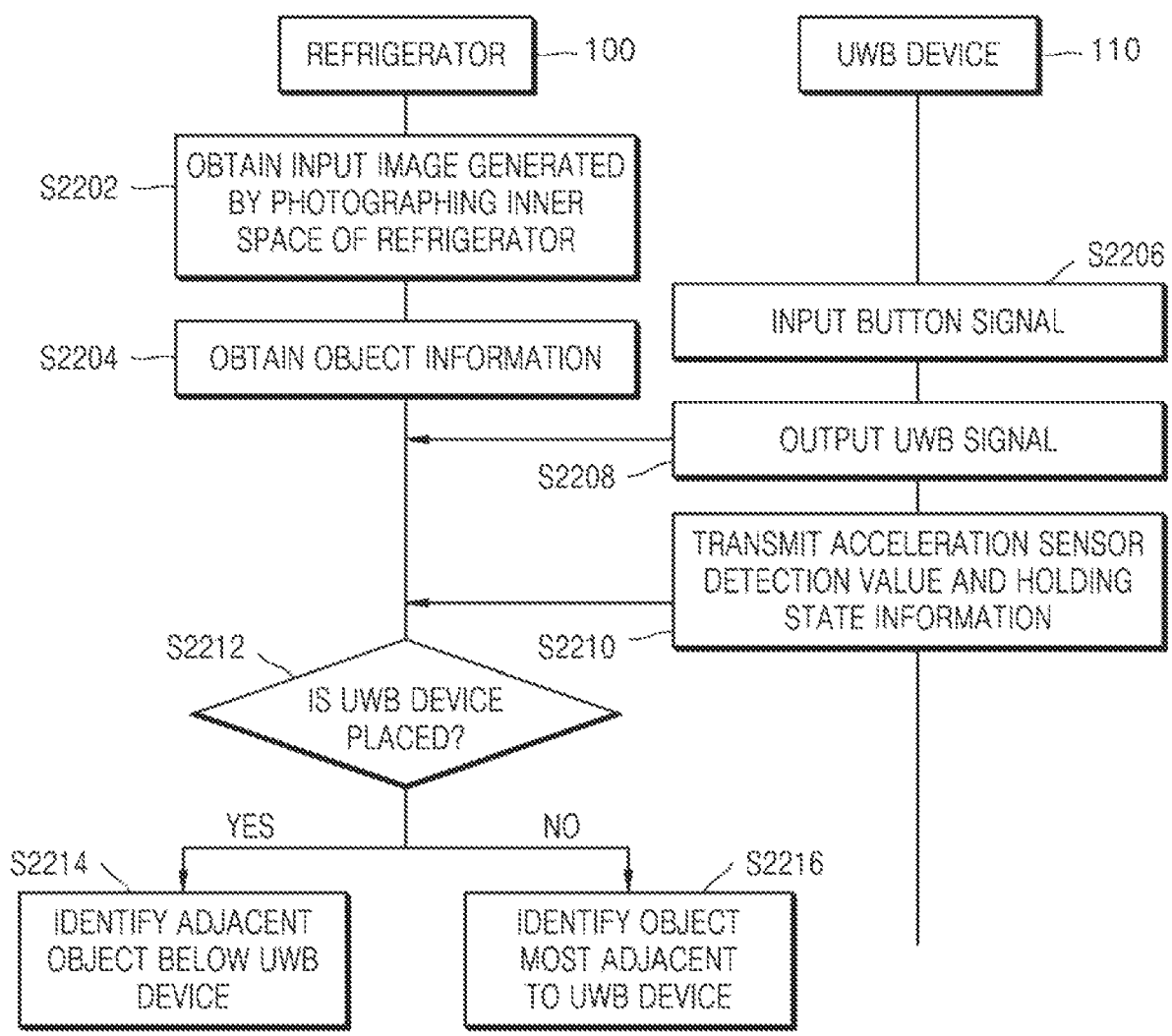
FIG. 22 is a flowchart illustrating a process of identifying a first object around a UWB device, according to an embodiment of the disclosure.

According to an embodiment of the disclosure, the refrigerator 100 may identify an object 2110 on which the UWB device 110 is arranged, as the first object, when the UWB device 110 is arranged on the predetermined object 2110. Referring to FIG. 22, the process of identifying the first object according to the present embodiment is described.

FIG. 22 is a flowchart illustrating a process of identifying a first object around a UWB device, according to an embodiment of the disclosure.

In operation S2202, the refrigerator 100 may obtain an input image generated by photographing an inner space of the refrigerator. Also, in operation S2204, the refrigerator 100 may obtain object information from the input image. Operations S2202 and S2204 may be substantially the same as operations S502 and S504 of FIG. 5, and thus, their detailed descriptions are omitted.

In operation S2206, the UWB device 110 may detect a first control signal when a user presses a button. In operation S2208, the UWB device 110 may output a UWB signal based on the first control signal. The refrigerator 100 may detect the UWB signal output by the UWB device 110, by using the UWB module 214.

Also, in operation S2210, when the UWB device 110 detects the first control signal, the UWB device 110 may obtain a detection value of the acceleration sensor 2010. The UWB device 110 may generate holding state information indicating whether the UWB device 110 is held or placed by a user, based on the detection value of the acceleration sensor 2010.

According to an embodiment, the UWB device 110 may only obtain the detection value of the acceleration sensor 2010 and may not determine whether or not the UWB device 110 is held. In this case, the UWB device 110 may transmit the detection value of the acceleration sensor 2010 to the refrigerator 100 as the holding state information.

Also, according to an embodiment, the UWB device 110 may determine whether or not the UWB device 110 is held, based on the detection value of the acceleration sensor 2010. The processor 2020 of the UWB device 110 may determine whether or not the UWB device 110 is held by the user, based on the detection value of the acceleration sensor 2010 and may generate the holding state information indicating whether or not the UWB device 110 is held by the user. The UWB device 110 may transmit the generated holding state information to the refrigerator 100.

Next, in operation S2212, the refrigerator 100 may determine whether or not the UWB device 110 is arranged on an object, based on the holding state information received from the UWB device 110. When the holding state information corresponds to the detection value of the acceleration sensor 2010, the refrigerator 100 may compare the detection value of the acceleration sensor 2010 with a predetermined reference value and may determine whether or not the UWB device 110 is arranged on the object. When the holding state information includes information about whether or not the UWB device 110 is held by the user, the refrigerator 100 may obtain, from the holding state information, information about whether or not the UWB device 110 is arranged on the object.

When the UWB device 110 is arranged on the object, the refrigerator 100 may identify an adjacent object below the UWB device 110 and may determine the identified object as the first object, in operation S2214. The adjacent object below the UWB device 110 may be identified by comparing a coordinate of an object obtained from area information of object information with a coordinate of the UWB device 110. The refrigerator 100 may identify objects located below the coordinate of the UWB device 110 and may identify an object most adjacent to the UWB device 110 from among the objects located below the coordinate of the UWB device 110. Also, the refrigerator 100 may compare an x coordinate of the UWB device 110 with an x coordinate of an object and may identify the objects located below the UWB device 110.

When the UWB device 110 is not arranged on the object, the refrigerator 100 may identify an object most adjacent to the UWB device 110 and may determine the identified object as the first object, in operation S2216. As described in FIG. 19, the refrigerator 100 may identify the object most adjacent to the UWB device 110 as the first object or the object most adjacent to the UWB device 110 in the same section as the first object.

Figure 23:
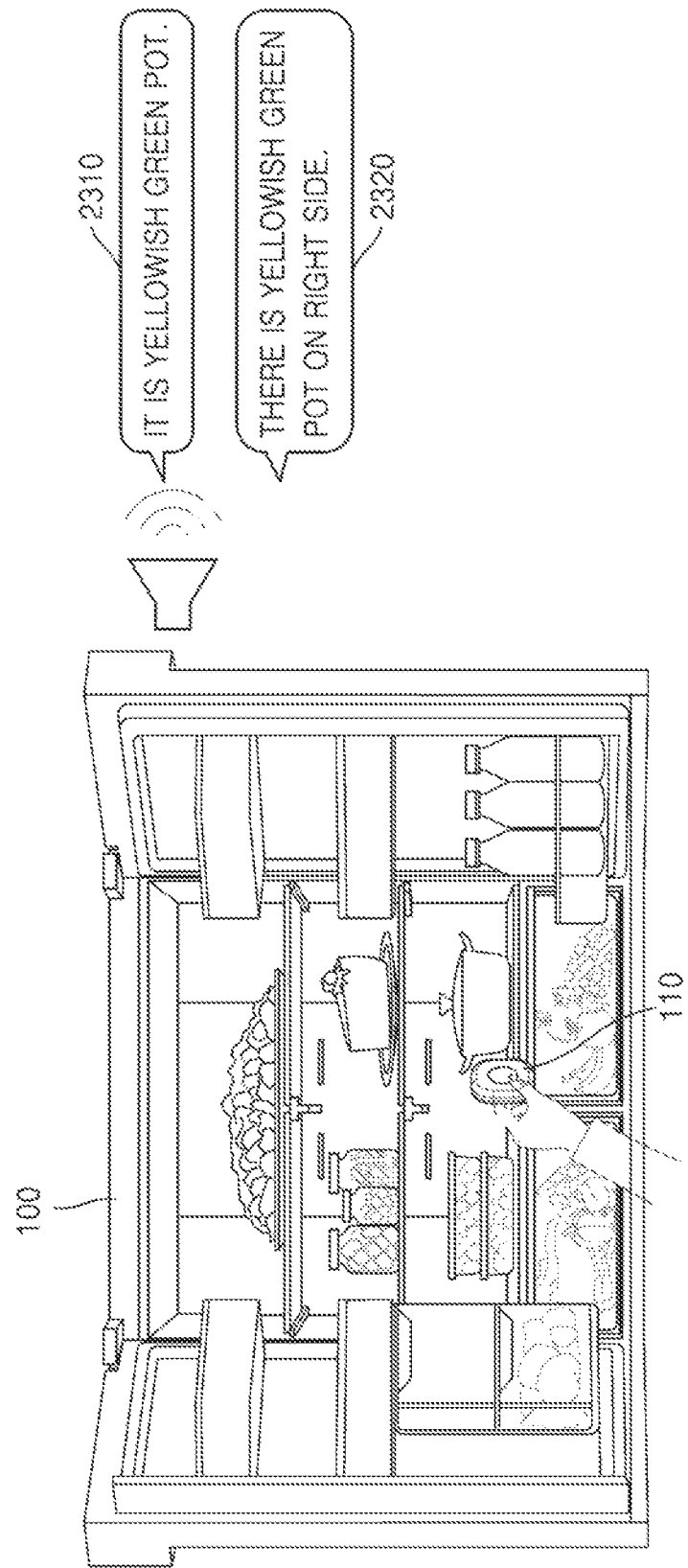
FIG. 23 is a diagram showing a process of outputting, as an audio signal, object information with respect to a first object, according to an embodiment of the disclosure.

FIG. 23 is a diagram showing a process of outputting, as an audio signal, object information with respect to a first object, according to an embodiment of the disclosure.

According to an embodiment of the disclosure, the refrigerator 100 may output the object information with respect to the first object around the UWB device 110 as the audio signal. The refrigerator 100 may include a speaker 216 and may output audio messages 2310 and 2320 as an audio signal through the speaker 216.

According to an embodiment of the disclosure, the refrigerator 100 may generate and output the audio message 2310 including the object information. The refrigerator 100 may generate the audio message 2310 by using information about a type of an object included in the object information. Also, the refrigerator 100 may obtain additional information with respect to the first object from the input image. For example, the refrigerator 100 may obtain color information, shape information, size information, etc. of the first object from the input image.

Also, according to an embodiment of the disclosure, the refrigerator 100 may generate and output the audio message 2310 including the object information and direction information. The refrigerator 100 may calculate a relative location of the first object and the UWB device 110. Based on the calculated relative location, the refrigerator 100 may determine in which direction with respect to the UWB device 110 the first object is located based on a direction toward an inner space of the container 330 from a user. For example, the refrigerator 100 may determine that the first object is on the right side of the UWB device 110 and may generate the direction information that the first object is on the right side of the refrigerator 100. Next, the refrigerator 100 may generate the audio message 2320 that "there is a yellowish green pot on the right side" by using the object information and the direction information.

The refrigerator 100 may convert the generated audio messages 2310 and 2320 into driving signals for driving the speaker 216. The speaker 216 may receive the driving signals and may output audio signals corresponding to the audio messages 2310 and 2320.

Figure 24:
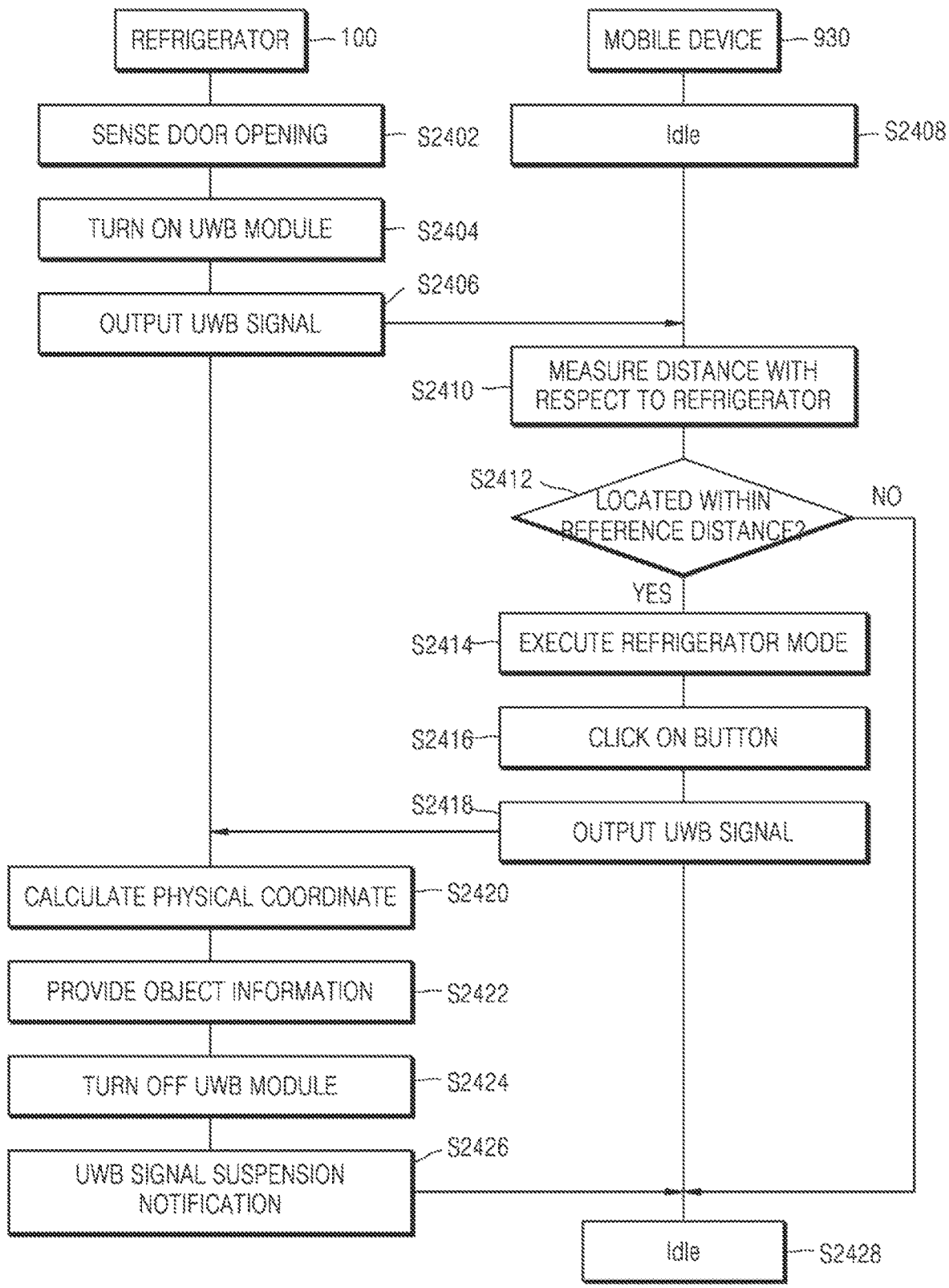
FIG. 24 is a flowchart illustrating a process of providing a refrigerator mode, in a mobile device, according to an embodiment of the disclosure.

FIG. 24 is a flowchart illustrating a process of providing a refrigerator mode, in a mobile device, according to an embodiment of the disclosure.

According to an embodiment of the disclosure, when the mobile device 930 is located within a reference distance from the refrigerator 100, the mobile device 930 may operate in the refrigerator mode in which the mobile device 930 may output a UWB signal to the refrigerator 100. The refrigerator mode may be a mode of the mobile device 930 for providing a UWB signal output function or a function of outputting an audio signal corresponding to object information. When the mobile device 930 provides a UWB module, it is possible to use the mobile device 930 as a UWB device.

In operation S2402, the refrigerator 100 may sense door opening.

In operation S2404, when the refrigerator 100 senses the door opening, the refrigerator 100 may turn on the UWB module 214 and may activate the UWB module 214. In operation S2406, the refrigerator 100 may output a UWB signal.

The mobile device 930 may be in an idle state and then may detect the UWB signal output from the refrigerator 100 in operation S2408. In operation S2410, the mobile device 930 may measure a distance between the mobile device 930 and the refrigerator 100 based on the detected UWB signal. The mobile device 930 may calculate the distance between the mobile device 930 and the refrigerator 100 by using time stamp information and ToF information of the UWB signal as described above.

In operation S2412, the mobile device 930 may determine whether or not the refrigerator 100 is located within a reference distance. When the refrigerator 100 is located within the reference distance, the mobile device 930 may execute the refrigerator mode in operation S2414.

Next, in operation S2416, the mobile device 930 may detect an input for clicking on a button provided in the mobile device 930. In operation S2418, the mobile device 930 may output a UWB signal based on the input for clicking on the button. The mobile device 930 may provide one or more buttons. According to an embodiment of the disclosure, in order for a visually impaired person to easily perform a control operation for outputting the UWB signal, the mobile device 930 may include a predetermined button identifiable by the person with visual impairment. A person with visual impairment may place the mobile device 930 in an inner space of the refrigerator 100 and may click on the button to obtain information about food and beverage arranged in the refrigerator 100, so as to search for, in the refrigerator 100, a food item, required by the person with visual impairment, by using the mobile device 930.

The refrigerator 100 may receive a UWB signal output from the mobile device 930. In operation S2420, the refrigerator 100 may calculate a physical coordinate of the mobile device 930 based on the received UWB signal. The refrigerator 100 may identify a first object around the mobile device 930 by using object information obtained in an input image. The process of identifying the first object may be substantially the same as the process described with reference to FIGS. 5, 19, and 22.

Next, in operation S2422, the refrigerator 100 may provide object information with respect to the first object as an audio signal. When the process of providing the object information is completed, the refrigerator 100 may turn off the UWB module 214 in operation S2424. When the process of providing the food information is completed, the refrigerator 100 may turn off the UWB module 214 to reduce power consumption.

According to an embodiment, after the refrigerator 100 provides the object information with respect to the first object, the refrigerator 100 may maintain the UWB module 214 in a turn-on state until door closing of the refrigerator is detected. When a user cannot find a desired food item after the user presses a button on the mobile device 930 once, the user may try again the process by moving the mobile device 930 to another position. In this case, the refrigerator 100 may receive a UWB signal from the mobile device 930 again, may identify the first object, and may output the object information as an audio signal.

Next, in operation S2426, when the UWB module 214 is turned off, the refrigerator 100 may transmit UWB signal suspension notification to the mobile device 930. According to an embodiment, before the refrigerator 100 turns off the UWB module 214 in operation S2424, the refrigerator 100 may transmit the UWB signal suspension notification to the mobile device 930 through UWB communication, and then, may turn off the UWB module 214. Also, according to an embodiment, the refrigerator 100 may transmit the UWB signal suspension notification to the mobile device 930 by using other types of communication, such as Wifi, Bluetooth, etc.

When the mobile device 930 receives the UWB signal suspension notification, the mobile device 930 may end the refrigerator mode and may be switched to an idle state in operation S2428.

Figure 25:
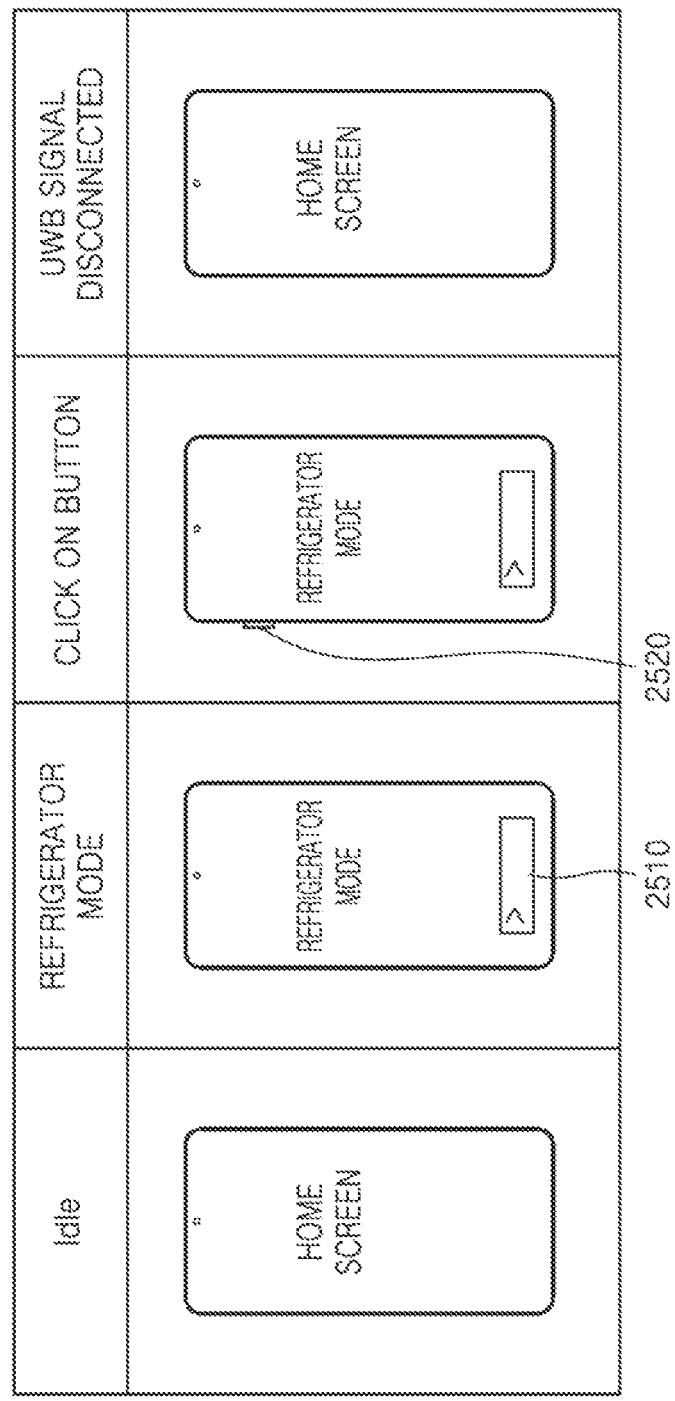
FIG. 25 is a diagram showing operation of a mobile device in each state, according to an embodiment of the disclosure.

FIG. 25 is a diagram showing operation of a mobile device in each state, according to an embodiment of the disclosure.

The mobile device 930 may display a home screen or a locked screen in an idle state. Also, for example, the mobile device 930 may turn off a display in the idle state.

In a refrigerator mode, the mobile device 930 may display information that a current mode corresponds to the refrigerator mode. According to an embodiment, the mobile device 930 may provide an end menu 2510 for ending the refrigerator mode. For example, the mobile device 930 may provide, on a touch screen, a GUI for sliding on icons, as the end menu 2510. When an input for sliding on the icons in the end menu 2510 is received, the mobile device 930 may end the refrigerator mode.

According to an embodiment of the disclosure, when the refrigerator mode is started, the mobile device 930 may output an audio signal indicating that the refrigerator mode is started. Also, the mobile device 930 may output an audio signal for a guidance with respect to a method of manipulating the mobile device 930 in the refrigerator mode. For example, the mobile device 930 may output an audio message "press a left button after bring your smartphone to a desired position in the refrigerator."

The mobile device 930 may output a UWB signal when a user presses a button 2520 in the refrigerator mode. According to an embodiment of the disclosure, the mobile device 930 may display the object information with respect to the first object, whenever the user clicks on the button 2520. Also, the mobile device 930 may output the object information with respect to the first object as an audio signal, whenever the user clicks on the button 2520.

When the mobile device 930 receives the UWB signal suspension notification from the refrigerator 100, the mobile device 930 may return to the idle state. Here, the mobile device 930 may be switched from a GUI view indicating that the current mode corresponds to the refrigerator mode to the home screen. Also, the mobile device 930 may output an audio signal including a guidance message indicating that the refrigerator mode is ended.

Figure 26:
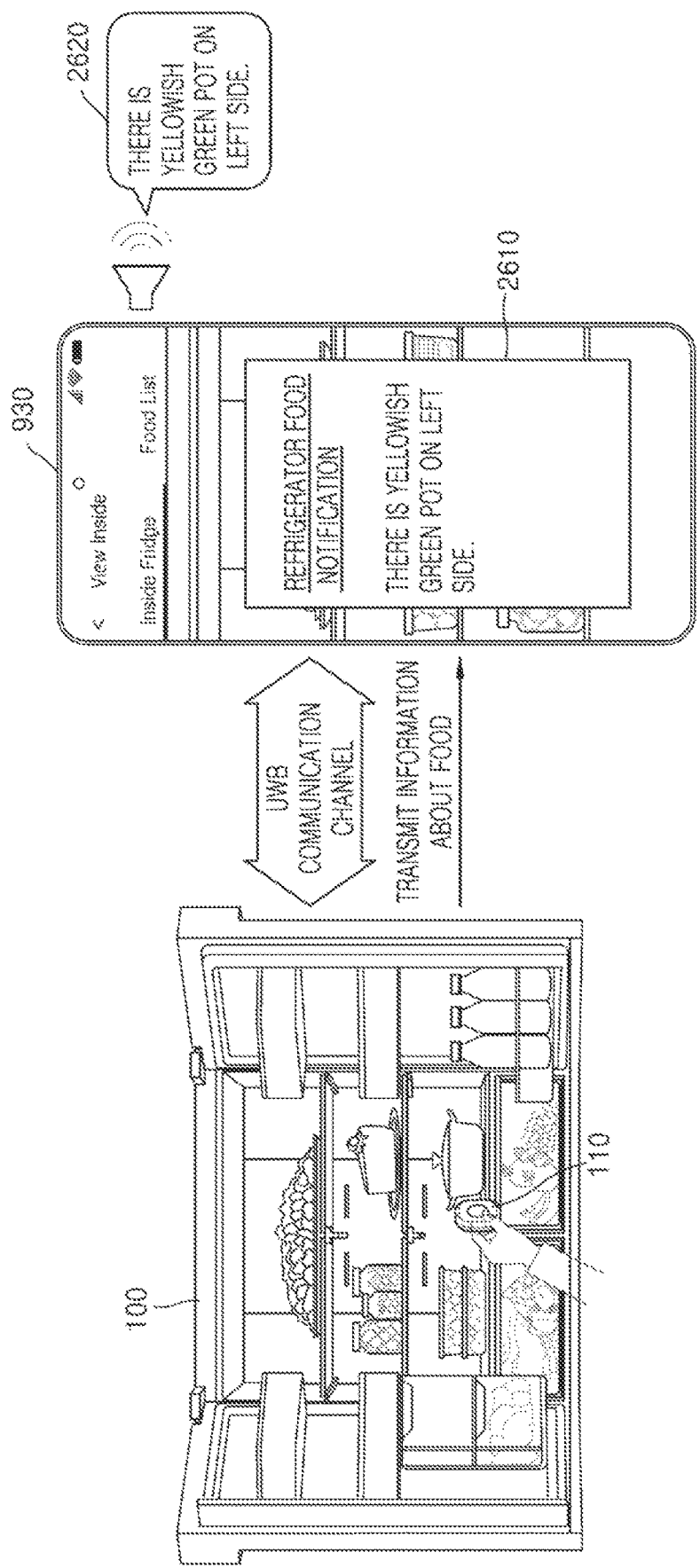
FIG. 26 is a diagram showing a process of outputting object information from a mobile device, according to an embodiment of the disclosure.

FIG. 26 is a diagram showing a process of outputting object information from a mobile device, according to an embodiment of the disclosure.

According to an embodiment of the disclosure, the refrigerator 100 may transmit object information with respect to a first object to the mobile device 930. According to an embodiment, the refrigerator 100 may establish a communication channel with the mobile device 930 and may transmit the object information to the mobile device 930 through a D2D communication method. For example, the refrigerator 100 may establish a UWB communication channel with the mobile device 930 and may transmit the object information to the mobile device 930 through the UWB communication channel. Also, according to an embodiment, the refrigerator 100 may transmit the object information to the mobile device 930 through the IoT server 910.

When the mobile device 930 receives the object information, the mobile device 930 may output the object information.

According to an embodiment, the mobile device 930 may provide a GUI 2610 for providing the object information. The mobile device 930 may execute an IoT application and may generate a food information notification message corresponding to the object information received through the IoT application. The mobile device 930 may display the food information notification message on the GUI 2610 through the IoT application.

Also, according to an embodiment, the mobile device 930 may generate an audio message 2620 notifying the object information and may output the audio message 2620 as an audio signal.

Figure 27:
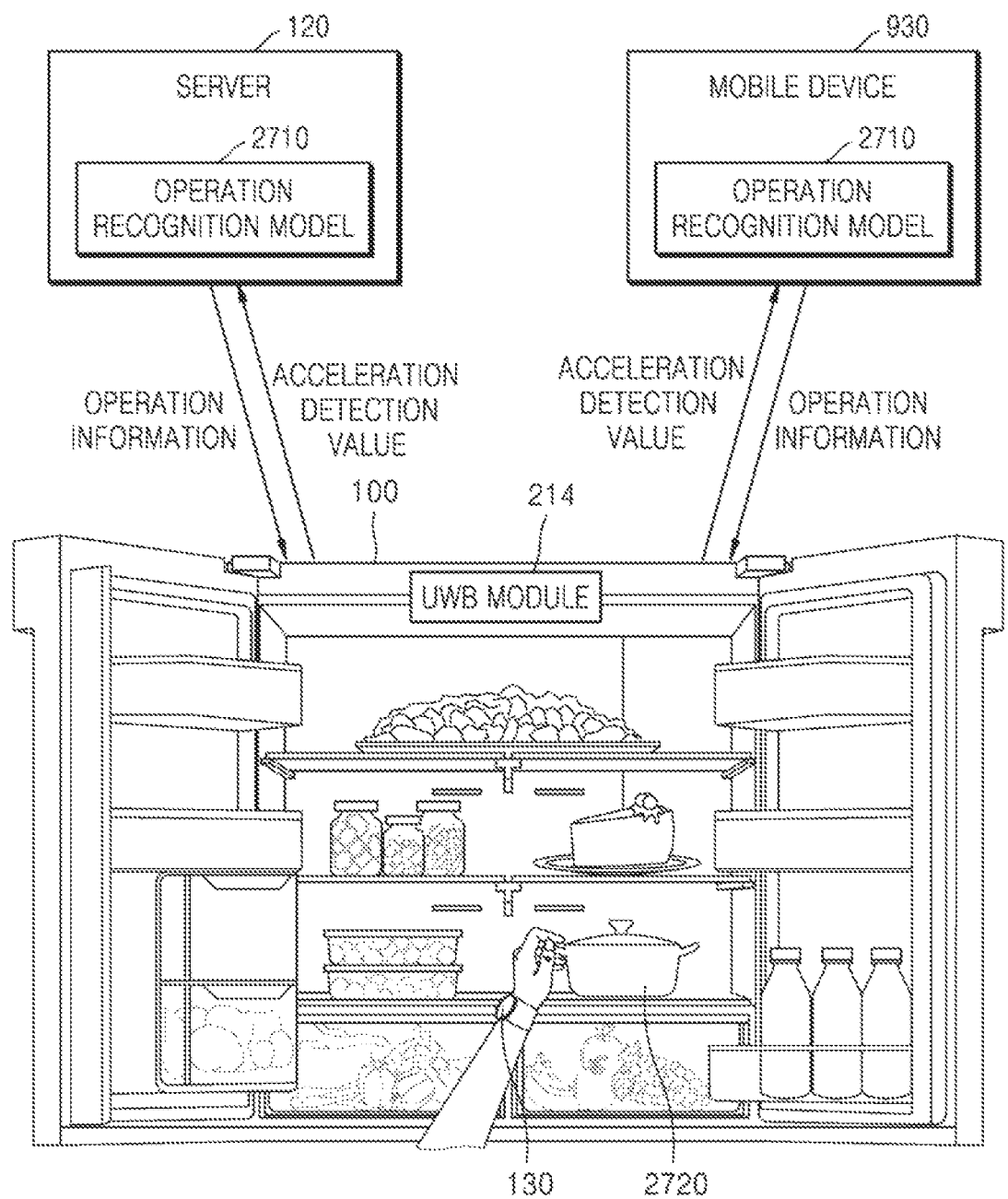
FIG. 27 is a diagram showing a process of obtaining object information by using a UWB device, according to an embodiment of the disclosure.

FIG. 27 is a diagram showing a process of obtaining object information by using a UWB device, according to an embodiment of the disclosure.

According to an embodiment of the disclosure, the UWB device 130 may correspond to a wearable device. For example, the UWB device 130 may have the form of a watch or a band. The UWB device 130 may correspond to various types of watches or smart bands.

As described above, the UWB device 130 may include the UWB module 234 and the acceleration sensor 2010.

The UWB device 130 may output an UWB signal through the UWB module 234. The refrigerator 100 may detect the UWB signal output from the UWB device 130 and may identify a physical position of the UWB device 130 on a three-dimensional space.

Also, the UWB device 130 may detect an acceleration of the UWB device 130 by using the acceleration sensor 2010. The acceleration sensor 2010 of the UWB device 130 may detect acceleration values, for example, in directions of an x axis, a y axis, and a z axis.

The refrigerator 100 may obtain the acceleration detection value of the UWB device 130. Also, the refrigerator 100 may detect an operation, performed by a user wearing the UWB device 130, of putting down an object 2710 in an inner space of the refrigerator 100, by using the acceleration detection value of the UWB device 130.

When the refrigerator 100 detects the operation, performed by the user, of placing the object 2720 in the inner space of the refrigerator 100, the refrigerator 100 may detect a UWB signal output from the UWB device 130 and may identify a position of the UWB device 130 and identify in which position in the refrigerator 100 the user has placed the object 2720.

The refrigerator 100 may recognize the operation of placing the object from the acceleration detection value of the UWB device 130, by using an operation recognition model 2710. The operation recognition model 2710 may correspond to a machine-learning AI model. Operation information may correspond to information indicating a type of an operation recognized from the acceleration detection value from among one or more pre-defined operations. According to an embodiment, the operation information may include information indicating whether or not the recognized operation corresponds to an operation of placing an object. Thus, the refrigerator 100 may identify, from the operation information, whether or not the operation of placing the object is detected. According to an embodiment, the operation information may correspond to information indicating to which of the pre-defined plurality of operations the recognized operation corresponds. The pre-defined plurality of operations may include, for example, an operation of placing an object, an operation of opening a door, an operation of washing a hand, etc. The operation recognition model 2710 may be trained by using a plurality of pieces of training data including the acceleration detection value and the operation information.

According to an embodiment, the operation recognition model 2710 may be executed by the processor 210 of the refrigerator 100. Also, according to an embodiment, the operation recognition model 2710 may be executed by the processor 410 of the server 120. Also, according to an embodiment, the operation recognition model 2710 may be executed by a processor (not shown) of the mobile device 930. The server 120 may correspond to the AI server 930 described above.

The refrigerator 100 may input the acceleration detection value to the operation recognition model 2710 and may obtain the operation information. When the operation recognition model 2710 is executed by the server 120 or the mobile device 930, the refrigerator 100 may transmit the acceleration detection value to the server 120 or the mobile device 930. The refrigerator 100 may obtain, from the server 120 or the mobile device 930, the operation information generated by the operation recognition model 2710.

The refrigerator 100 may detect the UWB signal and identify the position of the UWB device 130, when the operation of placing the object is recognized based on the obtained operation information. The refrigerator 100 may recognize the position of the UWB device 130 as a position of a new object. The operation, performed by the refrigerator 100, of recognizing the position of the UWB device 130 as the position of the new object may correspond to operation S1616 described above with reference to FIG. 16.

Figure 28:
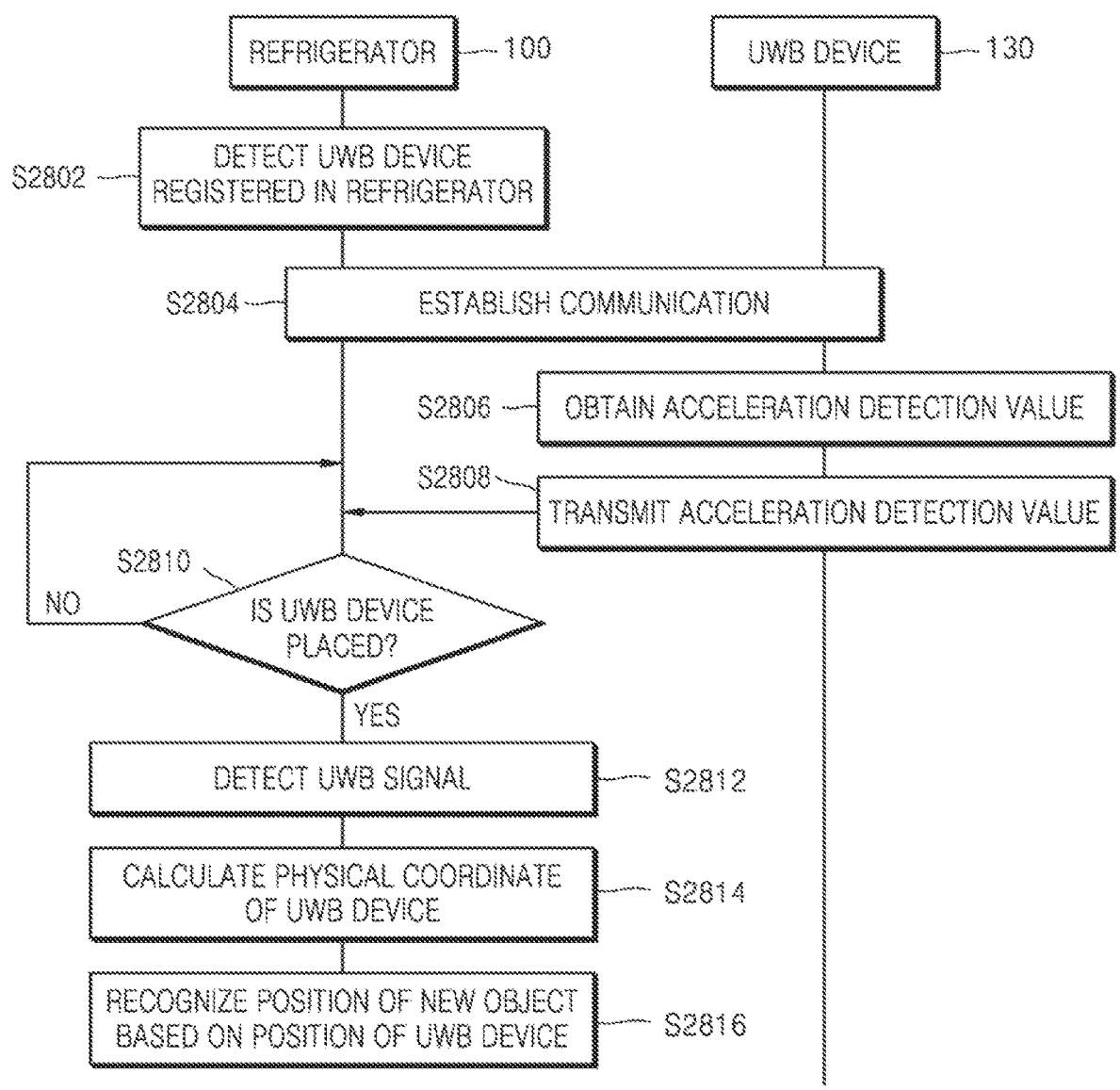

FIG. 28 is a diagram showing a process of detecting an operation and a position of a UWB device, according to an embodiment of the disclosure.

In operation S2802, the refrigerator 100 may detect the UWB device 130 in an inner space of the refrigerator 100. The refrigerator 100 may detect the UWB device 130 in the inner space of the refrigerator 100, when door opening is detected. According to an embodiment, the refrigerator 100 may detect the UWB device 130 based on a UWB signal output from the UWB device 130. Also, according to an embodiment, the refrigerator 100 may detect the UWB device 130 by using a BLE advertising signal, a Wifi beacon, etc. output from the UWB device 130.

The refrigerator 100 may receive identification information of the UWB device 130 from the UWB device 130. The identification information of the UWB device 130 may include, for example, an MAC address, a serial number, account information, or the like. The refrigerator 100 may determine whether or not a corresponding device is a pre-registered device, by using the identification information of the UWB device 130. The refrigerator 100 may store information with respect to the pre-registered device and may compare the detected identification information of the UWB device 130 with the information with respect to the pre-registered device. When the identification information of the UWB device 130 corresponds to the information with respect to the pre-registered device, the refrigerator 100 may determine that the UWB device 130 corresponds to the pre-registered device.

According to an embodiment, when account information of the UWB device 130 and account information of the refrigerator 100 correspond to each other, the refrigerator 100 may determine that the UWB device 130 is the pre-registered device. The account information may denote account information registered in the IoT server 910.

When the registered UWB device 130 is detected in the refrigerator 100, the refrigerator 100 may establish communication with the UWB device 130 in operation S2804. The refrigerator 100 and the UWB device 130 may communicate with each other by using various types of wireless communication methods. The refrigerator 100 and the UWB device 130 may establish communication by a using communication method, such as Bluetooth, WFD, UWB communication, Zigbee, or the like.

In operation S2806, the UWB device 130 may obtain the acceleration detection value by using the acceleration sensor 2010. According to an embodiment, the UWB device 130 may obtain acceleration detection values in directions of an X axis, a Y axis, and a Z axis.

Next, in operation S2808, the UWB device 130 may transmit the acceleration detection value to the refrigerator 100. The UWB device 130 may transmit the acceleration detection value to the refrigerator 100 through the communication channel established with respect to the refrigerator 100.

Next, in operation S2810, the refrigerator 100 may detect an operation of placing an object by using the acceleration detection value received from the UWB device 130. The refrigerator 100 may recognize the operation of placing the object by using the operation recognition model 2710. The operation recognition model 2710 may be executed by the refrigerator 100, the server 120, or the mobile device 930, as described above. The operation recognition model 2710 may correspond to a machine-learning model. The operation recognition model 2710 may receive the acceleration detection values in the directions of the X axis, the Y axis, and the Z axis and may output operation information. The refrigerator 100 may obtain the operation information and may detect the operation of placing the object.

Next, in operation S2812, the refrigerator 100 may detect a UWB signal of the UWB device 130. When the UWB signal is being output from the UWB device 130, the refrigerator 100 may identify a UWB signal detected at a time point at which the operation of placing the object is detected. When the UWB signal is not being output from the UWB device 130, the refrigerator 100 may request the UWB device 130 to output a UWB signal and may detect the UWB signal output from the UWB device 130.

Next, in operation S2814, the refrigerator 100 may calculate a physical coordinate of the UWB device 130. The refrigerator 100 may identify a position of the UWB device 130 by using the UWB signal at the time point at which the operation of placing the object via the UWB device 130 is detected.

Next, in operation S2816, the refrigerator 100 may recognize the identified position of the UWB device 130 as a position of a new object. The refrigerator 100 may recognize the new object by using an input image. For example, as described above with reference to FIG. 16, the refrigerator 100 may recognize the new object by comparing a first input image captured before door opening with a second input image captured after door opening. The refrigerator 100 may match the physical position recognized by using the UWB signal at the time point at which the operation of placing the object is detected with the new object recognized in the input image. The refrigerator 100 may store the matched physical position in object information of the new object.

Figure 29:
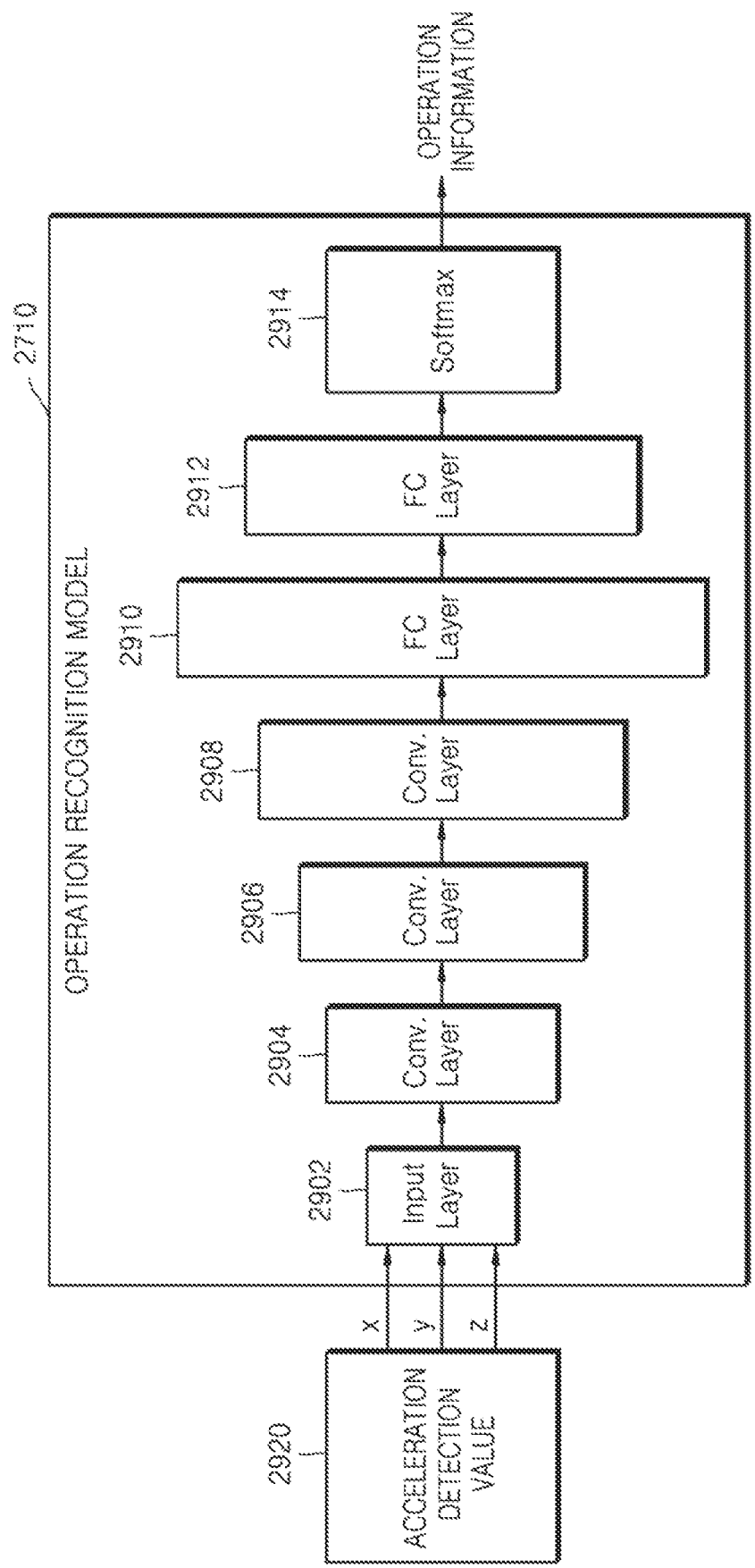
FIG. 29 is a diagram showing an operation recognition model according to an embodiment of the disclosure.

FIG. 29 is a diagram showing an operation recognition model according to an embodiment of the disclosure.

The operation recognition model 2710 may correspond to machine-learning models having various structures. The operation recognition model 2710 may include a CNN or an RNN. Also, the operation recognition model 2710 may include a combination of a plurality of layers and nodes.

The operation recognition model 2710 according to an embodiment of the disclosure may receive an acceleration detection value 2920 and may output operation information. The acceleration detection value 2920 may include an x value, a y value, and a z value. The x value may correspond to an acceleration detection value in a direction of an X axis, the y value may correspond to an acceleration detection value in a direction of a Y axis, and the z value may correspond to an acceleration detection value in a direction of a Z axis.

The operation recognition model 2710 according to an embodiment of the disclosure may include an input layer 2902, a plurality of convolution layers 2904, 2906, and 2908, fully-connected (FC) layers 2910 and 2912, and a softmax layer 2914.

The operation recognition model 2710 may receive an input vector through the input layer 2902. For example, the input layer 2902 may receive the input vector corresponding to acceleration detection values in 256 levels that are accumulated in units of 48 frames.

The plurality of convolution layers 2904, 2906, and 2908 may include various combinations of a convolutional operator, a batch normalization layer, a rectified liner unit (ReLu) activation layer, and a pooling layer.

The FC layers 2910 and 2912 may include various combinations of a batch normalization layer and an ReLu activation layer.

The softmax layer 2914 may correspond to an output of the FC layers 2910 and 2912. The softmax layer 2914 may output operation information. The operation recognition model 2710 may recognize one of a plurality of pre-defined classes from the input vector. The operation recognition model 2710 may define a probability in which the input vector may correspond to each class and may output the class corresponding to a highest probability. Each class may correspond to a pre-defined type of operation. For example, the pre-defined types of operations may include refrigerator door opening, object placement, object picking, refrigerator door closing, etc.

The operation information may include information about a type of a recognized operation. The refrigerator 100 may recognize an operation of placing an object by using the operation information.

Figure 30:
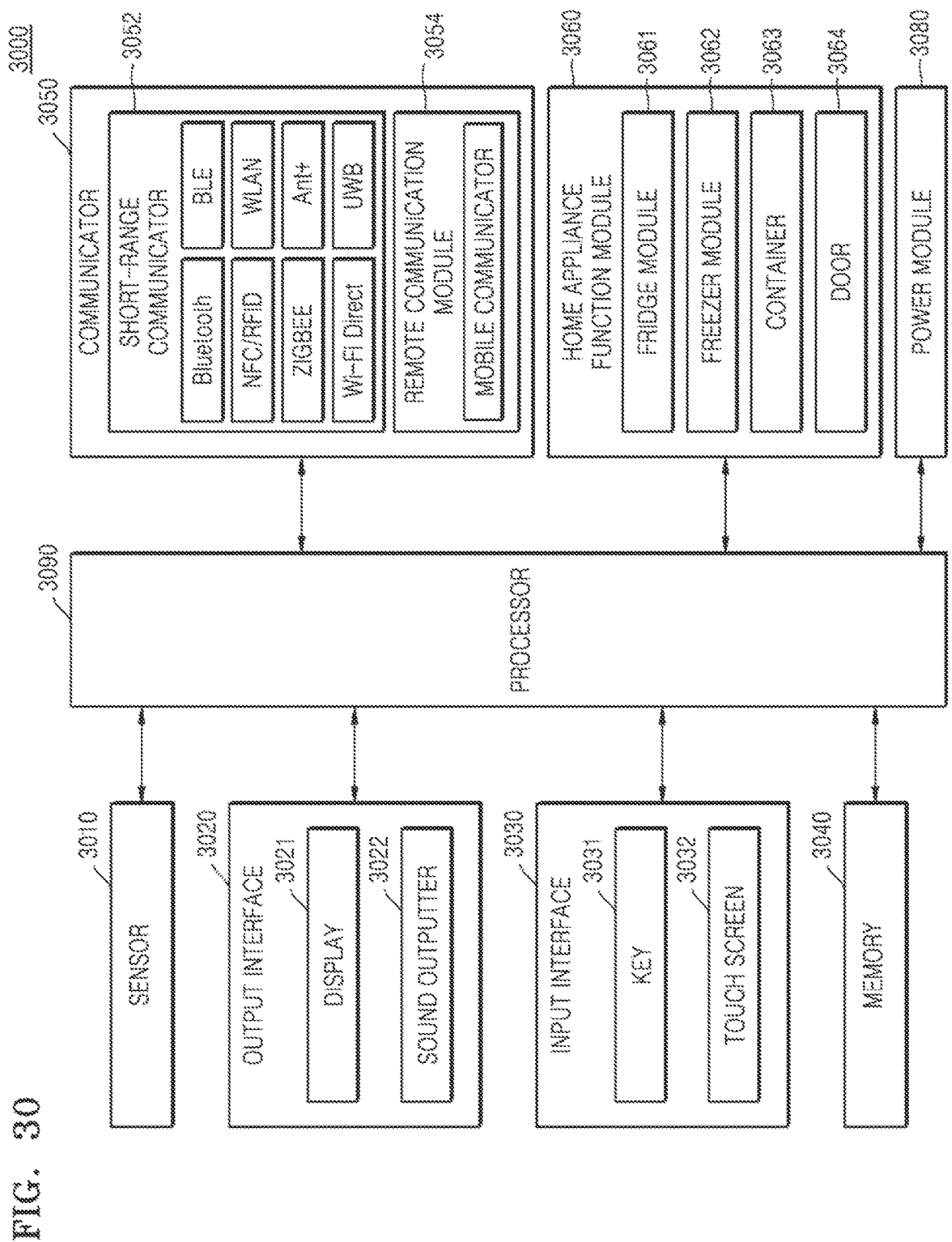
FIG. 30 is a block diagram showing a structure of a refrigerator according to an embodiment of the disclosure.

FIG. 30 is a block diagram showing a structure of a refrigerator according to an embodiment of the disclosure.

The refrigerator 100 according to an embodiment of the disclosure may correspond to a refrigerator 3000. The refrigerator 3000 according to an embodiment of the disclosure may include a sensor 3010, an output interface 3020, an input interface 3030, a memory 3040, a communication module 3050, a home appliance function module 3060, a power module 3080, and a processor 3090. The refrigerator 3000 may include various combinations of the elements illustrated in FIG. 30, and not all elements illustrated in FIG. 30 are essential elements of the refrigerator 3000.

The refrigerator 3000 of FIG. 30 may correspond to the refrigerator 100 described with reference to FIG. 2, the memory 3040 may correspond to the memory 218 described with reference to FIG. 2, the processor 3090 may correspond to the processor 210 described with reference to FIG. 2, the communication module 3050 may correspond to the UWB module 214 described with reference to FIG. 2, the sensor 3010 may correspond to the camera 212, and the sound outputter 3022 may correspond to the speaker 216.

The sensor 3010 may include various types of sensors. For example, the sensor 3010 may include various types of sensors, such as an image sensor, an infrared sensor, an ultrasonic sensor, a lidar sensor, a human detection sensor, an operation detection sensor, a proximity sensor, an illuminance sensor, etc. A function of each sensor may be intuitively inferred by one of ordinary skill in the art from its name, and thus, its detailed description will not be given.

The output interface 3020 may include a display 3021, a speaker 3022, etc. The output interface 3020 may output various notifications, messages, information, etc. generated by the processor 3090.

The input interface 3030 may include a key 3031, a touch screen 3032, etc. The input interface 3030 may receive a user input and transmit the user input to the processor 3090.

The memory 3040 may store various information, data, instructions, programs, etc. necessary for operations of the home appliance 3000. The memory 3040 may include at least one of a volatile memory or a non-volatile memory or a combination thereof. The memory 3040 may include a storage medium of at least one of a flash memory-type, a hard disk-type, a multimedia card micro-type, a card-type memory (for example, SD or XD memory), RAM, SRAM, ROM, EEPROM, PROM, a magnetic memory, a magnetic disk, or an optical disk. Also, the home appliance 3000 may operate a web storage or a cloud server performing a storage function on the Internet.

The communication module 3050 may include at least one of a short-range communication module 3052 or a remote communication module 3054 or a combination thereof. The communication module 3050 may include at least one antenna for wirelessly communicating with another device.

The short-range wireless communication module 3052 may include a Bluetooth communication module, a BLE communication module, an NFC module, a WLAN (or Wifi) communication module, a Zigbee communication module, an IrDA communication module, a WFD communication module, a UWB communication module, an Ant+ communication module, a microwave (uWave) communication module, etc. but is not limited thereto.

The remote communication module 3054 may include communication modules for performing various types of remote communication and may include a mobile communicator. The mobile communicator may transceive a wireless signal with at least one of a base station, an external terminal, or a server on a mobile communication network. Here, the wireless signal may include a sound call signal, a video-telephony call signal, or data of various forms according to transmission and reception of text/a multimedia message.

The home appliance function module 3060 may include an operation module for performing an intrinsic function of the refrigerator 3000. The home appliance function module 3060 may include a fridge module 3061, a freezer module 3062, a container 3063, and a door 3064.

The processor 3090 may control general operations of the refrigerator 3000. The processor 3090 may control the elements of the refrigerator 3000 by executing a program stored in the memory 3040.

According to an embodiment of the disclosure, the processor 3090 may include an additional NPU configured to execute an operation of a machine-learning model. Also, the processor 3090 may include a CPU, a GPU, etc.

FIG. 31 is a block diagram of a mobile device 3101 in a network environment 3100, according to various embodiments.

The mobile device 3101 of FIG. 31 may correspond to the mobile device 930 described above. Also, the server 120 described with reference to FIG. 2 may correspond to a server 3108, and the refrigerator 100 may correspond to an electronic device 3102 or an electronic device 3104.

Referring to FIG. 31, in the network environment 3100, the mobile device 3101 may communicate with the electronic device 3102 through a first network 3198 (e.g., a short-range wireless communication network) or may communicate with at least one of the electronic device 3104 or the server 3108 through a second network 3199 (e.g., a remote wireless communication network). According to an embodiment, the mobile device 3101 may communicate with the electronic device 3104 through the server 3108. According to an embodiment, the mobile device 3101 may include a processor 3120, a memory 3130, an input module 3150, a sound output module 3155, a display module 3160, an audio module 3170, a sensor module 3176, an interface 3177, a connection terminal 3178, a haptic module 3179, a camera module 3180, a power management module 3188, a battery 3189, a communication module 3190, a subscriber identification module 3196, or an antenna module 3197. According to some embodiments, the mobile device 3101 may omit at least one (e.g., the connection terminal 3178) of the elements or may further include at least another element. According to some embodiments, one or more (e.g., the sensor module 3176, the camera module 3180, or the antenna module 3197) of the elements may be integrated into one element (e.g., the display module 3160).

The processor 3120 may, for example, execute software (e.g., a program 3140) to control at least another element (e.g., a hardware or software element) of the mobile device 3101 connected to the processor 3120 and to perform various data processing or calculation operations. According to an embodiment, as at least part of the data processing or calculation operations, the processor 3120 may store a command or data received from other elements (e.g., the sensor module 3176 or the communication module 3190) in a volatile memory 3132, process the command or data stored in the volatile memory 3132, and store resultant data in a nonvolatile memory 3134. According to an embodiment, the processor 3120 may include a main processor 3121 (e.g., a CPU or an AP) or an auxiliary processor 3123 (e.g., a GPU, an NPU, an image signal processor, a sensor hub processor, or a communication processor) which may separately operate from the main processor 3121 or together operate with the main processor 3121. For example, when the mobile device 3101 includes the main processor 3121 and the auxiliary processor 3123, the auxiliary processor 3123 may use less power than the main processor 3121 or may be configured to be specialized in a predefined function. The auxiliary processor 3123 may be realized separately from or as part of the main processor 3121.

For example, the auxiliary processor 3123 may control at least some of functions or states related to at least one element (e.g., the display module 3160, the sensor module 3176, or the communication module 3190) of the mobile device 3101, on behalf of the main processor 3121 when the main processor 3121 is in an inactive (e.g., sleep) state or together with the main processor 3121 when the main processor 3121 in an active (e.g., application execution) state. According to an embodiment, the auxiliary processor 3123 (e.g., an image signal processor or a communication processor) may be realized as part of other functionally related elements (e.g., the camera module 3180 or the communication module 3190). According to an embodiment, the auxiliary processor 3123 (e.g., an NPU) may include a hardware structure specialized in processing an AI model. The AI model may be generated through machine learning. The machine learning may be performed for example directly by the mobile device 3101 executing the AI model or by an additional server (e.g., the server 3108). A learning algorithm may include, for example, supervised learning, unsupervised learning, semi-supervised learning, or reinforcement learning. However, the learning algorithm is not limited to the example described above. The AI model may include a plurality of artificial neural network layers. The artificial neural network may include a deep neural network (DNN), a convolutional neural network (CNN), a recurrent neural network (RNN), a restricted Boltzmann machine (RBM), a deep belief network (DBN), a bidirectional recurrent deep neural network (BRDNN), a deep Q-network, or one of combinations including two or more described above, but is not limited thereto. With respect to a hardware structure, the AI model may additionally or alternatively include a software structure.

The memory 3130 may store various data used by at least one element (e.g., the processor 3120 or the sensor module 3176) of the mobile device 3101. For example, the data may include software (e.g., the program 3140) and input data or output data with respect to a command with respect to the software. The memory 3130 may include the volatile memory 3132 or the nonvolatile memory 3134.

The program 3140 may be stored in the memory 3130 as software and, for example, may include an operating system 3142, middleware 3144, or an application 3146.

The input module 3150 may receive a command or data to be used with respect to the element (e.g., the processor 3120) of the mobile device 3101, from the outside (e.g., a user) of the mobile device 3101. The input module 3150 may include, for example, a microphone, a mouse, a keyboard, a key (e.g., a button), or a digital pen (e.g., a stylus pen).

The sound output module 3155 may output a sound signal to the outside of the mobile device 3101. The sound output module 3155 may include, for example, a speaker or a receiver. The speaker may be used for general purposes, such as multimedia reproduction or recording reproduction. The receiver may be used to receive an incoming call. According to an embodiment, the receiver may be realized separately from the speaker or as part of the speaker.

The display module 3160 may visually provide information to the outside (e.g., a user) of the mobile device 3101. The display module 3160 may include, for example, a display, a hologram device, or a control circuit configured to control a projector and a corresponding device. According to an embodiment, the display module 3160 may include a touch sensor configured to sense a touch input or a pressure sensor configured to measure an intensity of a force generated by the touch input.

The audio module 3170 may convert sound into an electrical signal or inversely, an electric signal into sound. According to an embodiment, the audio module 3170 may obtain sound through the input module 3150 or may output sound through the sound output module 3155 or an external electronic device (e.g., the electronic device 3102 (e.g., a speaker or a headphone) directly or wirelessly connected to the mobile device 3101.

The sensor module 3176 may sense an operating state (e.g., a power supply or temperature) of the mobile device 3101 or an external environmental state (e.g., a user state) and may generate an electrical signal or a data value corresponding to the sensed state. According to an embodiment, the sensor module 3176 may include, for example, a gesture sensor, a gyro sensor, an atmospheric sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 3177 may support one or more predefined protocols which may be used for the mobile device 3101 to be directly or wirelessly connected to an external electronic device (e.g., the electronic device 3102). According to an embodiment, the interface 3177 may include, for example, a high definition multimedia interface (HDMI), a universal serial bus (USB) interface, an SD card interface, or an audio interface.

The connection terminal 3178 may include a connector through which the mobile device 3101 may be physically connected to an external electronic device (e.g., the electronic device 3102). According to an embodiment, the connection terminal 3178 may include, for example, an HDMI connector, a USB connector, an SD card connector, or an audio connector (e.g., a headphone connector).

The haptic module 3179 may convert an electrical signal to a mechanical stimulus (e.g., vibration or motion) or an electrical stimulus which may be recognized by a user through a tactile sense or a kinesthetic sense. According to an embodiment, the haptic module 3179 may include, for example, a motor, a piezoelectric device, or an electrical stimulus device.

The camera module 3180 may capture a still image or a motion image. According to an embodiment, the camera module 3180 may include one or more lenses, image sensors, image signal processors, or flashes.

The power management module 3188 may manage a power supply provided to the mobile device 3101. According to an embodiment, the power management module 3188 may be realized, for example, as at least part of a power management integrated circuit (PMIC).

The battery 3189 may supply power to at least one element of the mobile device 3101. According to an embodiment, the battery 3189 may include, for example, a non-rechargeable primary battery, a rechargeable secondary battery, or a fuel battery.

The communication module 3190 may support establishment of a direct (e.g., wired) communication channel or a wireless communication channel between the mobile device 3101 and an external electronic device (e.g., the electronic device 3102, the electronic device 3104, or the server 3108) and execution of communication through the established communication channel. The communication module 3190 may be independently operated from the processor 3120 (e.g., an AP) and may include one or more communication processors supporting direct (e.g., wired) communication or wireless communication. According to an embodiment, the communication module 3190 may include a wireless communication module 3192 (e.g., a cellular communication module, a short-range wireless communication module, or a GNSS communication module) or a wired communication module 3194 (e.g., a LAN communication module or a power line communication module). A corresponding one of these communication modules may communicate with the external electronic device 3104 through the first network 3198 (e.g., a short-range wireless communication network, such as Bluetooth, Wifi direct, or IrDA) or the second network 3199 (e.g., a remote communication network, such as a legacy cellular network a 5G network, a next-generation communication network, the Internet, or a computer network (e.g., a LAN or a WAN)). Various types of these communication modules may be integrated into one element (e.g., a single chip) or may be realized as a plurality of different elements (e.g., a plurality of chips). The wireless communication module 3192 may identify or authenticate the mobile device 3101 in a communication network such as the first network 3198 or the second network 3199, by using subscriber information (e.g., an international mobile subscriber identity (IMSI)) stored in the subscriber identification module 3196.

The wireless communication module 3192 may support a 5G network after a fourth generation (4G) network and next-generation communication technology, for example, new radio (NR) access technology. The NR access technology may support high speed transmission of high capacity data (enhanced mobile broadband (eMBB)), terminal power consumption minimization and access of a plurality of terminals (massive machine-type communications (mMTC)), or a high reliability and a low latency (ultra-reliable and low latency communications (URLLC)). The wireless communication module 3192 may support, for example, a high-frequency band (e.g., an mmWave band) for realizing a high data transmission rate. The wireless communication module 3192 may support various techniques for securing the performance in a high-frequency band, for example, beamforming, massive multiple-input and multiple-output (MIMO), full dimensional MIMO (FD-MIMO), an array antenna, analog beamforming, or a large scale antenna. The wireless communication module 3192 may support various requirements defined in the mobile device 3101, an external electronic device (e.g., the electronic device 3104), or a network system (e.g., the second network 3199). According to an embodiment, the wireless communication module 3192 may support a peak data rate (e.g., 20 Gbps or higher) for realizing the eMBB, a loss coverage (e.g., 164 dB or lower) for realizing the mMTC, or a U-plane latency (e.g., a downlink (DL) and an uplink (UL) of 0.5 ms or lower or round-trip 1 ms or lower, respectively).

The antenna module 3197 may transmit a signal or a power supply to the outside (e.g., an external electronic device) or receive the signal or the power supply from the outside. According to an embodiment, the antenna module 3197 may include an antenna including an emitter formed of a conductor or a conductive pattern formed above a substrate (e.g., a printed circuit board (PCB)). According to an embodiment, the antenna module 3197 may include a plurality of antennas (e.g., an array antenna). In this case, at least one antenna appropriate for a communication method used in a communication network such as the first network 3198 or the second network 3199 may be, for example, selected by the communication module 3190 from among the plurality of antennas. A signal or a power supply may be transmitted or received between the communication module 3190 and the external electronic device through the selected at least one antenna. According to some embodiments, other elements (e.g., a radio frequency integrated circuit (RFID)) in addition to the emitter may be additionally formed as part of the antenna module 3197. According to various embodiments, the antenna module 3197 may form an mmWave antenna module. According to an embodiment, the mmWave antenna module may include a PCB, an RFIC arranged on a first surface (e.g., a lower surface) of the PCB or to be adjacent thereto and capable of supporting a pre-defined high-frequency band (e.g., an mmWave band), and a plurality of antennas (e.g., an array antenna) arranged on a second surface (e.g., an upper surface or a side surface) of the PCB or to be adjacent thereto and capable of transmitting or receiving a signal of the pre-defined high frequency band.

One or more of the elements described above may be connected to each other and may exchange signals (e.g., commands or data) with each other through a communication method between peripheral devices (e.g., a bus, general purpose input and output (GPIO), a serial peripheral interface (SPI), or a mobile industry processor interface (MIPI)).

According to an embodiment, the commands or data may be transmitted or received between the mobile device 3101 and the external electronic device 3104 through the server 3108 connected to the second network 3199. Each of the external electronic devices 3102 and 2204 may be the same type of device as the mobile device 3101 or a different type of device from the mobile device 3101. According to an embodiment, the whole or part of operations executed in the mobile device 3101 may be executed in one or more external electronic devices from among the external electronic devices 3102, 2204, and 2208. For example, when the mobile device 3101 has to execute a certain function or service automatically or in response to a request by a user or another device, the mobile device 3101 may not directly execute the function or service but may request one or more external electronic devices to execute at least a portion of the function or service, or the mobile device 3101 may directly execute the function or service and may additionally request one or more external electronic devices to execute at least a portion of the function or service. The one or more external electronic devices receiving the request may execute the requested at least the portion of the function or service or an additional function or service related to the request and may transmit a result of the execution to the mobile device 3101. The mobile device 3101 may directly provide the result as at least a portion of a response to the request or may provide the result by additionally processing the result. To this end, for example, a cloud computing technique, a distributed computing technique, a mobile edge computing (MEC) technique, or a client-server computing technique may be used. For example, the mobile device 3101 may provide an ultra-low latency service by using the distributed computing technique or the MEC technique. Also, according to another embodiment, the external electronic device 3104 may include an IoT device. The server 3108 may be an intelligence server using machine learning and/or a neural network. According to an embodiment, the external electronic device 3104 or the server 3108 may be included in the second network 3199. The mobile device 3101 may be implemented in intelligence services (e.g., a smart home, a smart city, a smart car, or a health care), based on the 5G communication technology and the IoT-related technology.

The term "module" used in various embodiments of the disclosure may include a unit realized as hardware, software, or firmware, and for example, may be interchangeably used with terms such as "logic," "logic block," "component," or "circuit." The module may include an integrally formed component or a smallest unit or part of the component configured to execute one or more functions. For example, according to an embodiment, the module may be realized in the form of an application-specific integrated circuit (ASIC).

Various embodiments of this specification may be realized as software (e.g., a program) including one or more instructions stored in a machine (e.g., the mobile device 930 or the refrigerator 100)-readable storage medium. For example, a processor of a machine (e.g., the mobile device 930 or the refrigerator 100) may call at least one instruction from among one or more instructions stored in the storage medium and may execute the instruction. This may enable the machine to operate to execute at least one function according to the called at least one instruction. The one or more instructions may include a code generated by a compiler or a code executable by an interpreter. The machine-readable storage medium may be provided in the form of a non-transitory storage medium. Here, the term "non-transitory" only denotes that a storage medium is a tangible device and does not include a signal (e.g., an electromagnetic wave), and the term does not distinguish a case where data is semi-permanently stored in the storage medium and a case where data is temporarily stored in the storage medium from each other.

According to an embodiment, the method according to various embodiments disclosed in the present specification may be provided as an inclusion of a computer program product. The computer program product may be, as a product, transacted between a seller and a purchaser. The computer program product may be distributed in the form of a machine-readable storage medium (e.g., a compact disc (CD)-ROM) or may be distributed online (e.g., downloaded or uploaded) through an application store or directly between two user devices (e.g., smartphones). In the case of online distribution, at least a portion of the computer program product may be at least temporarily stored in a machine-readable storage medium, such as a server of a manufacturer, a server of an application store, or a memory of a relaying server, or may be temporarily generated.

According to various embodiments, each (e.g., a module or a program) of the elements described above may include a singular or plural entities, and some of the plural entities may be separately arranged in other elements. According to various embodiments, one or more elements or operations of the elements described above may be omitted, or one or more elements or operations of the elements described above may be added. Alternatively or additionally, a plurality of elements (e.g., modules or programs) may be integrated into one element. In this case, the integrated element may perform one or more functions of each of the plurality of elements in the same or substantially the same manner as a corresponding element of the plurality of elements before the integration. According to various embodiments, operations performed by a module, a program, or other elements may be sequentially, parallelly, repetitively, or heuristically performed; one or more of the operations may be performed in a different order or omitted; or one or more other operations may be added.

According to an aspect of an embodiment of the disclosure, there is provided a control method for a refrigerator. The control method for the refrigerator includes obtaining an input image generated by photographing an inner space of the refrigerator. Also, the control method for the refrigerator includes, with respect to each of one or more objects recognized from the input image, obtaining object information including a type of the object and a position of the object. Also, the control method for the refrigerator includes, by using an ultra-wide band (UWB) module included in the refrigerator, detecting a UWB signal output from a UWB device arranged inside the refrigerator. Also, the control method for the refrigerator includes, based on the detected UWB signal, identifying a position of the UWB device. Also, the control method for the refrigerator includes, identifying a first object located around the UWB device, from among the one or more objects recognized from the input image. Also, the control method for the refrigerator includes outputting the object information with respect to the first object as an audio signal.

Also, according to an embodiment of the disclosure, the control for the refrigerator may further include: transmitting the input image to an artificial intelligence (AI) server; and receiving, from the AI server, the object information with respect to the recognized one or more objects.

Also, according to an embodiment of the disclosure, the obtaining of the input image and the obtaining of the object information may be performed at night time.

Also, according to an embodiment of the disclosure, when a condition with respect to opening and closing of a door of the refrigerator is satisfied, the obtaining of the input image and the obtaining of the object information may be performed.

Also, according to an embodiment of the disclosure, when a door of the refrigerator is open and a reference time or longer has passed, the obtaining of the input image and the obtaining the object information may be performed.

Also, according to an embodiment of the disclosure, the control method for the refrigerator may further include: obtaining information about a new object added in the refrigerator; transmitting the information about the new object to a mobile device communicating with the refrigerator; receiving object information with respect to the new object from the mobile device; and storing the object information with respect to the new object.

Also, according to an embodiment of the disclosure, the obtaining of the information about the new object may include obtaining, from the mobile device, position information of the new object, based on a control signal for adding the new object to a position corresponding to the position of the UWB device.

Also, according to an embodiment of the disclosure, the obtaining of the information about the new object may include obtaining position information of the new object recognized in the input image.

Also, according to an embodiment of the disclosure, the identifying of the first object may include identifying, as the first object, an object that is most adjacent to the position of the UWB device from among the one or more objects.

Also, according to an embodiment of the disclosure, the identifying of the first object may include identifying, as the first object, an object that is most adjacent to the UWB device from among objects located in a same section as the UWB device based on section information of the inner space of the refrigerator, from among the one or more objects.

Also, according to an embodiment of the disclosure, the control method for the refrigerator may further include obtaining motion information of the UWB device, wherein the identifying of the first object may include identifying an object arranged below the UWB device as the first object by determining that the UWB device is arranged on the object in the inner space of the refrigerator based on the motion information of the UWB device.

Also, according to an embodiment of the disclosure, the outputting of the object information as the audio signal may include outputting the audio signal including at least one of a type of the first object or direction information of the first object with respect to the UWB device.

Also, according to an embodiment of the disclosure, the control method for the refrigerator may further include: detecting the UWB device in the refrigerator; and transmitting the object information to the UWB device.

Also, according to an embodiment of the disclosure, the control method for the refrigerator may further include: establishing UWB communication with the UWB device; and communicating with the UWB device through the UWB communication.

Also, according to an aspect of an embodiment of the disclosure, there is provided a refrigerator. The refrigerator includes: a camera configured to photograph an inner space of the refrigerator; and one or more ultra-wide band (UWB) modules configured to detect a UWB signal. Also, the refrigerator includes a speaker configured to output an audio signal. Also, the refrigerator includes a memory storing one or more instructions. Also, the refrigerator includes one or more processors connected to the memory. The one or more processors are configured to execute the one or more instructions to obtain an input image captured by the camera. The one or more processors are configured to execute the one or more instructions to, with respect to each of one or more objects recognized from the input image, obtain object information including a type of the object and a position of the object. The one or more processors are configured to execute the one or more instructions to, by using the one or more UWB modules, detect a UWB signal output from a UWB device arranged in the refrigerator. The one or more processors are configured to execute the one or more instructions to, based on the detected UWB signal, identify a position of the UWB device. The one or more processors are configured to execute the one or more instructions to identify a first object which is located around the UWB device from among the one or more objects recognized from the input image. The one or more processors are configured to execute the one or more instructions to output the object information with respect to the first object as an audio signal by using the speaker.

Also, according to an aspect of an embodiment of the disclosure, there is provided a computer-readable recording medium having recorded thereon a program for executing the control method for the refrigerator on a computer.

The invention claimed is:

1. A control method for a refrigerator, the control method comprising:
    obtaining an input image generated by photographing an inner space of the refrigerator;
    with respect to one or more objects recognized from the input image, obtaining object information comprising a type and a position of the one or more objects, respectively;
    by using an ultra-wide band (UWB) module included in the refrigerator, detecting a UWB signal output from a UWB device while the UWB device is arranged inside the refrigerator;
    based on the detected UWB signal, identifying a position of the UWB device;
    identifying an object located around the UWB device, from among the one or more objects recognized from the input image, based on the identified position of the UWB device; and
    outputting the object information with respect to the object identified as being located around the UWB device as an audio signal.

2. The control method of claim 1, further comprising:
    transmitting the input image to an artificial intelligence (AI) server; and
    receiving, from the AI server, the object information with respect to the recognized one or more objects.

3. The control method of claim 1, wherein the obtaining of the input image and the obtaining of the object information are performed at night time.

4. The control method of claim 1, wherein, when a condition with respect to opening and closing of a door of the refrigerator is satisfied, the obtaining of the input image and the obtaining of the object information are performed.

5. The control method of claim 1, wherein, when a door of the refrigerator is open and a reference time or longer has passed, the obtaining of the input image and the obtaining the object information are performed.

6. The control method of claim 1, further comprising:
    obtaining information about a new object added in the refrigerator;
    transmitting the information about the new object to a mobile device communicating with the refrigerator;
    receiving object information with respect to the new object from the mobile device; and
    storing the object information with respect to the new object.

7. The control method of claim 6, wherein the obtaining of the information about the new object comprises obtaining, from the mobile device, position information of the new object, based on a control signal for adding the new object to a position corresponding to the position of the UWB device.

8. The control method of claim 6, wherein the obtaining of the information about the new object comprises obtaining position information of the new object recognized in the input image.

9. The control method of claim 1, wherein the object identified as being located around the UWB device is most adjacent to the position of the UWB device from among the one or more objects.

10. The control method of claim 1, the object identified as being located around the UWB device is most adjacent to the UWB device from among objects located in a same section as the UWB device, based on section information of the inner space of the refrigerator, from among the one or more objects.

11. The control method of claim 1, further comprising obtaining motion information of the UWB device,
    wherein the object identified as being located around the UWB device is identified as being arranged below the UWB device by determining that the UWB device is arranged on the object in the inner space of the refrigerator based on the motion information of the UWB device.

12. The control method of claim 1, wherein the outputting of the object information as the audio signal outputs at least one of a type of the object or direction information of the object with respect to the UWB device.

13. The control method of claim 1, further comprising:
    detecting the UWB device in the refrigerator; and
    transmitting the object information to the UWB device.

14. A refrigerator comprising:
    a camera configured to photograph an inner space of the refrigerator;
    one or more ultra-wide band (UWB) modules configured to detect a UWB signal;
    a speaker configured to output an audio signal;
    a memory to store one or more instructions; and
    one or more processors connected to the memory, and configured to execute the one or more instructions to:
        obtain an input image captured by the camera;
        with respect to one or more objects recognized from the input image, obtain object information comprising a type and a position of the one or more objects, respectively;
        by using the one or more UWB modules, detect a UWB signal output from a UWB device arranged inside the refrigerator;
        based on the detected UWB signal, identify a position of the UWB device;
        identify an object which is located around the UWB device, from among the one or more objects recognized from the input image, based on the identified position of the UWB device; and
        output the object information with respect to the object identified as being located around the UWB device as an audio signal by using the speaker.

15. A non-transitory computer-readable recording medium having recorded thereon a program to execute, on a computer, the method of claim 1.

* * * * *